(12) United States Patent
Kamiya et al.

(10) Patent No.: US 6,851,762 B2
(45) Date of Patent: Feb. 8, 2005

(54) VEHICLE BRAKE FLUID PRESSURE CONTROL DEVICE WITH HYDRAULIC BOOSTER

(75) Inventors: Masahiko Kamiya, Anjo (JP); Kazuo Masaki, Chita (JP); Tooru Fujita, Obu (JP); Kyouji Kawano, Nukata-gun (JP); Taizo Abe, Takahama (JP); Kazuya Maki, Nagoya (JP); Hiroaki Niino, Toyota (JP)

(73) Assignee: Denso Corporation, Kariya (JP)

( * ) Notice: Subject to any disclaimer, the term of this patent is extended or adjusted under 35 U.S.C. 154(b) by 104 days.

(21) Appl. No.: 10/059,032

(22) Filed: Jan. 30, 2002

(65) Prior Publication Data

US 2002/0101114 A1 Aug. 1, 2002

(30) Foreign Application Priority Data

Jan. 31, 2001 (JP) ........................... 2001-024190
Sep. 28, 2001 (JP) ........................... 2001-302614

(51) Int. Cl.[7] ............................................. B60T 8/34
(52) U.S. Cl. ................... 303/113.3; 303/3; 303/15; 303/113.4; 303/114.1; 303/115.4; 303/116.2; 303/20
(58) Field of Search ................. 303/3, 11, 15, 303/154, 155, 113.1, 113.2, 113.3, 113.4, 114.1, 114.2, 115.1, 115.4, 116.1, 116.2, 119.1, 20

(56) References Cited

U.S. PATENT DOCUMENTS

| | | | |
|---|---|---|---|
| 4,836,618 A | | 6/1989 | Wakata et al. |
| 4,846,534 A | * | 7/1989 | Leiber et al. ............. 303/115.4 |
| 4,877,296 A | * | 10/1989 | Leiber et al. ............. 303/113.4 |
| 5,165,763 A | * | 11/1992 | Matsuda ........................ 303/10 |
| 5,290,098 A | * | 3/1994 | Burgdorf et al. ......... 303/115.4 |
| 5,538,334 A | * | 7/1996 | Kushi et al. ............. 303/113.5 |
| 5,667,283 A | | 9/1997 | Drennen et al. |
| 5,741,050 A | | 4/1998 | Ganzel et al. |
| 5,911,484 A | * | 6/1999 | Hashida ................... 303/115.4 |
| 5,927,828 A | * | 7/1999 | Beck ....................... 303/116.2 |
| 6,024,420 A | | 2/2000 | Yonemura et al. |
| 6,095,622 A | | 8/2000 | Oishi et al. |
| 6,142,581 A | | 11/2000 | Yamaguchi et al. |
| 6,195,995 B1 | | 3/2001 | Bartsch |
| 6,312,062 B1 | * | 11/2001 | Hashida ................... 303/113.2 |
| 6,474,751 B1 | | 11/2002 | Yamaguchi et al. |

FOREIGN PATENT DOCUMENTS

| | | |
|---|---|---|
| DE | 44 12 650 A1 | 10/1995 |
| JP | A-761339 | 3/1995 |
| JP | A-10-24828 | 1/1998 |
| JP | B2-2765570 | 4/1998 |

* cited by examiner

Primary Examiner—Robert A. Siconolfi
Assistant Examiner—Devon Kramer
(74) Attorney, Agent, or Firm—Posz & Bethards, PLC

(57) ABSTRACT

A hydraulic booster is provided between a M/C pressure and a W/C pressure. The hydraulic booster is composed of a pump and an amplifying piston amplifying the brake fluid amount discharged from the pump. The brake fluid discharged from the amplifying piston is supplied to the W/C via a first pipeline. The brake fluid discharged from the pump is supplied directly to the W/C via a second pipeline. First and a second control valves select the first or the second pipeline as a pressurizing path to the wheel cylinder.

56 Claims, 39 Drawing Sheets

VEHICLE BRAKE FLUID PRESSURE CONTROL DEVICE WITH HYDRAULIC BOOSTER

CROSS REFERENCE TO RELATED APPLICATIONS

This application is based upon and claims the benefit of Japanese Patent Applications No. 2001-24190 filed on Jan. 31, 2001 and No. 2001-302614 filed on Sep. 28, 2001, the contents of which are incorporated herein by reference.

BACKGROUND OF THE INVENTION

1. Field of the Invention

The present invention relates to a vehicle brake fluid pressure control device with a hydraulic booster to be used during normal braking control operations, in particular, applicable to an electric vehicle that does not use engine vacuum.

2. Related Art

In a conventional hydro booster or an EHB (Electro Hydraulic Brake), brake pressure to be used during normal braking is amplified by using a high capacity accumulator (e.g., refer to Japanese patent No. 2,765,570).

However, in the hydro booster or EHB, the high pressure maintained at all times with the high capacity accumulator. Therefore, it is necessary for the brake system to be equipped with a fail-safe mechanism for ensuring the high pressure so that the brake system is complicated. Further, this brake system has a drawback that nitrogen gas or the like for maintaining the high pressure may leak through a seal, resulting in that not only the high pressure may not be maintained but also the leaked nitrogen gas or the like may enter into a brake piping conduit.

Furthermore, an urgency brake control such as the ABS control, the TCS control or vehicle stability control, which are executed during a vehicle running, requires quick responsiveness to brake fluid pressure applied by a pump. In order to implement the quick responsiveness to pressure, a brake device having a brake fluid amount amplifier provided between a master cylinder and a wheel cylinder has been proposed (e.g., refer to Japanese patent publication No. 10-35459).

In this brake device, it is assumed that the pump is used only during the urgency control operations, but not during the normal braking operation. Accordingly, while a problem of the quick responsiveness to pressure still remains in view of a size or efficiency of the motor, it is very difficult to provide a system or control that can endure the highly frequent use at the normal braking operations.

SUMMARY OF THE INVENTION

It is therefore an object of the present invention to provide a brake fluid control device with a hydraulic booster, which is capable of boosting up the brake pressure without using the high capacity accumulator.

It is another object of the present invention to provide a brake fluid control device with a hydraulic booster, which is capable of having quick responsiveness to a brake fluid pressure applied by a pump during an urgency control operation and further boosting up the brake pressure in use of the pump during a normal braking operation.

According to the present invention, a brake booster supplies brake fluid to the wheel cylinder, which is larger than brake pressure generated in the master cylinder. A fluid pressure regulating unit regulates a differential pressure between the brake pressure in the master cylinder and that in the wheel cylinder. The brake booster has pump unit, which sucks and discharges the brake fluid directly supplied to the wheel cylinder, and a pressurizing flow amount amplifying unit, which amplifies an amount of the brake fluid discharged from the pump unit for supplying to the wheel cylinder. A first pipeline (A1) transmits the brake fluid discharged from the pressurizing flow amount amplifying unit to the wheel cylinders. A second pipeline (A2) transmits the brake fluid discharged from the pump unit directly to the wheel cylinders. A flow amount amplification changing unit selects one of the first and second pipelines (A1, A2) as a pressurizing path to the wheel cylinder.

Therefore, the differential pressure between the brake fluid pressure in the master cylinder and that in the wheel cylinders is secured by the brake booster in cooperation with the fluid pressure regulating unit. Thus the brake pressure boost is realized without a high capacity accumulator.

Since the flow amount amplification changing unit selects one of the first and second pipelines as the pressurizing path, the brake fluid control device according to this invention has high responsiveness to brake fluid pressure applied by the pump during the urgency brake control and also an adequate amplifying feature for further boosting up an amount of the brake fluid supplied by the pump during the normal braking control.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

First Embodiment

A brake system incorporated in a vehicle according to a first embodiment of the present invention is described. As referring to FIG. 1, the brake system has a brake control ECU 1 that executes each vehicle control.

The brake system is controlled according to a pressing operation of the brake pedal 2. The brake pedal 2 is connected to a master cylinder (M/C) through a push rod or the like. When the brake pedal is pressed by a driver, a piston of the M/C is pushed by the push rod, and therefore brake fluid pressure corresponding to the pedal pressure is generated in the M/C 3. The M/C 3 has a master reservoir 3a that provides brake fluid to the M/C 3 and reserves surplus brake fluid of the M/C 3.

Figure 1:
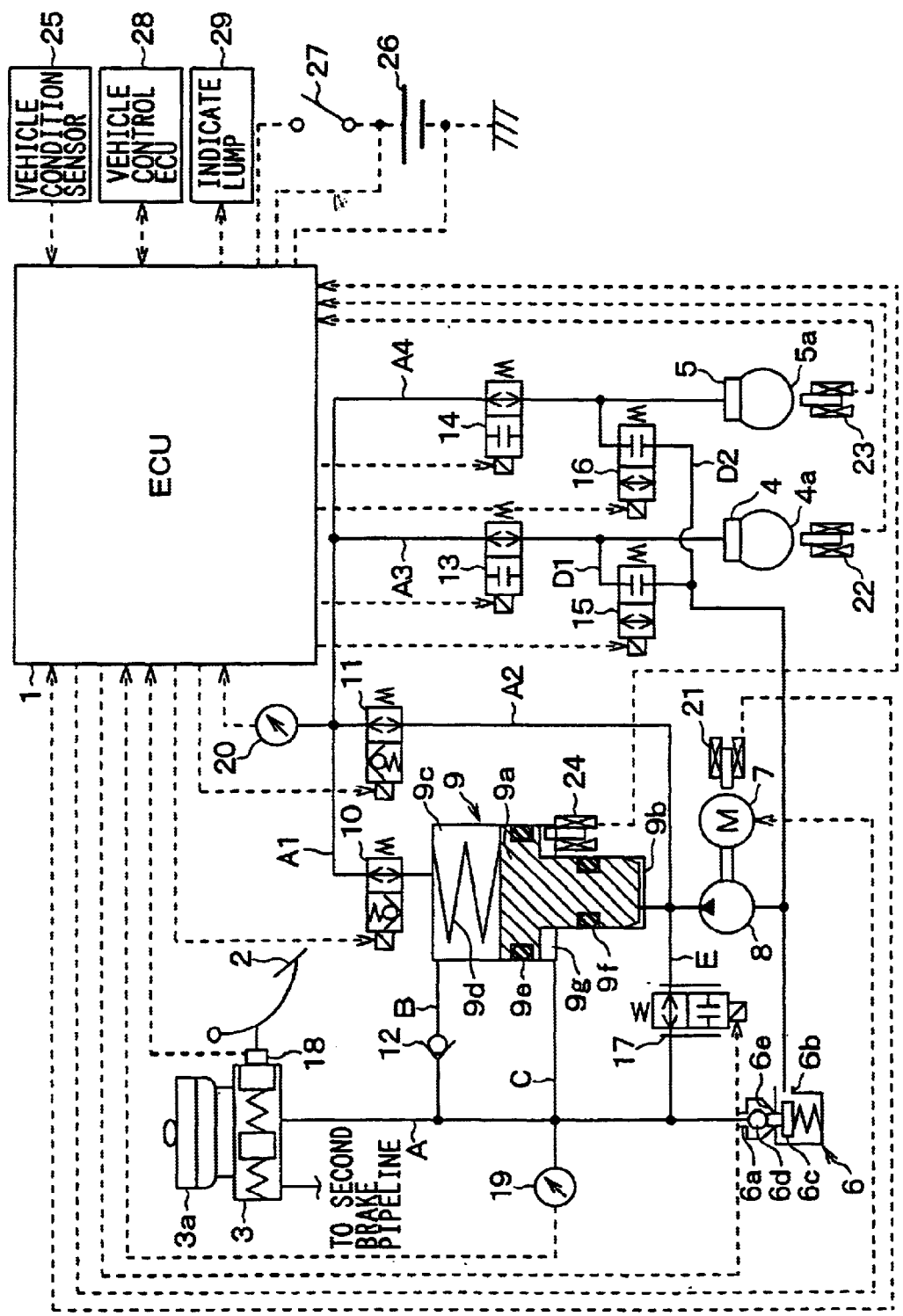
FIG. 1 is a schematic view of a brake system according to a first embodiment of the present invention.

The M/C pressure generated in the M/C 3 is transferred to the respective wheel cylinders (W/C) 4, 5 attached to respective wheels 4a, 5a through first brake piping. In FIG. 1, the first brake piping for transferring the M/C cylinder pressure in the primary chamber of the M/C 3 is described, but a second brake piping having the same construction as the first brake piping and for transferring M/C pressure of the secondary chamber in the M/C 3 is also employed in the brake system. However, for simplicity, the secondary brake piping is not shown in FIG. 1. In the following explanation, the first brake piping is explained as one example, but the second brake piping is the same.

The first brake piping includes a pipeline (main pipeline) A that connects the M/C 3 to the W/C 4, 5. This pipeline A is equipped with a pressure regulating reservoir 6 and a pump 8 that is driven by a motor 7. The pump 8 sucks brake fluid from the M/C 3 side through the pressure regulating reservoir 6 and discharges it to the W/C 4, 5 side. The motor 7 and the pump 8 constitutes a pump unit.

The pressure regulating reservoir 6 has first and second reservoir ports 6a, 6b, a reservoir piston 6c, a valve element 6d that moves in conjunction with the reservoir piston 6c, a valve seat 6e on which the valve element 6d rests. The first reservoir port 6a is connected to the M/C 3 side, and the second reservoir port 6b is connected to the pump 8 side. When the pressure regulating reservoir 6 reserves a predetermined amount of brake fluid, the valve element 6d rests on the valve seat 6e. Thus, the brake fluid pressure applied to the pump 8 is restricted so as not to provide the high pressure brake fluid to the pump 8 through the second reservoir port 6b. The pump 8 may be a rotary pump such as a trochoid pump. The pump 8 sucks and discharges brake fluid according to rotation of the gears equipped in the pump 8.

The pipeline A branches out into two pipelines (a first pipeline and a second pipeline) A1, A2 downstream from a discharge port of the pump 8. An amplifying piston 9 and a first control valve 10 is employed in the pipeline A1, and a second control valve 11 is employed in the pipeline A2. The first and second pipelines A1, A2, respectively, form pressurizing paths for pressurizing brake fluid to be supplied to the W/C 4, 5 with the pump 8. The pressurizing paths can be switched by the first and second control valves 10, 11. The amplifying piston constitutes a brake fluid amplification unit.

The amplifying piston 9 has a step piston 9a. This step piston 9a is so constructed that its pressure-receiving surface on a side of the W/C 4, 5 is wider than that on a side of the pump 8. The smaller pressure-receiving surface defines a part of a first chamber 9b, and the wider pressure-receiving surface defines a part of a second chamber 9c. The second chamber 9c is connected to the pipeline A upstream from the pressure regulating reservoir 6 via a pipeline B. A check valve 12 is employed to the pipeline B to permit the brake fluid to flow only from the M/C 3 side to the second chamber 9c. Thus, when the brake fluid discharged from the pump 8 is provided to a first chamber 9b, an amount of the brake fluid greater than that provided to the first chamber 9b is delivered to the W/C 4, 5 from the second chamber 9c. Further, this amplifying piston 9 has a spring 9d for urging the step piston 9a toward an upstream side (the pump 8 side).

Therefore, if differential pressure between the first chamber 9b and the second chamber 9c is lower than a predetermined value, the first chamber 9b is reduced by the step piston 9a.

Seal members 9e, 9f such as O-rings are provided around a large diameter portion and small diameter portion of the step piston 9a, respectively, to maintain the differential pressure between the first and second chambers 9b, 9c. A third chamber 9g is defined by a stepped portion of the step piston 9a and a wall that is used as guide wall (guide wall) on which the step piston 9a slide. The third chamber 9g is also connected to the pipeline A upstream from the pressure regulating reservoir 6 via a pipeline C so that negative pressure is not generated in the third chamber 9g when the step piston 9a slides on the guide wall.

Each of the first and second control valves 10, 11 is a two position valve that can switch between an open position and a differential pressure position (or close position). The first control valve 10 adjusts so that the fluid pressure of the second chamber 9c side is lower than that on the W/C 4, 5 side when the first control valve 10 is set to the differential pressure position. The second control valve 10 adjusts so that the fluid pressure of the W/C 4, 5 side is lower than that on the side of the discharge port of the pump 8 (the first chamber 9b side). The valve positions of the first and second control valves 10, 11 are set to the positions shown in FIG. 1 while their solenoids are not energized.

Further, the pipelines A1, A2 are joined into one pipeline downstream from the first and second control valves 10, 11, and then the pipeline A branches out into two pipelines A3, A4 again. The pipeline A3 is connected to the W/C 4, and the pipeline A4 is connected to the W/C 5. A pressurization control valve 13 is employed in the pipeline A3, and a pressurization control valve 14 is employed in the pipeline A4. Each of the pressurization control valves 13, 14 is a two position valve that can switch between an open position and a close position. Thus, each of the pipelines A3, A4 is selectively opened and closed by the pressurization control valves 13, 14. Valve positions of the pressurization control valves 13, 14 are set to the position shown in FIG. 1 while their solenoids are not energized.

The pipeline A3 between the pressurization control valve 13 and the W/C 4 is connected to the pipeline between the pressure regulating reservoir 6 and the pump 8 via a pipeline D1. The pipeline A4 between the pressurization control valve 14 and the W/C 5 is connected to the pipeline between the pressure regulating reservoir 6 and the pump 8 via a pipeline D2. A depressurization control valve 15 is disposed in the pipeline D1, and a depressurization control valve 16 is disposed in the pipeline D2. Each of the depressurization control valves 15, 16 is a two position valve that can switch between an open position and a close position. Thus, each of the pipelines D1, D2 is selectively opened and closed by the depressurization control valves 15, 16. Valve positions of the depressurization control valves 15, 16 are set to the positions shown in FIG. 1 while their solenoids are not energized.

Further, the pipeline A between the M/C 3 and the pressure regulating reservoir 6 communicates with a pipeline between the pump 8 and the amplifying piston 9 or the second control valve 11 via a pipeline E. A linear valve 17 is employed in the pipeline E, thereby controlling brake fluid differential pressure between the discharge port side pressure of the pump 8 and the M/C pressure. For example, the above-mentioned differential pressure is duty controlled by an electric current applied to the linear valve 17.

In the first brake piping, various kinds of sensors that detect conditions of elements are provided. Namely, a pedal pressure sensor (pedal detecting unit) 18 is provided in the brake pedal 2. A M/C pressure sensor 19 is provided in the pipeline A between the M/C 3 and the pressure regulating reservoir 6. A W/C pressure sensor 20 is provided in the pipeline A between one of the first and second control valves 10, 11 and one of the pressurization control valves 13, 14. A rotation number sensor 21 that senses rotation number of the motor 7 is disposed near the motor 7. Wheel speed sensors 22, 23 that sense respective wheel speeds of wheels 4a, 5a are disposed near rotors of wheels 4a, 5a. A stroke sensor 24 that senses sliding amount of the step piston 9a is employed in the amplifying piston 9. Each of these sensors 18–24 generates each sensing signal, which is input to the brake control ECU 1.

Various kinds of sensing signals from vehicle condition sensor 25 such as a yaw-rate sensor, a voltage from a battery 26 (referred to herein battery voltage), and an ON/OFF signal of an ignition switch 27 are input to the brake control ECU. The brake control ECU 1 is capable of exchanging information with a vehicle control ECU 28 such as a power train control ECU (e.g., an engine ECU).

The brake control ECU 1 controls each of the control valves 10, 11, 13–17 and a rotation driving force of the motor 7 according to the input signals or the like, and detect malfunction based on whether braking operation is normal or not, whether each of the first brake piping acts normal or the like. Further it activates indication lamp 29 provided in vehicle or the like based on the detecting results. For example, the brake control ECU 1 detects the stroke end of the step piston 9a based on the sensing signal from the stroke sensor 24, so that the pressurizing path is adequately selected. The brake control ECU 1 compares W/C pressure with duty ratio of the electric current of the linear valve 17, to judge whether the w/C is adequately pressurized.

According to the brake system of this embodiment, one of the pipelines A1, A2 is appropriately selected as the pressurizing path to the W/C 4, 5 by switching positions of the first and second control valves 10, 11. Further, the duty ratio of the electric current to the linear valve 17 is set from time to time according to the vehicle conditions so the W/C 4, 5 are appropriately pressurized.

In this embodiment, the pipeline A1 is selected as the pressurizing path when the W/C 4, 5 are low pressure, for example, at the beginning of braking operation (W/C low pressure timing), while the pipeline A2 is selected as the pressurizing path when the W/C 4, 5 become high pressure (W/C high pressure timing).

At First, when the brake pedal 2 is stepped on quickly, during the W/C low pressure timing, a great amount of brake fluid for pressurizing is needed because consumption of the brake fluid in the W/C 4, 5 is large. Therefore, in this case, the brake control ECU 1 sets the first control valve 10 to the open position and sets the second control valve 10 to the differential pressure position. Thus, the pipeline A1 is selected as the pressurizing path. Next, the brake control ECU 1 is operative to keep differential pressure between the discharge pressure of the pump 8 and the fluid pressure of the M/C 3 to a rated value by establishing the duty ratio of the electric current to the linear valve 17. In this timing, a ratio of the discharging pressure of the pump 8 to the required fluid pressure to be applied to the W/C 4, 5 is set to a value equal to the pressure-receiving surface area ratio of the step piston 9a. Therefore, the brake fluid discharged from the pump 8 flows into the first chamber 9b in a state that the linear valve 17 keeps the differential pressure between the M/C pressure and the discharge pressure of the pump 8. As a result, the step piston 9a is pushed toward a downstream side against a biasing force of the spring 9d so that the brake fluid in the second chamber 9c is pushed out to the W/C 4, 5 side to pressurize the W/C 4, 5.

Accordingly, when the pipeline A1 is selected, the brake pressure is boosted up under a help of the linear valve 17. Further, the W/C 4, 5 side are pressurized by the brake fluid whose volume is larger than that of the discharging brake fluid from the pump 8 based on the pressure-receiving surface difference of the step piston 9a. Thus, though a load of the pump 8 increases, but a great amount of highly pressurized brake fluid can be secured.

Since the best efficiency (motor efficiency) region of the motor 7 for driving the pump 8 is limited, it is the most preferable that the motor 7 is used within the limited region, but if high pressure response in a wider pressure range is required, the motor 7 has to be used out of the region. In this case, it is not preferable because not only the load of the motor 7 increases, but also consumption of the current by the motor 7 increases. On the other hand, according to this embodiment, the pressurizing paths are constituted by two paths, that is, one path is the pipeline A1 using pressure-receiving surface difference for pressurizing the W/C 4, 5 with the brake fluid amount greater than that discharged from the pump 8, the other path is the pipeline A2 through which the W/C 4, 5 is pressurized directly by the pump 8. Then, the two paths are changed over according to the demand. Therefore, it is possible to secure high pressure response without using the motor 7 outside the best efficiency region. In this manner, the motor 7 is used within the best efficiency region and the high pressure response is secured by using the pipelines A1, A2. This advantage is also achieved even when a flow of the brake fluid is slow at a low temperature.

The M/C pressure is introduced to the third chamber 9g via the pipeline C, when the step piston 9a slides on the guide wall. Thus, the volume of the brake fluid provided from the M/C 3 correspond to the consumption volume of the brake fluid in the W/C 4, 5.

At the W/C high pressure timing, the W/C pressure becomes high to extent that it is not necessary to pressurize the W/C 4, 5 with the brake fluid amount greater than that discharged from the pump 8. At this time, the W/C is sufficiently pressurized by driving the motor 7 in the best efficiency region. So, the first control valve 10 is set to the differential pressure position, the second control valve 11 is set to the open position, and the pipeline A2 is selected as the pressurizing path. Then, a differential pressure is generated between the discharge pressure by the pump 8 and the brake fluid pressure of the M/C 3 side by determining the duty ratio of the electric current of the linear valve 17. In this manner, the brake pressure is boosted up by the linear valve 17, and the W/C 4, 5 side are pressurized directly by the brake fluid discharged from the pump 8. Thus, as the pipeline A1 is selected, it is unnecessary to push the step piston 9a. Therefore, the load of the pump 8 is reduced, and it is possible to use the motor 7 in the best efficiency region.

Figure 2:
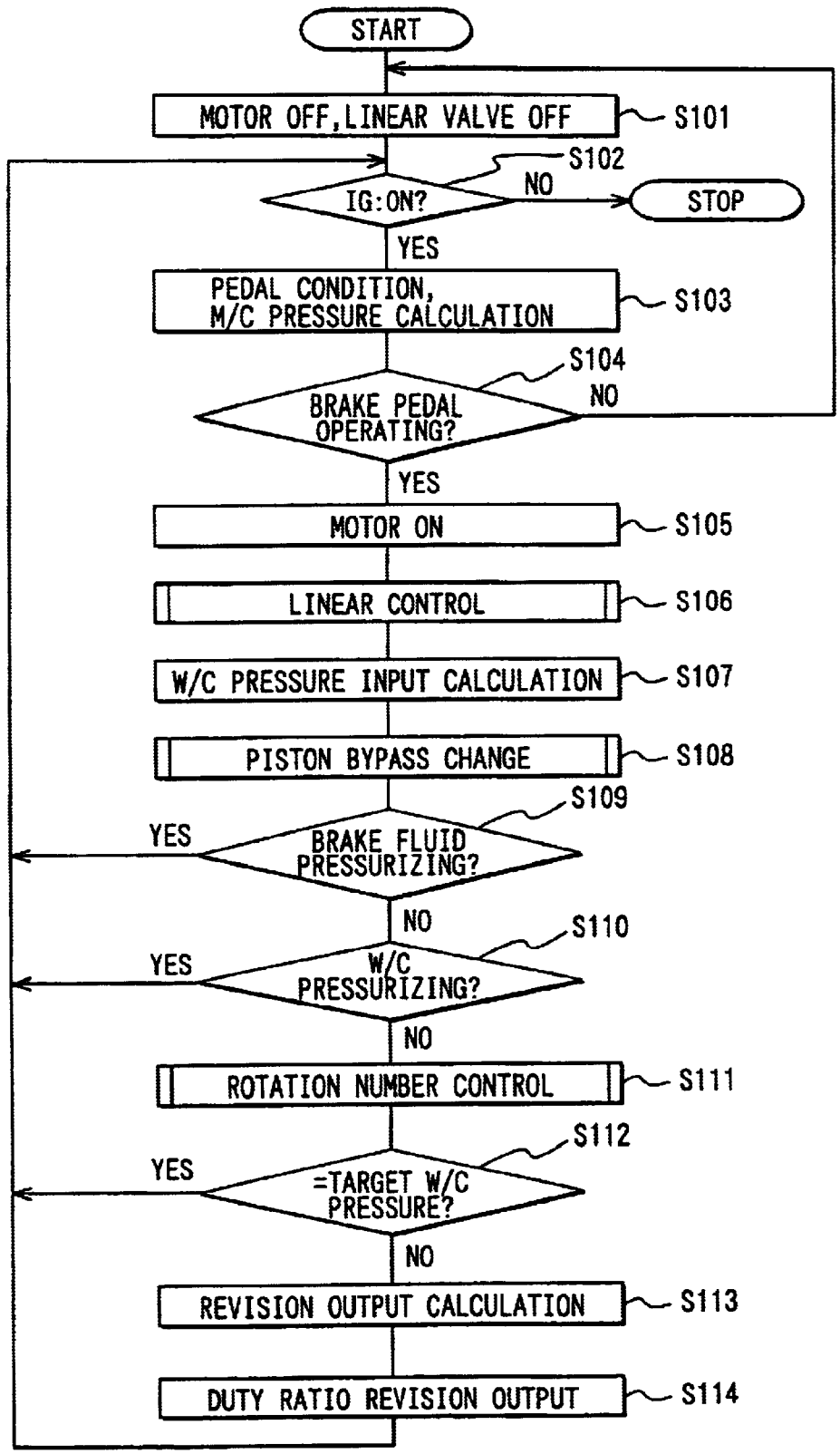
FIG. 2 is a flowchart showing a process executed by a brake control ECU in the first embodiment.

Next, the processing executed by the brake control ECU 1 of the vehicle brake system of this embodiment is described. FIG. 2 shows main routine executed by the brake control ECU 1.

First, at step 101, the motor 7 and the linear valve 17 are set OFF as initializing processing. So, the pump 8 stops discharging the brake fluid, and the linear valve 17 does not generate the differential pressure. Namely, the brake pressure of the M/C 3 and that of the W/C 8 become the same pressure one another. At step 102, whether the ignition switch 27 is ON or not is determined. The processing advances to step 103 in response to an affirmative determination (Yes), while advancing to an end of this routine in response to a negative determination (No).

At step 103, the pedal conditions of the brake pedal 2 such as pedal pressure and the M/C pressure are calculated based on the sensing signal from the pedal pressure sensor 18 and the M/c pressure sensor 19. Next, the processing advances to step 104, and whether the brake pedal 2 is operated or not is determined. For example, this step determines whether the pedal pressure calculated based on the sensing signal from the pedal pressure sensor 18 is zero or not. The processing advances to step 105 in response to an affirmative determination (Yes), while returning to step 101 in response to a negative determination (No).

At step 105, the motor 7 is set ON with 100% duty, and the brake fluid is sucked and discharged by the pump 8. Next, the processing advances to step 106, and the duty ratio of the electric current of the linear valve 17 or the like is calculated for a control processing of the linear valve 17, that is, for estimating the differential pressure generated by the linear valve 17.

Figure 3:
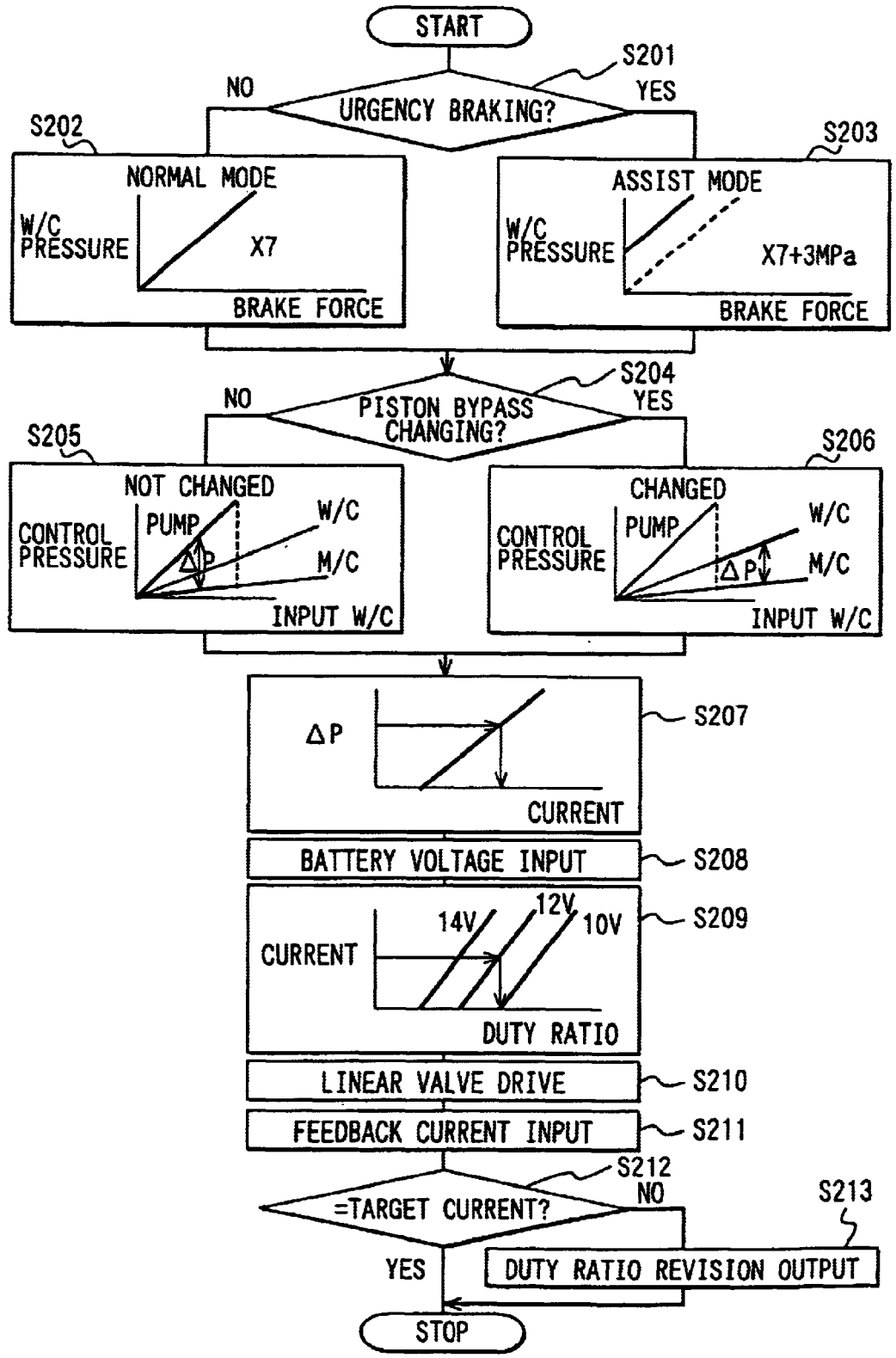
FIG. 3 is a flowchart showing a process executed at step 106 of FIG. 2.

FIG. 3 shows the control processing of the linear valve 17 executed by the brake control ECU 1. First, at step 201, whether a sudden brake operation is performed or not. That is, whether a brake force assisting is necessary or not is determined. For example, this step is determination is carried out based on a change ratio of the pedal pressure of the brake pedal 2 or a change ratio of the M/C pressure that is calculated at step 103. The processing advances to step 202 in response to a negative determination (No) as the normal brake mode at which an assist to brake force is unnecessary. Then, the W/C pressure corresponding to pedal pressure applied to the brake pedal 2 is calculated based on a relationship between the pedal pressure and target W/C pressure at the normal brake mode. For example, as shown in FIG. 3, the target W/C pressure is set so that the W/C pressure will be seven times (i.e., amplifying ratio 7) as large as the pedal pressure (or the M/C pressure). While, the processing advances to step 203 in response to an affirmative determination (Yes) as the assist brake mode at which the assist to the brake force is necessary. Then, the W/C pressure corresponding to pedal pressure applied to the brake pedal 2 is calculated based on a relationship between pedal pressure and target W/C pressure at the assist brake mode. For example, as shown in FIG. 3, the target W/C pressure is set so that the W/C pressure will be seven times plus 3 MPa as the pedal pressure (or the M/C pressure).

Next, the processing advances to step 204, whether the amplifying piston bypass change is executed or not is determined. Namely, whether the pipeline A1 or A2 is selected as the pressurizing path is determined. This processing is determined by a flag or the like that is set when the amplifying piston bypass change is executed at amplifying piston bypass change processing (See step 108) mentioned later.

The processing advances to step 205 in response to a negative determination (No), and a control target pressure (differential pressure) ΔP necessary for the linear valve 17 is calculated when the amplifying piston bypass change is not executed, that is, when the pipeline A1 is selected as the pressurizing path. In this case, the control target pressure ΔP is calculated based on a predetermined relationship between the M/C pressure and the discharge pressure by the pump 8 shown in FIG. 3. Because both sides of brake pressure of the linear valve 17 correspond to the M/C pressure and the discharging pressure of the pump 8.

On the other hand, the processing advances to step 206 in response to an affirmative determination, and a control target pressure (differential pressure) ΔP necessary for the linear valve 17 is calculated when the amplifying piston bypass change has been executed, that is, the pipeline A2 is selected as the pressurizing path. In this case, the control target pressure ΔP is calculated based on a predetermined relationship between the M/C pressure and the W/C pressure shown in FIG. 3. Because both sides of brake pressure of the linear valve 17 correspond to the M/C pressure and the W/C pressure.

Then, the processing advances to step 207, and a current amount (target current) to the linear valve 17, which is necessary to realize the control target pressure ΔP calculated at steps 205, 206, is calculated. For example, a relationship between the current amount to the linear valve 17 and the differential pressure generated by the linear valve 17 is shown in FIG. 3. Therefore, the target amount that corresponds to the control target pressure ΔP is calculated based on its relationship.

Next, at step 208, a battery voltage input calculation for calculating battery voltage is executed. Then, the processing advances to step 209, the duty ratio of current to the linear valve 17 is calculated based on the target current calculated at step 207 and a relationship between the target current and battery voltage. Namely, the higher the battery voltage is, the shorter the required time for providing a current to the linear valve 17. Thus, the duty ratio is adjusted depending on the battery voltage. Then, the processing advances to step 210, and the current corresponding to the duty ratio calculated at step 209 is applied to the linear valve 17.

At step 211, a feedback current from the linear valve 17 is calculated. For example, the feedback current is calculated by inputting a voltage between both sides of the resistance, which is connected in series to the coil of the linear valve 17 for detecting current amount, to the CPU of the brake control ECU 1.

Next, the processing advances to step 212, the calculated feedback current and the target current calculated at step 207 are compared with each other, and whether both of them are coincident with each other or not is determined. Then, the processing advances to an end if the feedback current is the target current, the processing advances to step 213 if the feedback current is not the target current. At step 213, a duty ratio revision calculation is executed. In this processing, a deviation ΔA between the feedback current and the target current is calculated, a current amount (ΔAxk) applied to the linear valve 17 that is necessary to compensate the deviation ΔA is calculated, and a duty ratio revision amount of the current to the linear valve 17 is calculated. Next, a duty ratio amendment output is executed. Namely, the calculated current based on the calculated duty ratio is applied to the linear valve 17. Then, the processing advances to an end after the real W/C pressure and target brake pressure become coincident with each other.

After the linear valve control processing is over, the processing advances to step 107 to calculate the W/C pressure based on the sensing signal from the W/C sensor 20. Then the processing advances to step 108 to execute a amplifying piston bypass change processing, that is, a valve position change processing of the first and second control valves 10, 11. This amplifying piston bypass change processing is shown in FIG. 4.

Figure 4:
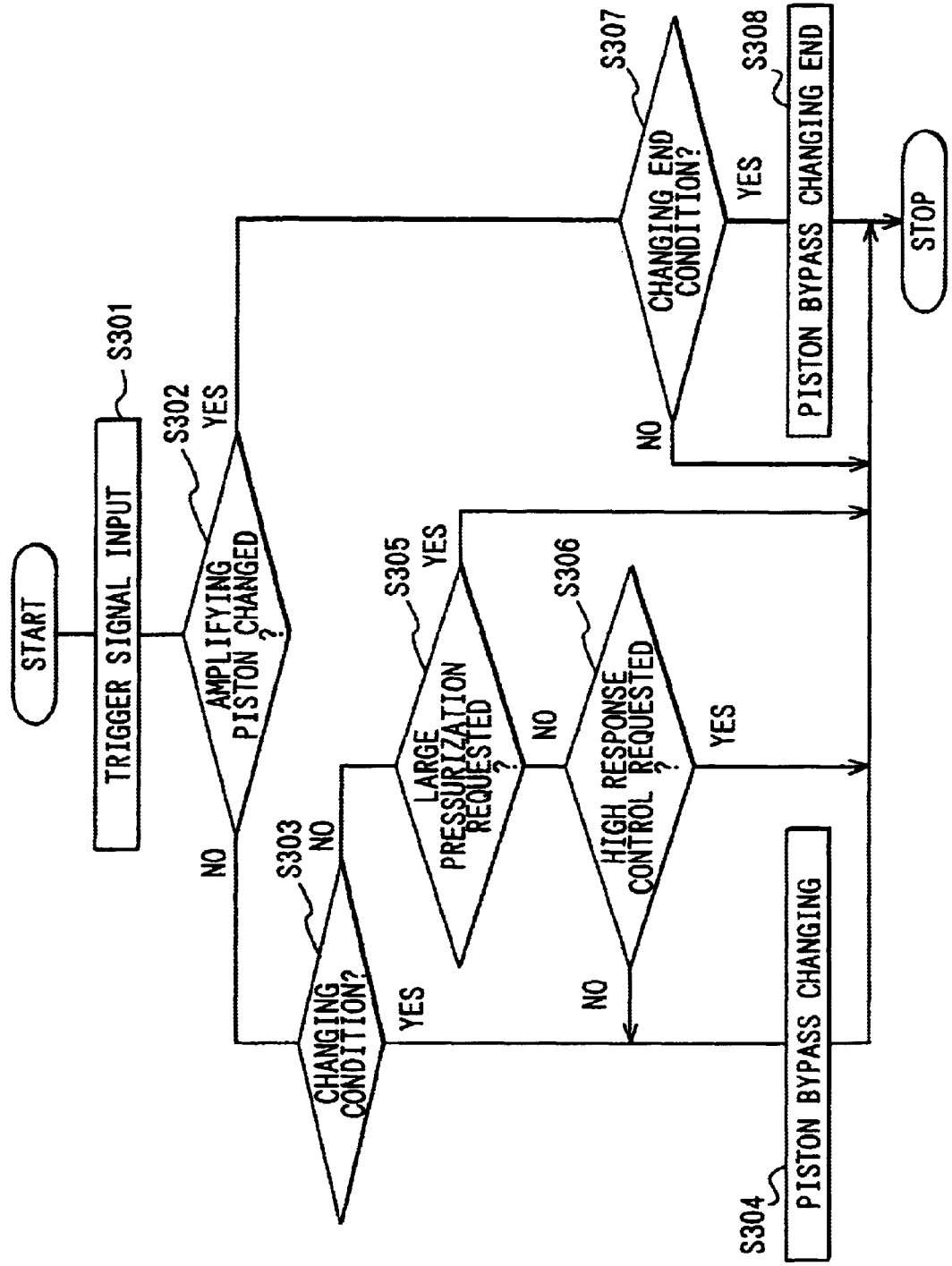
FIG. 4 is a flowchart showing a process executed at step 108 of FIG. 2.

As shown in FIG. 4, at step 301, changing trigger sensing signal input calculation is executed based on the each input signal from the each of sensors 18–21, 24. In this processing, various kinds of calculation for determining a change timing of the pressurizing path, i.e., the pipeline A1 or A2, are executed. For example, the W/C pressure, the M/C pressure, the differential pressure between the W/C pressure and the M/C pressure, the differential pressure between the discharge pressure by the pump 8 and the W/C pressure, the pedal pressure of the brake pedal 2, the rotation number of the motor 7, an input current to the motor 7, a stroke of the step piston 9a, an input current to the linear valve 17, the duty ratio of the current to the linear valve 17, and the like, are calculated.

The discharge pressure by the pump 8 is calculated based on the duty ratio of the current to the linear valve 17 because the discharge pressure has correlation with the duty ratio of current. The input current to the motor 7 is calculated based on a motor target current that is calculated at a motor rotation number control processing (See step 405 shown in FIG. 5). The other calculations are calculated based on the sensing signals from various sensors 18–21, 24.

Next, at step 302, whether the amplifying piston 9 is changed or not, that is, whether or not the pipeline A2 is selected as the pressurizing path is determined. The processing advances to step 303 in response to a negative determination (No). For example, the negative determination is evolved when the pipeline A1 is selected as the pressurizing path because the amplifying piston bypass change processing (See step 304) has not been executed yet.

At step 303, whether an amplifying piston bypass changing condition is satisfied or not is determined. Specifically, the W/C pressure>predetermined pressure X1, the discharge pressure of the pump 8>predetermined pressure X2, the differential pressure between the W/C pressure and the M/C pressure>predetermined pressure X3, the differential pressure between the discharge pressure of the pump 8 and the W/C pressure>predetermined pressure X4, the M/C pressure>predetermined pressure X5, the pedal pressure of the brake pedal 2>predetermined pressure X6, the rotation number of the motor 7>predetermined number X7, an input current to the motor 7>predetermined amount X8, stroke of the step piston 9a>predetermined length X9, an input current to the linear valve 17>predetermined amount X10, the duty ratio of the current to the linear valve 17>predetermined value X11, and the like are corresponding to the conditions. When at least one of the conditions is satisfied, the affirmative determination is evolved.

The processing advances to step 304 in response to an affirmative determination (Yes). Then, the first control valve 10 is set to the differential pressure position, and the second control valve 11 is set to the open position. Moreover, after setting the flag indicating that the amplifying piston bypass change processing is executed, the processing advances to an end. If this processing is achieved, the affirmative determination is evolved at step 204 when the linear valve control processing is executed thereafter.

On the other hand, the processing advances to step 305 in response to a negative determination (No), and whether a pressurizing requirement at the normal braking is large or not is determined. Namely, at the normal braking, if the requirement is not large, high responsiveness to a brake fluid pressure is not desired. Accordingly, in this case, the brake control ECU 1 selects the pipeline A2 as the pressurizing path. Specifically, the differential pressure between the target W/C pressure and real W/C pressure>predetermined pressure X12, an increase ingredient of the pedal pressure of the brake pedal 2>predetermined value X13, an increase ingredient of the W/C pressure>predetermined value X14, and an increase ingredient of the M/C pressure>predetermined value X15 are the conditions of this processing. When at least one of the conditions is satisfied, an affirmative determination (Yes) is evolved. The target W/C pressure is a target value of the W/C pressure to be required based on the pedal pressure of the brake pedal 2 and is calculated by the brake control ECU 1.

In this processing, if the affirmative determination is evolved, the pipeline A1 is maintained as the pressurizing path and this processing ends. On the other hand, the processing advances to step 306 in response to a negative determination (No), and whether high pressurize response control is required or not is determined. This determination is executed based on the requirement for starting a TCS control, a vehicle stability control or an assist control to the brake force, that is, an urgency brake control to be executed based on a vehicle behavior. For example, the requirement is judged based on the calculation results of the sensing signals from the vehicle condition sensor 25 or the wheel speed sensors 22, 23. Whether the high pressurize response control is required or not can be determined based on the flag that is set when the urgency control is executed.

The processing advances to step 304 in response to a negative determination (No) at step 306, and the pipeline A2 is selected as the pressurizing path as mentioned-above and, then, the processing advances to an end. On the contrary, the processing advances to end in response to an affirmative determination (Yes). In this case, the pipeline A1 is maintained as the pressurizing path.

The processing advances to step 307 in response to a negative determination (No) at step 302. Then, whether the amplifying piston bypass change conclusion condition is satisfied or not is determined. Specifically, the W/C pressure<predetermined pressure X1, the discharge pressure by the pump 8<predetermined pressure X2, the differential pressure between the W/C pressure and the M/C pressure<predetermined pressure X3, the differential pressure between the discharge pressure of the pump 8 and the W/C pressure<predetermined pressure X4, the M/C pressure<predetermined pressure X5, the pedal pressure of the brake pedal 2<predetermined pressure X6, the rotation number of the motor 7<predetermined number X7, the input current to the motor 7<predetermined amount X8, the stroke of the step piston 9a<predetermined length X9, the input current to the linear valve 17<predetermined amount X10, the duty ratio of the current to the linear valve 17<predetermined value X1, and the like are the conditions. When at least one of the conditions is satisfied, the affirmative determination is evolved. Incidentally, these conditions are opposite to the conditions at step 303.

The processing advances to an end in response to a negative determination (No). In this case, the pipeline A2 is maintained as the pressurizing path. On the other hand, the processing advances to step 308 in response to an affirmative determination (Yes) to execute the amplifying piston bypass change conclusion processing. Namely, the first control valve 10 is set to the open position, and the second control valve 11 is set to the differential pressure position, thereby selecting the pipeline A1 as the pressurizing path again. Then, the processing advances to an end. If this processing is achieved, the negative determination is evolved at step 204 when above-mentioned linear valve control processing is executed thereafter.

After the amplifying piston bypass change processing, steps 109, 110 determine whether a condition for limiting a rotation number of the motor 7 at a motor rotation restriction processing (See step 111) is satisfied or not.

At step 109, whether brake fluid pressurization according to a depressing state of the brake pedal 2 is required or not is determined. This determination is made by comparing the pedal pressure or the M/C pressure calculated at step 103 with the previous calculation result. The processing advances to step 110 in response to a negative determination (No), while returning to step 102 in response to an affirmative determination (Yes). At step 110, whether the W/C pressure is increasing or not is determined. This process determination is made by comparing the W/C pressure calculated at step 107 with the previous calculation result. Then, the processing advances to step 111 in response to a negative determination (No), while returning to step 102 in response to an affirmative determination (Yes).

That is, it is necessary to further increase the W/C pressure when the brake fluid pressurization according to the depressing state of the brake pedal 2 is required or when the W/C pressure is increasing. Therefore, the processings mentioned-above is used to determine whether the condition for limiting the rotation number of the motor 7 is satisfied or not. If the condition is not satisfied, the motor 7 is rotated continuously.

Figure 5:
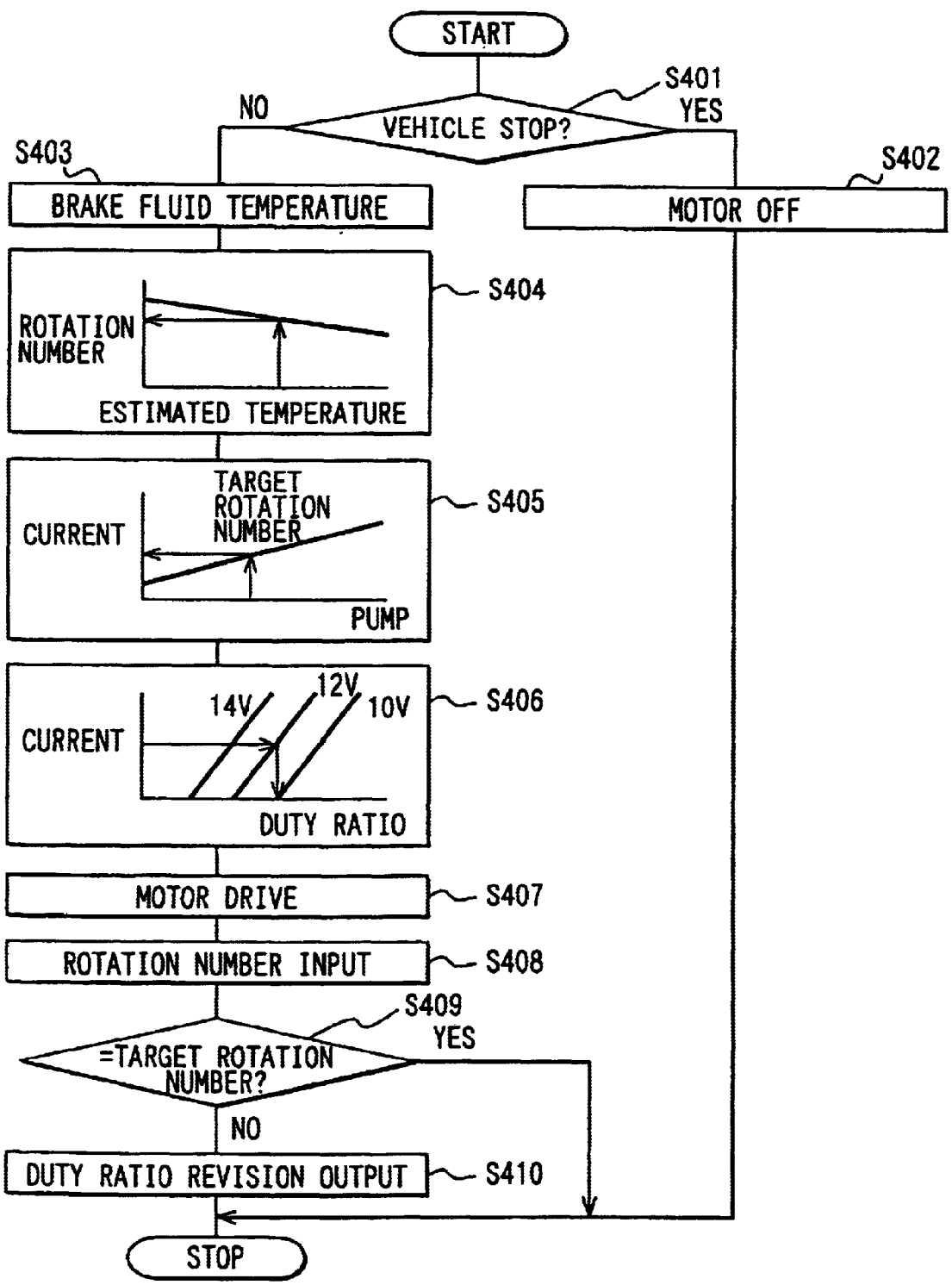
FIG. 5 is a flowchart showing a process executed at step 111 of FIG. 2.

Next, the processing advances to step 111 to execute the motor rotation number control processing. FIG. 5 shows a flow chart of this processing.

First, at step 401, whether the vehicle is stop or not is determined. If an affirmative determination is evolved, the increase of the W/C pressure by the pump 8 for stopping the vehicle is unnecessary. Therefore, the processing advances to step 402 to stop the motor 7, and, then, the processing advances to an end. While, if negative determination is evolved, the processing advances to step 403 to estimate temperature of the brake fluid. For example, this temperature is estimated based on coolant temperature of the engine, which is detected by the vehicle condition sensor 25.

At step 404, the target rotation number of the motor 7, which is required in order to discharge desired amount brake fluid from the pump 8 immediately when high pressurize response is required, is calculated based on a characteristic relationship between the brake fluid temperature and required rotation number as shown in FIG. 4. That is, viscosity of the brake fluid varies depending on its temperature, and a rising rate of rotation number of the motor 7 varies depending on the temperature of the brake fluid. As shown in FIG. 5, for example, the higher the temperature of the brake fluid is, the greater the required rotation number is. Accordingly, the required rotation number of the motor 7 depends on the estimated brake fluid temperature.

The processing advances to step 405, at which a target current to the motor 7 (motor target current) is calculated. Specifically, a relationship between the discharge pressure by the pump 8 and the motor target current at the target rotation number is calculated after the target rotation number is calculated at step 404. For example, the higher the discharge pressure by the pump 8 is, the higher the motor target current is required. Accordingly, the target motor current is calculated depending on the discharge pressure by the pump 8.

At step 406, a duty ratio of the current to the motor 7 is calculated based on the battery voltage calculated at step 208 in consideration of a relationship between the motor target current calculated at step 405 and the battery voltage. Namely, the higher the battery voltage is, the shorter a current applying time necessary for applying the motor target current to the motor 7 is. Therefore, the duty ratio calculation depends on the battery voltage. Then the processing advances to step 407, where the current corresponding to the duty ratio calculated at step 406 is applied to the motor 7.

At step 408, a real rotation number of the motor 7 is calculated based on the sensing signal from the rotation number sensor 21. Then, the processing advances to step 409 to determine whether or not the calculated real rotation number and the calculated target rotation number are coincident with each other. The processing advances to an end in response to an affirmative determination (Yes), while advancing to step 410 in response to a negative determination (No) to execute a duty ratio revision calculation. In this processing, a deviation between the calculated real rotation number and the calculated target rotation number is calculated, and, then, a required current to the motor 7 for revising the deviation is calculated. Further, the duty revision amount of current to the motor 7 is calculated based on the required current. After the duty ratio of the current to the motor 7 is calculated, a motor duty ratio revision output processing is executed. That is, a current depending on the calculated duty ratio is applied to the motor 7. If the real rotation number of the motor 7 is coincident with the target rotation number with this manner, the processing advances to an end.

Next, the processing advances to step 112 to determine whether or not the W/C pressure and the target W/C pressure are coincident with each other. The processing returns to step 102 in response to a negative determination (No), while advancing to step 113 in response to affirmative determination (Yes). At step 113, linear valve revision output is calculated. In this processing, a deviation ΔP between the real W/C pressure and the target W/C pressure is calculated, and the a required differential pressure amount by the linear valve 17 to revise the deviation ΔP is calculated. Further, the duty revision amount of current to the linear valve 17 is calculated based on the required differential pressure amount. After the duty ratio of the current to the linear valve 17 is calculated, the processing advances to step 114 to execute linear valve duty ratio revision output processing. That is, a current depending on the calculated duty ratio is provided to the linear valve 17. If the real W/C pressure is coincident with the target W/C pressure with this manner, the processing returns to step 112 to execute the various processing mentioned above repeatedly.

Figure 6:
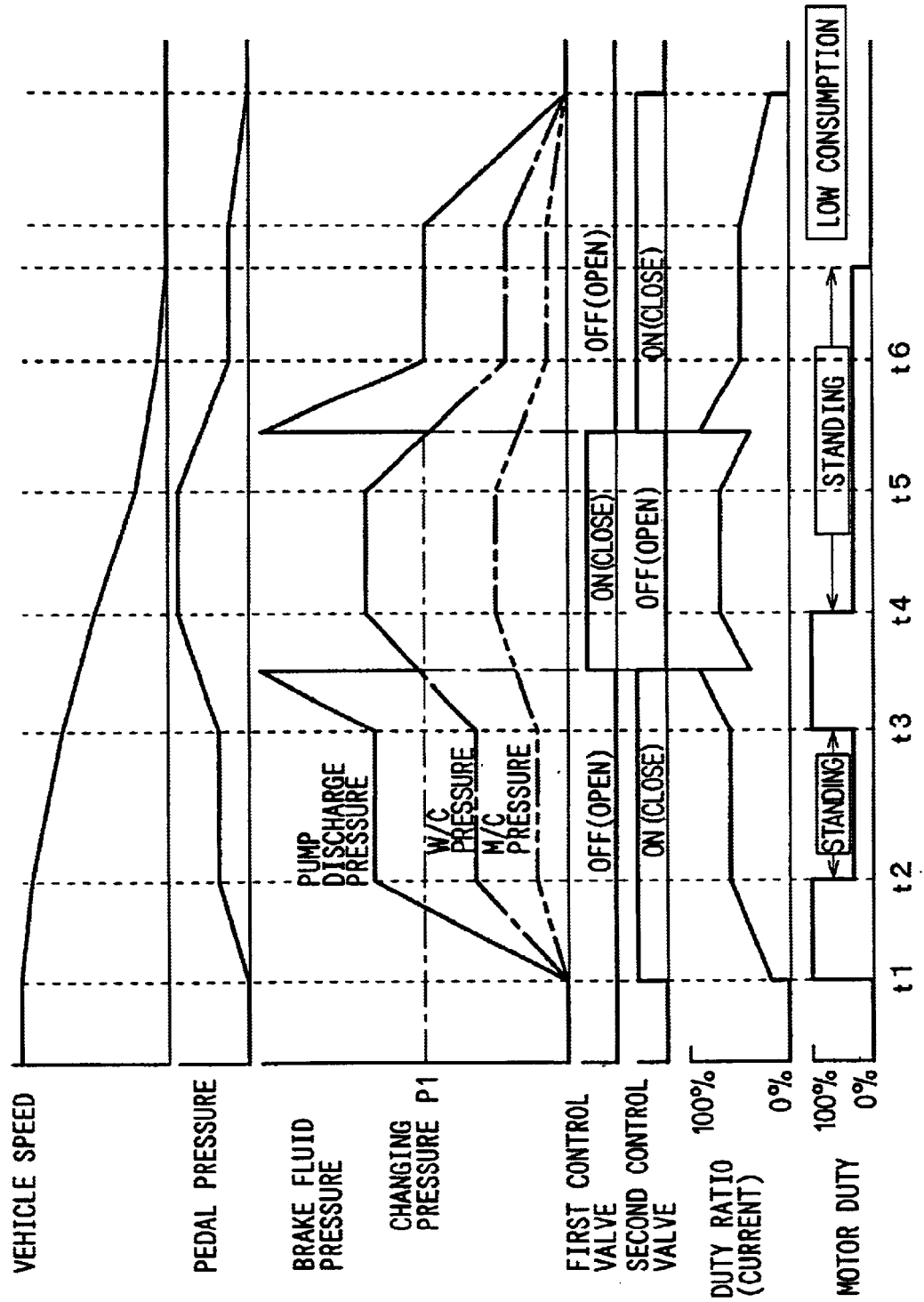
FIG. 6 is a timing diagram showing the operation of the brake system.

FIG. 6 is a timing diagram showing the operation of the brake system on executing the processings as shown in FIGS. 2–5. The vehicle speed calculated based on the sensing signal from the wheel speed sensors 22, 23, the pedal pressure of the brake pedal 2, the brake fluid pressure (the discharge pressure by the pump 8, the M/C pressure, and the W/C pressure), switchings of the first and second control valves 10, 11, the duty ratio of the current to the linear valve 17, and the duty ratio of the current to the motor 7 are shown in FIG. 6.

First, at W/C low pressure timing as shown in term t1–t2 when the pressure of the brake peal 2 is just starting, the first control valve 10 is set OFF (open condition), and the second control valve 11 is set ON (differential pressure condition). Therefore, the pipeline A1 is selected as the pressurizing path. Further, the duty ratio of the current to the linear valve 17 is estimated based on the position of the first and second control valve 10, 11, and the differential pressure between the M/C 3 side and the discharge port of the pump 8 is generated by the linear valve 17. Accordingly, the amount of the brake fluid discharged by the pump 8 is amplified by the amplifying piston 9, and the amplified brake fluid whose volume is larger than that discharged by the pump 8 is supplied to the W/C 4, 5. Specifically, the fluid pressure corresponding to the brake fluid amount amplified by the pressure-receiving surface difference of the step piston 9a is generated at the W/C 4, 5. Thus, the W/C 4, 5 can be pressurized with high pressure response to the discharge pressure of the pump 8.

If the pedal pressure of the brake pedal 2 is maintained, as in term t2–t3, during a period when the pipeline A1 is selected as the pressurizing path, the brake fluid pressure of each element of the brake piping is maintained in a state as shown in term t2. In this time, the relationship between the M/C pressure and the W/C pressure is maintained without stopping the motor 7 in this embodiment (standing condition), though the relationship can be maintained even if the motor 7 is stopped. Therefore, the discharge pressure by the pump 8 is maintained so that the high pressure response can be realized when the pedal pressure of the brake pedal 2 increases again thereafter.

Next, as in term t3–t4, if the pedal pressure of the brake pedal 2 increases again, and the brake fluid is provided to the W/C 4, 5 more fully than that discharged by the pump 8 in the same manner as term t1–t2. Then, at the W/C high pressure timing when the amplifying piston bypass change condition (See step 303) is satisfied, the amplifying piston change processing is executed. That is, the first control valve 10 is set ON (differential pressure condition), and the second control valve 11 is set OFF (open condition). Therefore, the pipeline A2 is selected as the pressurizing path. Further, the duty ratio of the current to the linear valve 17 is estimated based on the positions of the first and second control valve 10, 11, and the differential pressure between the M/C 3 side and the discharge port side of the pump 8 is generated by the linear valve 17. Accordingly, the discharge pressure of the pump 8 becomes the W/C pressure because the discharge port side of the pump 8 communicates with the W/C 4, 5.

If the pedal pressure of the brake pedal 2 is maintained as in term t4–t5 during a period when the pipeline A2 is selected as the pressurizing path, the brake fluid pressure of each element of the brake piping is maintained similarly as in term t4. In this time, the brake control ECU 1 does not let the motor 7 stop as in the term t2–t3. Therefore, the high pressure response also can be realized if the pedal pressure of the brake pedal 2 increases again thereafter.

Next, if the pedal pressure of the brake pedal 2 reduces as in term t5–t6, the duty ratio of the current to the linear valve 17 is estimated based on the reduced pedal pressure. As a result, the brake fluid pressure of each element of the brake piping is reduced. In this time, at the W/C pressure timing when an amplifying piston bypass change end condition (See step 307) is satisfied, the first control valve 10 is set OFF (open condition), and the second control valve 11 is set ON (differential pressure condition). Then the pipeline A1 is selected as the pressurizing path. Therefore, the discharging brake fluid amount from the pump 8 is amplified by the amplifying piston 9, and the W/C pressure can increase with high pressure response to discharge pressure of the pump 8 as in term t1–t2.

Then, if the pedal pressure of the brake pedal 2 is maintained or reduced, the duty ratio of the current to the linear valve 17 is estimated based on the maintained or reduced pedal pressure. As a result, the brake fluid pressure of each element is reduced. Then, if the vehicle stops and the depression to the brake pedal 2 stops, the brake fluid pressure of each element of the brake piping becomes zero. During a period when pedal pressure of the brake pedal 2 is reduced, the brake control ECU 1 does not lets the motor 7 stop (standing condition). However the brake control ECU 1 let the motor 7 stop when the vehicle speed is zero (See step 402). Therefore, current consumption (electric power consumption) is saved after the vehicle stops.

As described above, in the brake system of this embodiment, the differential pressure between the M/C pressure and the W/C pressure is generated by adjusting the duty ratio of the current to the linear valve 17. Therefore, the brake system having a hydraulic booster as mentioned above can realize without maintaining the high pressure constantly by the high capacity accumulator.

Additionally, the pipeline A1 provided to a amplifying piston 9 is selected as the pressurizing path at the W/C low pressure timing. The pipeline A2, which can directly transmit discharge pressure of the pump 8 to the W/C 4, 5, is selected as the pressurizing path at the W/C high pressure timing. Accordingly, the brake system in this embodiment has high pressure response only with the pump 8 at an urgency brake control timing, and, further, has a feature for boosting up the amount of brake fluid discharged from the pump 8 at normal braking control timing.

The brake system in this embodiment can realize boost up feature is use of the pump 8, the linear valve 17, the pipeline A1 with the amplifying piston 9, and the pipeline A2 without the amplifying piston 9. Therefore, even in the electric vehicle that cannot use engine vacuum, the boost up feature is realized in use of a simple and reliable brake system based on the conventional hydraulic brake piping. Moreover, the motor 7 can be used within the preferable efficiency region by switching the pressurizing path between W/C low pressure timing and W/C high pressure timing. Therefore, the brake system can endure not only the use in the urgency brake control but also a highly frequent use in the normal brake control.

The brake fluid discharged by the pump 8 flows to spaces such as the first chamber 9b, and clearances near the seal member 9f, or the like. However, these spaces and clearances act as dampers. Accordingly, a pulsation generated by discharging brake fluid from the pump 8 can be absorbed by the spaces and clearances without employing an extra damper in the brake system.

Further, in the present brake system, the M/C 3 and the second chamber 9c are communicated via the pipeline B with the check valve 12. Therefore, if the rising rate of the W/C pressure, which is generated based on the discharge pressure of the pump 8, is slow, the W/C 4, 5 can be pressurized directly by the brake pressure generated at the M/C 3 via the pipeline B and the second chamber 9c.

Then, the minimum control range (i.e., pressure range corresponding to one unit to control) to use the linear valve 17 is estimated based on the amplifying ratio of the amplifying piston 9. Accordingly, sensitive control of the amplifying piston is available, so that control characteristics of the W/C pressure, in particular at W/C low pressure timing, can be improved.

The pipeline A2 is selected when the high pressure response is not desired during normal braking control in the pressure increase requirement is not so high, or during urgency braking control in which the high pressure response is not required (See steps 305, 306). However, the pipeline A1 maybe selected instead of the pipeline A2 so as to obtain the high pressure response.

Second Embodiment

Figure 7:
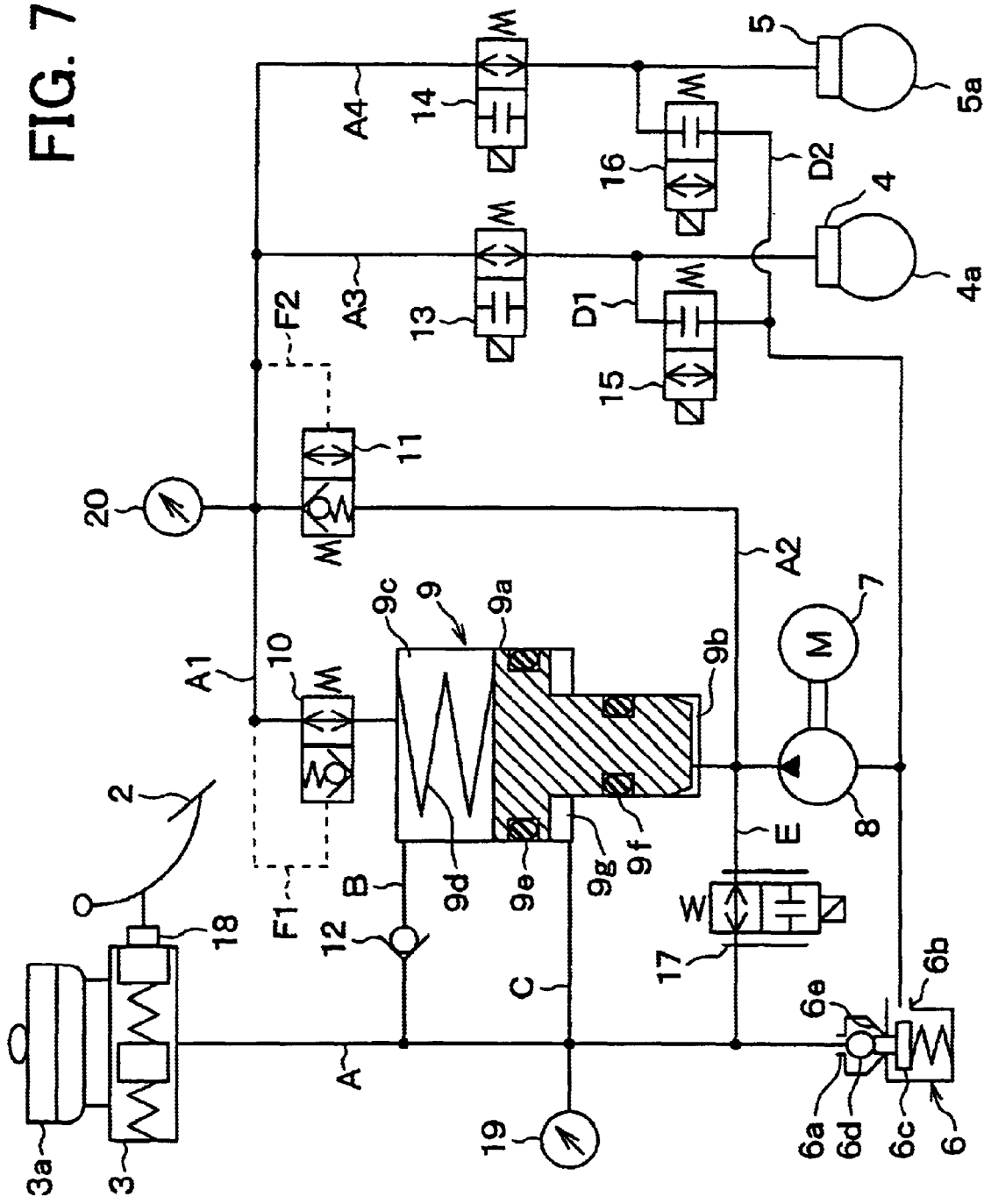
FIG. 7 is a schematic view of a brake system according to a second embodiment of the present invention.

FIG. 7 is showing a brake system according to second this embodiment. The first and second control valves 10, 11 are driven electrically in the first embodiment, but are driven mechanically in the second embodiment. The other elements of the second embodiment are similar to the first embodiment.

As shown in FIG. 7, the first and second control valves 10, 11 are driven by the brake fluid pressure in the pipeline A on the W/C 4, 5 side of the first and second control valves 10, 11 via the pipeline F1, F2. That is, the first and second valves 10, 11 are driven based on the W/C pressure. Specifically, the first and second control valves 10, 11 provided for the brake system as shown in FIG. 7 have valve constructions as shown in FIG. 8.

Figure 8:
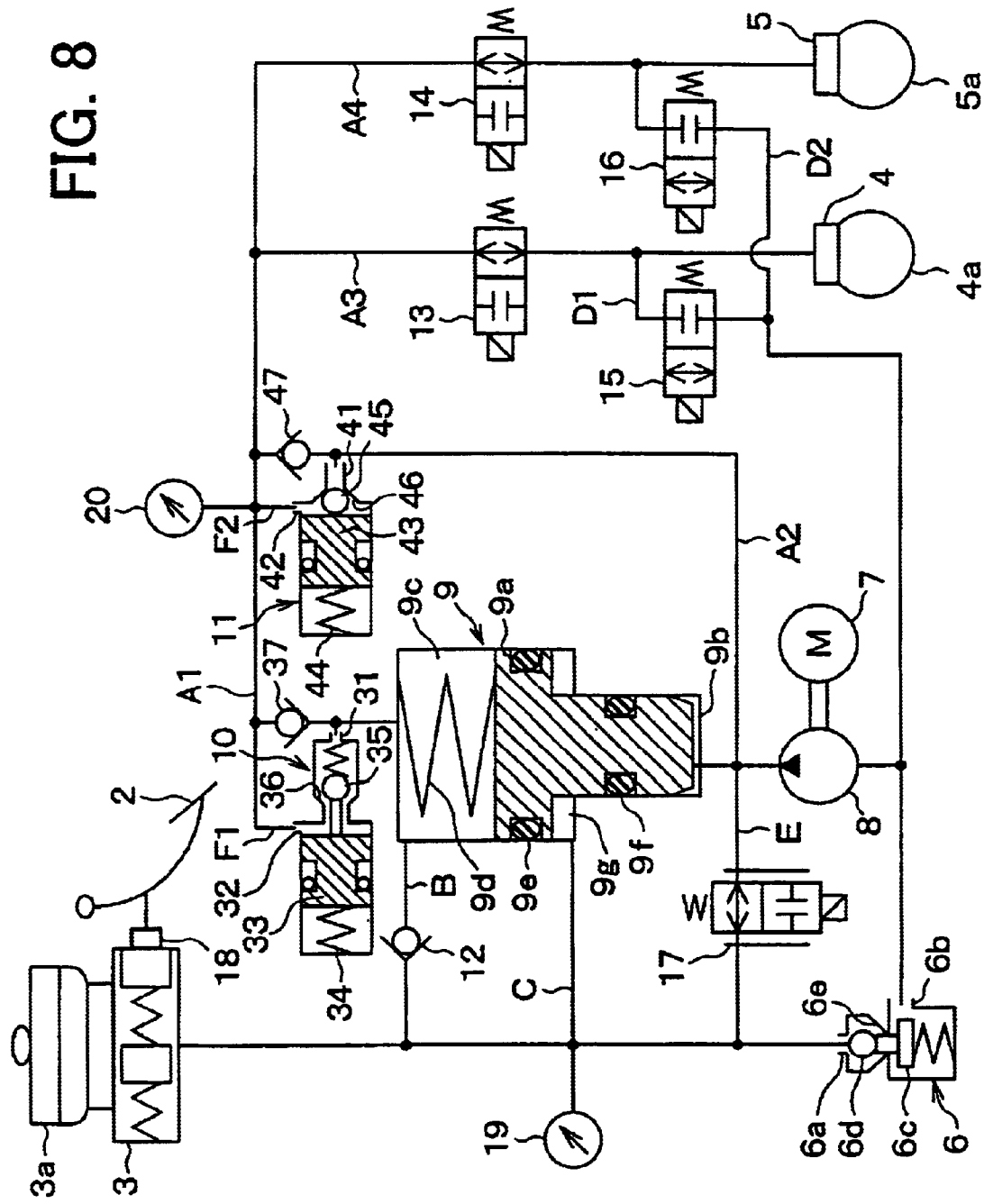
FIG. 8 is a schematic view of the brake system of FIG. 7, showing typically constructions of control valves.

As shown in FIG. 8, the first control valve 10 has first and second ports 31, 32, a piston 33, a spring 34, a valve element 35 and a valve seat 36. The valve element 35 moves in conjunction with the piston 33 and rests on the valve seat 35. The first port 31 is connected to the second chamber 9c side, and the second port 32 is connected to the W/C 4, 5 side. Further, the first control valve 10 has a check valve 37 that is arranged downstream (on the W/C 4, 5 side) from the first port 31 and allows the brake fluid to flow only from the second chamber 9c side to the W/C 4, 5 side. Accordingly, at the W/C low pressure timing, the first valve 10 is opened by a biasing force of a spring 34. On the other hand, at the W/C high pressure timing, the piston 33 slides against the force of the spring 34, and therefore the first valve 10 is closed by causing the valve element 35 to rest on the valve seat 36.

Further, the second control valve 11 has first and second ports 41, 42, a piston 43, a spring 44, a valve element 45 and a valve seat 46. The valve element 45 moves in conjunction with the piston 43 and rests on the valve seat 45. The first port 41 is connected to the discharge port side of the pump 8, and the second port 42 is connected to W/C 4, 5 side. Further, the second control valve 11 has a check valve 47 that is arranged downstream (on the W/C 4, 5 side) from the first port 41 and allows the brake fluid to flow only from the W/C 4, 5 side to the discharge port side of the pump 8. Accordingly, at the W/C low pressure timing, the second control valve 11 is closed because the valve element 45 rests the valve seat 46 by a force of a spring 44. on the other hand, at the W/C high pressure timing, the piston 43 slides against the force of the spring 44, and therefore the second control valve 11 is opened by leaving the valve element 45 from the valve seat 46.

In this embodiment, the first and second control valves 10, 11 are driven mechanically based on the W/C pressure, thereby obtaining the same advantage as the first embodiment.

There is a possibility , by an error of manufacturing, that the valve positions of the first and second control valves 10, 11 cannot change at the same timing according to the change of the W/C pressure between low and high pressure. However, even if the second control valve 11 is opened later than that the first control valve 10 is closed, the brake fluid in the second chamber 9c can escape to the W/C 4, 5 side via a check valve 37, when the W/C pressure changes low to high. On the other hand, even if the first control valve 10 is opened later than that the second control valve 11 is closed, the brake fluid on the W/C 4, 5 side can escape to the M/C 3 side via a check valve 47 and the linear valve 17.

Third Embodiment

FIG. 8 shows a brake system of third embodiment. The first and second control valves 10, 11 are driven based on the W/C pressure in the second embodiment, but are driven based on the discharge pressure of the pump 8 in the third embodiment. The other element of the third embodiment are similar to the second embodiment.

Figure 9:
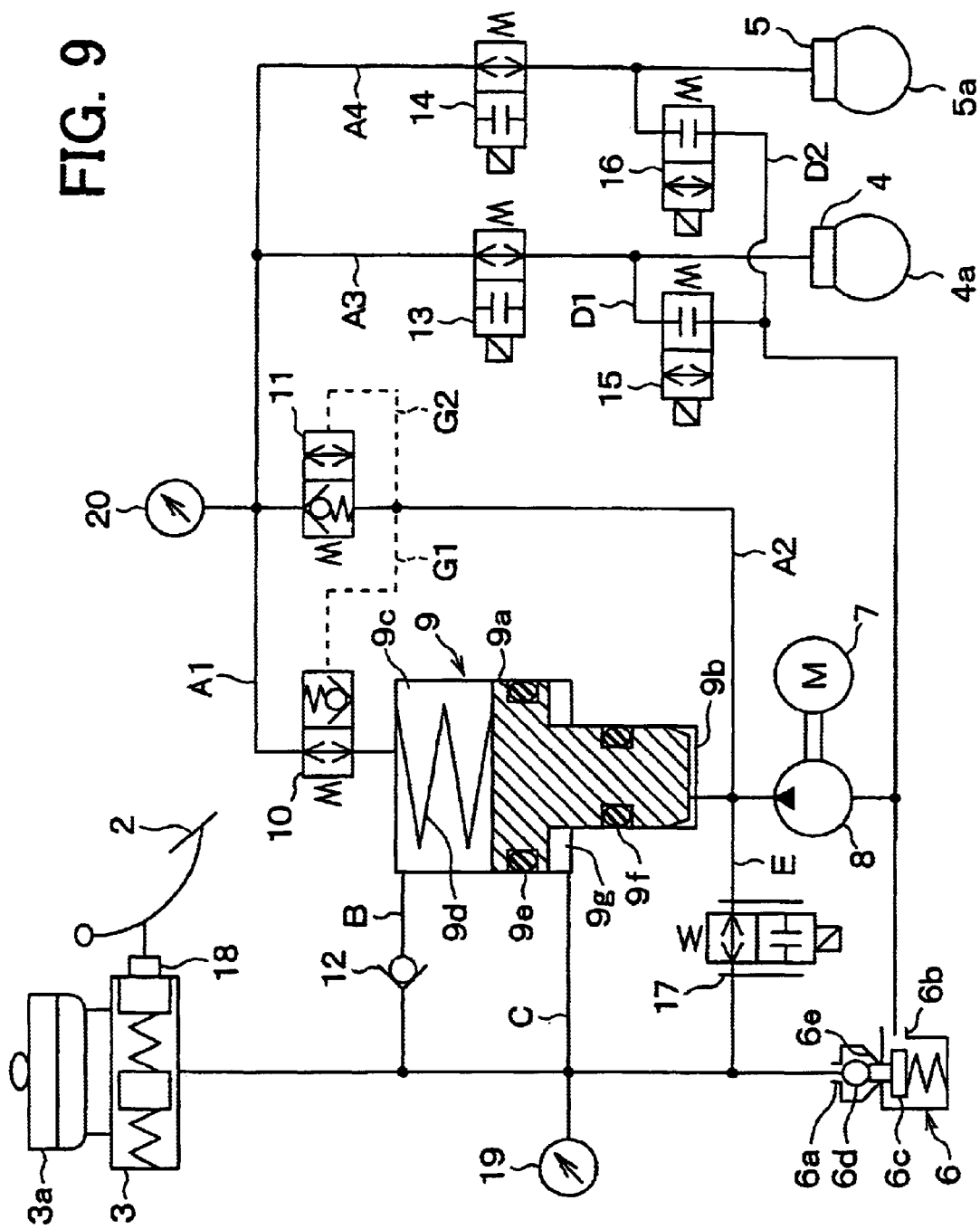
FIG. 9 is a schematic view of a brake system according to a third embodiment of the present invention.

As shown in FIG. 9, the discharge pressure of the pump 8 is introduced to the first and second control valves 10, 11 via respective pipelines G1, G2. Specifically, the first and second control valves 10, 11 provided to the brake system as shown in FIG. 9 have valve constructions as shown in FIG. 10.

Figure 10:
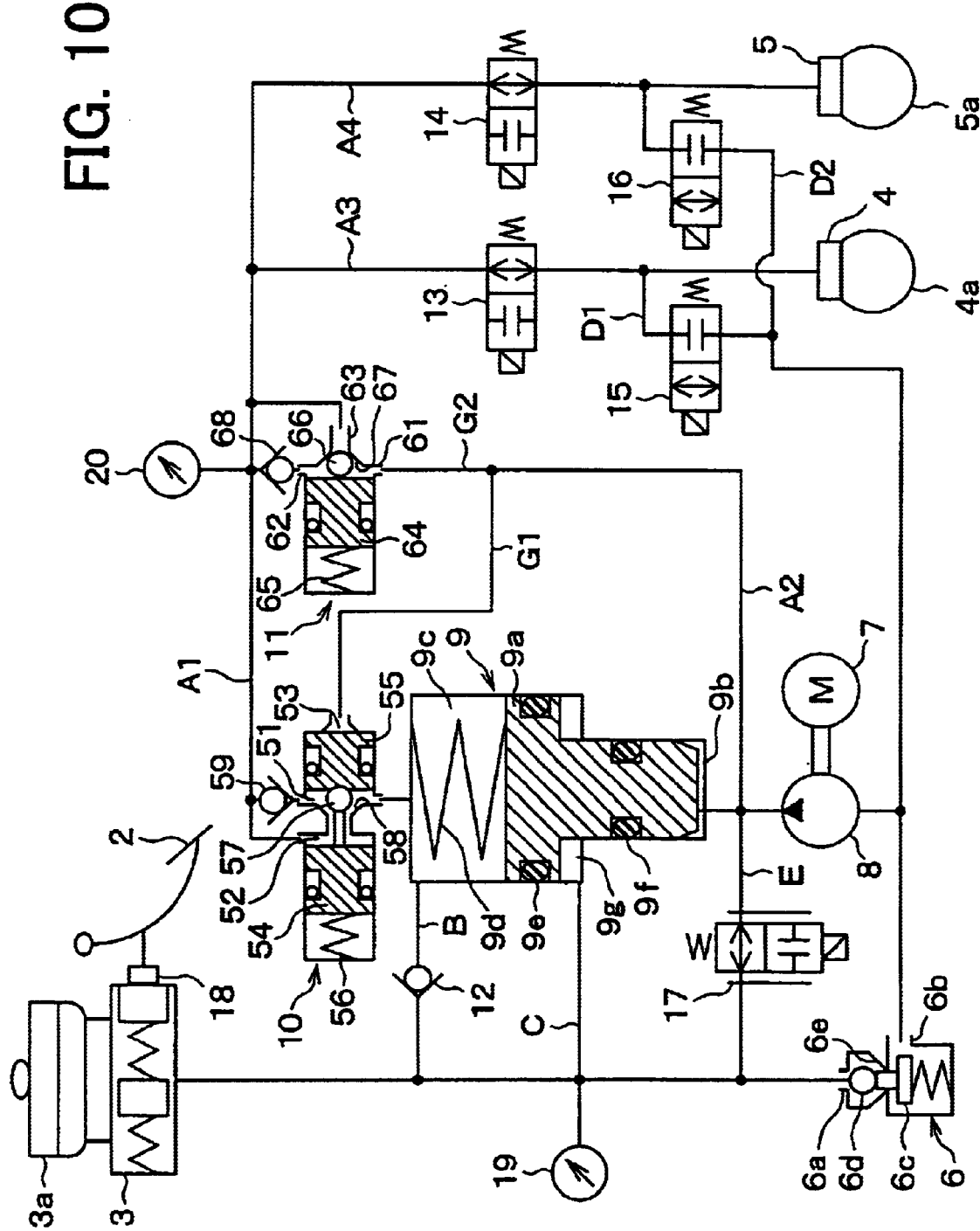
FIG. 10 is a schematic view of a brake system of FIG. 9, showing typically constructions of control valves.

As shown in FIG. 10, the first control valve 10 has a first chamber 51, a second chamber 52, a third chamber 53, a first piston 54, a second piston 55, a spring 56, a valve element 57 and a valve seat 58. The valve element 57 moves in conjunction with the first piston 54 and rests on the valve seat 58. The first chamber 51 is connected to the second chamber 9c side of the amplifying piston 9, the second chamber 52 is connected to the W/C 4, 5 side, and the third chamber 53 is connected with the discharge port side of the pump 8. Further, the first control valve 10 has a check valve 59 that is arranged downstream (on the W/C 4, 5 side) from the first chamber 51 and allows the brake fluid to flow only from the second chamber 9c side to the W/C 4, 5 side. Accordingly, at the W/C low pressure timing, the first valve 10 is opened by a biasing force of the spring 56. On the other hand, at the W/C high pressure timing, the first and second pistons 54, 55 slide against the force of the spring 56 because the discharge pressure communicated with the third chamber 53 becomes high, and therefore the first valve 10 is closed by causing the valve element 57 to rest on the valve seat 58.

Further, the second control valve 11 has a first port 61, a second port 62, a third port 63, a piston 64, a spring 65, a valve element 66, a valve seat 67 and a check valve 68. The valve element 66 moves in conjunction with the piston 64 and rests on the valve seat 67. The first port 61 is connected to the discharge port side of the pump 8, the second port 62 is connected to the W/C 4, 5 side via the check valve 68, and the third port 63 is connected to the W/C 4, 5 side. The check valve 68 is arranged downstream (on the W/C 4, 5 side) from the second port 62 and allows the brake fluid to flow only from the W/C 4, 5 side to the discharge port side of the pump 8. Accordingly, at the W/C low pressure timing, the second control valve 11 is closed because the valve element 66 rests on the valve seat 67 by a force of the spring 65. On the other hand, at the discharge pressure by the pump 8 is high, the piston 64 slides against the force of the spring 65, and therefore the second control valve 11 is opened by leaving the valve element 66 from the valve seat 67.

In this embodiment, the first and second control valves 10, 11 are driven mechanically depending on the discharge pressure of the pump 8, thereby obtaining the same advantages as the first embodiment.

Moreover, if the valve position of the first and second control valves 10, 11 cannot change at the same timing according to the change of the W/C pressure between low and high pressures, the brake fluid can be escaped similarly to the second embodiment by using the check valves 59, 68.

Forth Embodiment

Figure 11:
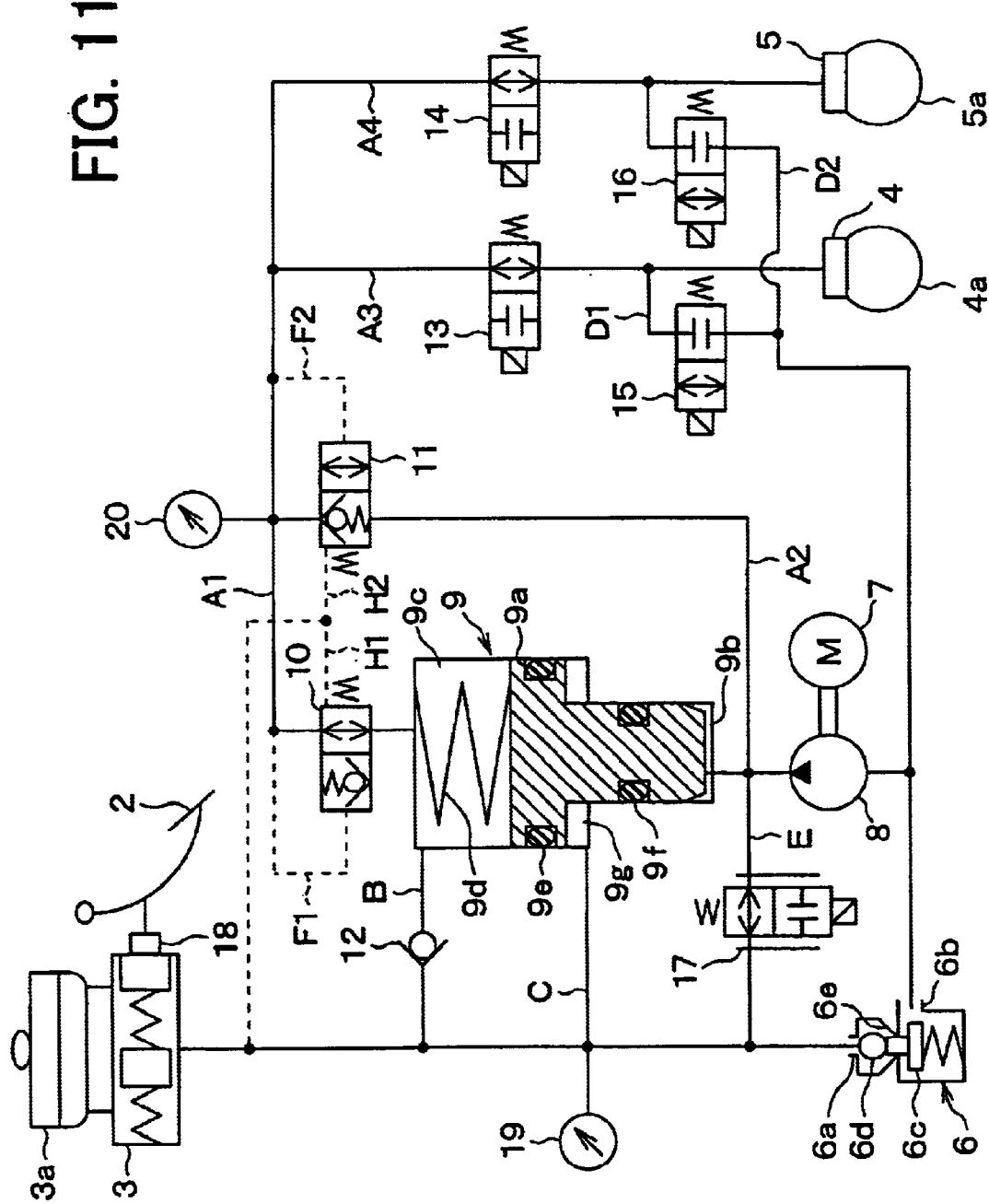
FIG. 11 is a schematic view of a brake system according to a fourth embodiment of the present invention.

FIG. 11 is showing a brake system of fourth embodiment. The first and second control valves 10, 11 are driven based on the differential pressure between the W/C pressure and the M/C pressure in this embodiment. The other elements are similar to the second embodiment.

As shown in FIG. 11, the W/C pressure and the M/C pressure are introduced to the first and second control valves 10, 11 via respective pipelines F1, F2, H1 and H2. Specifically, the first and second control valves 10, 11 provided to the brake system as shown in FIG. 11 have valve construction as shown in FIG. 12.

Figure 12:
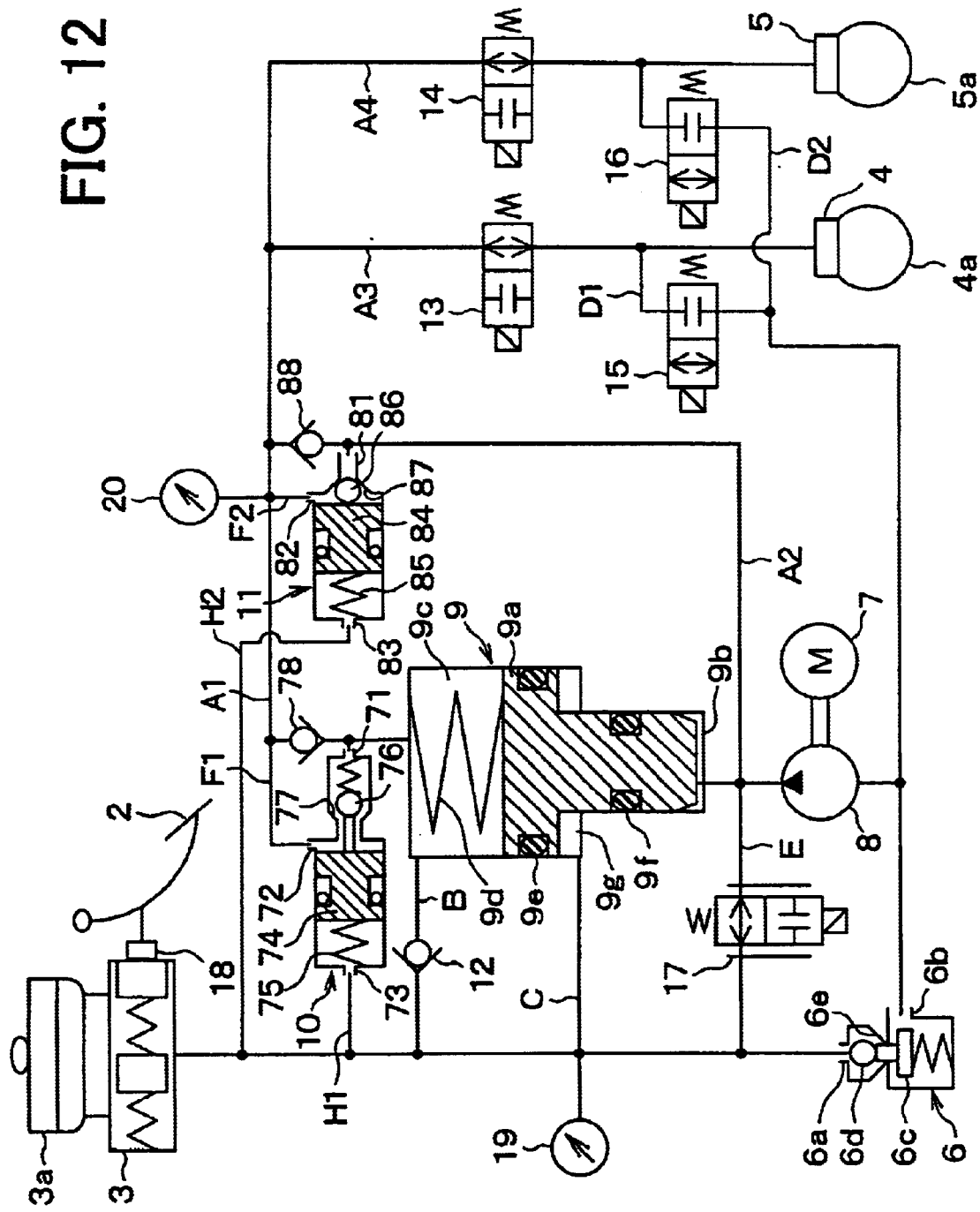
FIG. 12 is a schematic view of a brake system of FIG. 11, showing typically constructions of control valves.

As shown in FIG. 12, the first control valve 10 has a first port 71, a second port 72, a third port 73, a piston 74, a spring 75, a valve element 76 and a valve seat 77. The valve element 76 moves in conjunction with the piston 74 and rests on the valve seat 77. The first port 71 is connected to the second chamber 9c side, the second port 72 is connected to the W/C 4, 5 side, and the third port 73 is connected to the M/C 3 side. Further, the first control valve 10 has a check valve 78 that is arranged downstream (on the W/C 4, 5 side) from than the first port 71 and allows the brake fluid to flow only from the second chamber 9c side to the W/C 4, 5 side. Accordingly, at the W/C low pressure timing, the first valve 10 is opened by a force of a spring 75. On the other hand, at the W/C high pressure timing, the pistons 74 slides against the force of the spring 75 based on the differential pressure between the W/C pressure and the M/C pressure, and therefore the first valve 10 is closed by causing the valve element 76 to rest on the valve seat 77.

Further, the second control valve 11 has a first port 81, a second port 82, a third port 83, a piston 84, a spring 85, a valve element 86, and a valve seat 87. The valve element 86 moves in conjunction with the piston 84 and rests on the valve seat 87. The first port 81 is connected to the discharge port side of the pump 8, the second port 82 is connected to the W/C 4, 5 side, and the third port 83 is connected to the M/C 3 side. Further, the second control valve 11 has a check valve 88 that is arranged downstream (on the W/C 4, 5 side) from the first port 81 and allows the brake fluid to flow only from the W/C 4, 5 side to the discharge port side of the pump 8. Accordingly, at the W/C low pressure timing, the second control valve 11 is closed because the valve element 86 rests on the valve seat 87 by a force of a spring 85. On the other hand, at the W/C pressure high timing, the piston 84 slides against the force of the spring 85 based on the differential pressure between the W/C pressure and the M/C pressure, and therefore the second control valve 11 is opened by leaving the valve element 86 from the valve seat 87.

In this embodiment, the first and second control valves 10, 11 are driven mechanically based on the differential pressure between the W/C pressure and the M/C pressure, thereby obtaining the same advantages as the first embodiment.

Moreover, if the valve position of the first and second control valves 10, 11 cannot change at the same timing according to the change of the W/C pressure changes between low and high pressure, the brake fluid can be escaped similarly to the second embodiment by using the check valves 78, 88.

Fifth Embodiment

Figure 13:
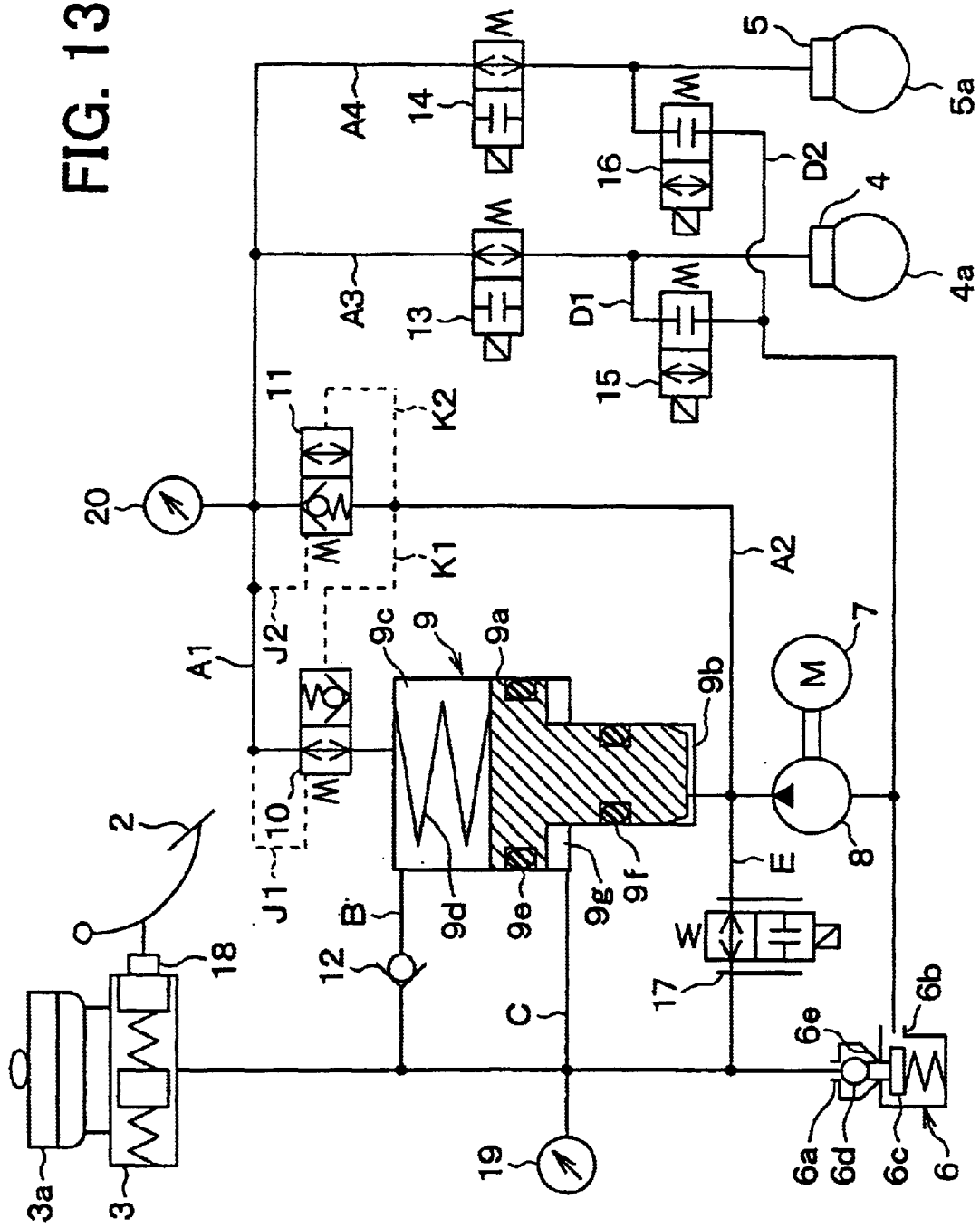
FIG. 13 is a schematic view of a brake system according to a fifth embodiment of the present invention.

FIG. 13 shows a brake system of fifth embodiment. The first and second control valves 10, 11 are driven based on the differential pressure between the discharging pressure by the pump 8 and the W/C pressure in this embodiment. The other elements are similar to the second embodiment.

As shown in FIG. 13, the W/C pressure and the discharge pressure of the pump 8 is introduced to the first and second control valves 10, 11 via respective pipelines J1, J2, K1 and K2. Specifically, the first and second control valves 10, 11 provided to the brake system as shown in FIG. 14 have valve construction as shown in FIG. 14.

Figure 14:
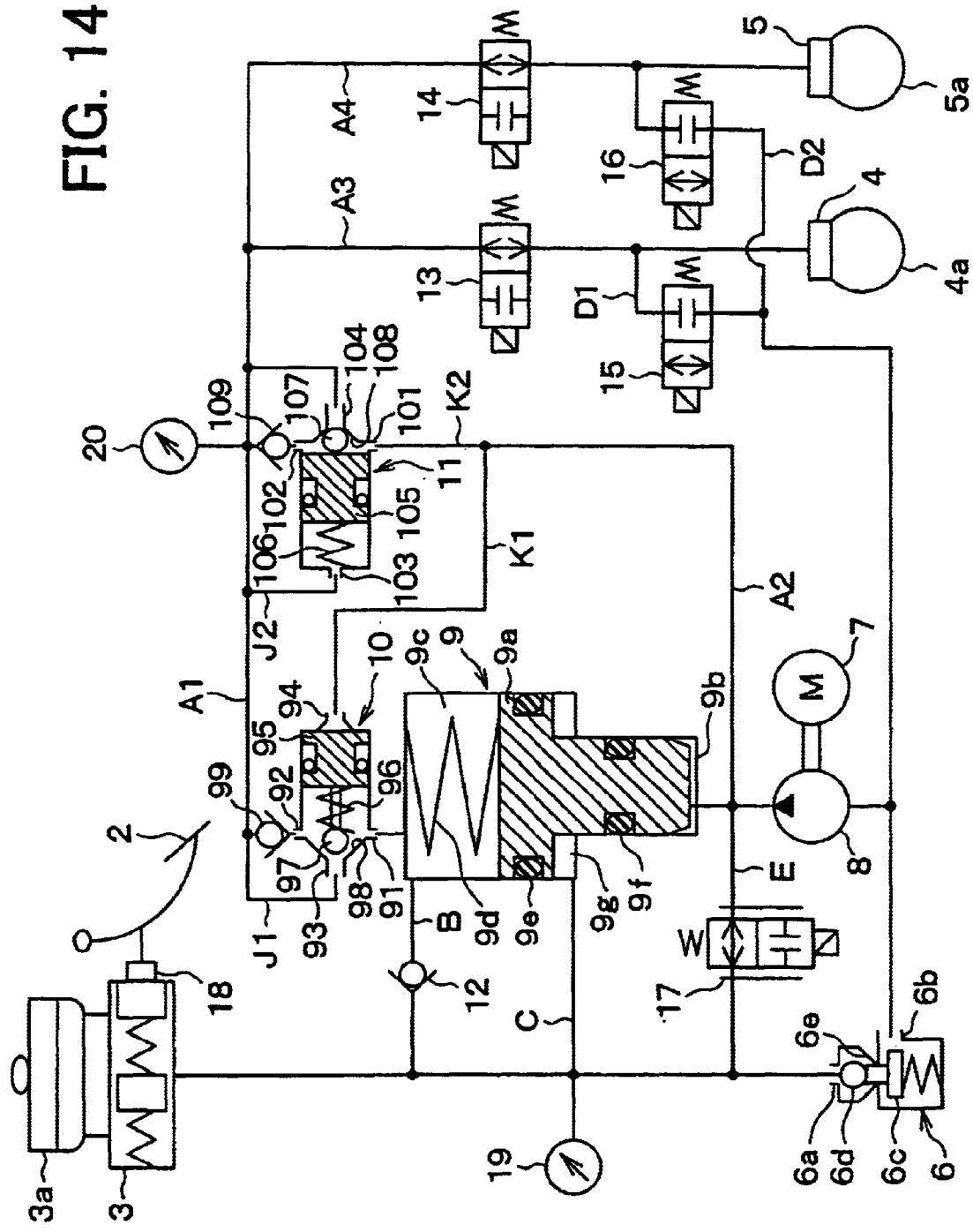
FIG. 14 is a schematic view of a brake system of FIG. 13, showing typically constructions of control valves.

As shown in FIG. 14, the first control valve 10 has a first port 91, a second port 92, a third port 93, a fourth port 94, a piston 95, a spring 96, a valve element 97, a valve seat 98 and a check valve 99. The valve element 97 moves in conjunction with the piston 95 and rests on the valve seat 98. The first port 91 is connected to the second chamber 9c side, the second port 92 is connected to the W/C 4, 5 side via the check valve 99, the third port 93 is connected to the W/C 4, 5 side, and the fourth port 94 is connected to the discharge port side of the pump 8. The check valve 99 is arranged downstream (on the W/C 4, 5 side) from the second port 92 and allows the brake fluid to flow only from the second chamber 9c side to the W/C 4, 5 side. Accordingly, at the W/C low pressure timing, the first valve 10 is opened by a force of a spring 96. On the other hand, at the W/C high pressure timing, the pistons 95 slides against the force of the spring 96 based on the differential pressure between the discharge pressure of the pump 8 and the W/C pressure, and therefore the first valve 10 is closed by causing the valve element 97 to rest on the valve seat 98.

Further, the second control valve 11 has a first port 101, a second port 102, a third port 103, a fourth port 104, a piston 105, a spring 106, a valve element 107, a valve seat 108 and a check valve 109. The valve element 107 moves in conjunction with the piston 105 and seats on the valve seat 108. The first port 101 is connected to the discharge port side of the pump 8, the second port 102 is connected to the W/C 4, 5 side via the check valve 109, and the third and the fourth ports 103, 104 are connected to the M/C 3 side. The check valve 109 is arranged downstream (on the W/C 4, 5 side) from the second port 109 and allows the brake fluid to flow only from the W/C 4, 5 side to the discharge port side of the pump 8. Accordingly, at the W/C low pressure timing, the second control valve 11 is closed because the valve element 107 rests on the valve seat 108 by a force of a spring 106. On the other hand, at the W/C pressure high timing, the piston 105 slides against the force of the spring 106 based on the differential pressure between the discharging pressure by the pump 8 and the W/C pressure, and therefore the second control valve 11 is opened by leaving the valve element 107 from the valve seat 108.

In this embodiment, the first and second control valves 10, 11 are driven mechanically based on the differential pressure between the discharge pressure of the pump 8 and the W/C pressure, thereby obtaining the same advantages as the first embodiment.

Moreover, if the valve position of the first and second control valves 10, 11 cannot change at the same timing according to the change of the W/C pressure changes between low and high pressure, the brake fluid can be escaped similarly to the second embodiment by using the check valves 99, 109.

Sixth Embodiment

Figure 15:
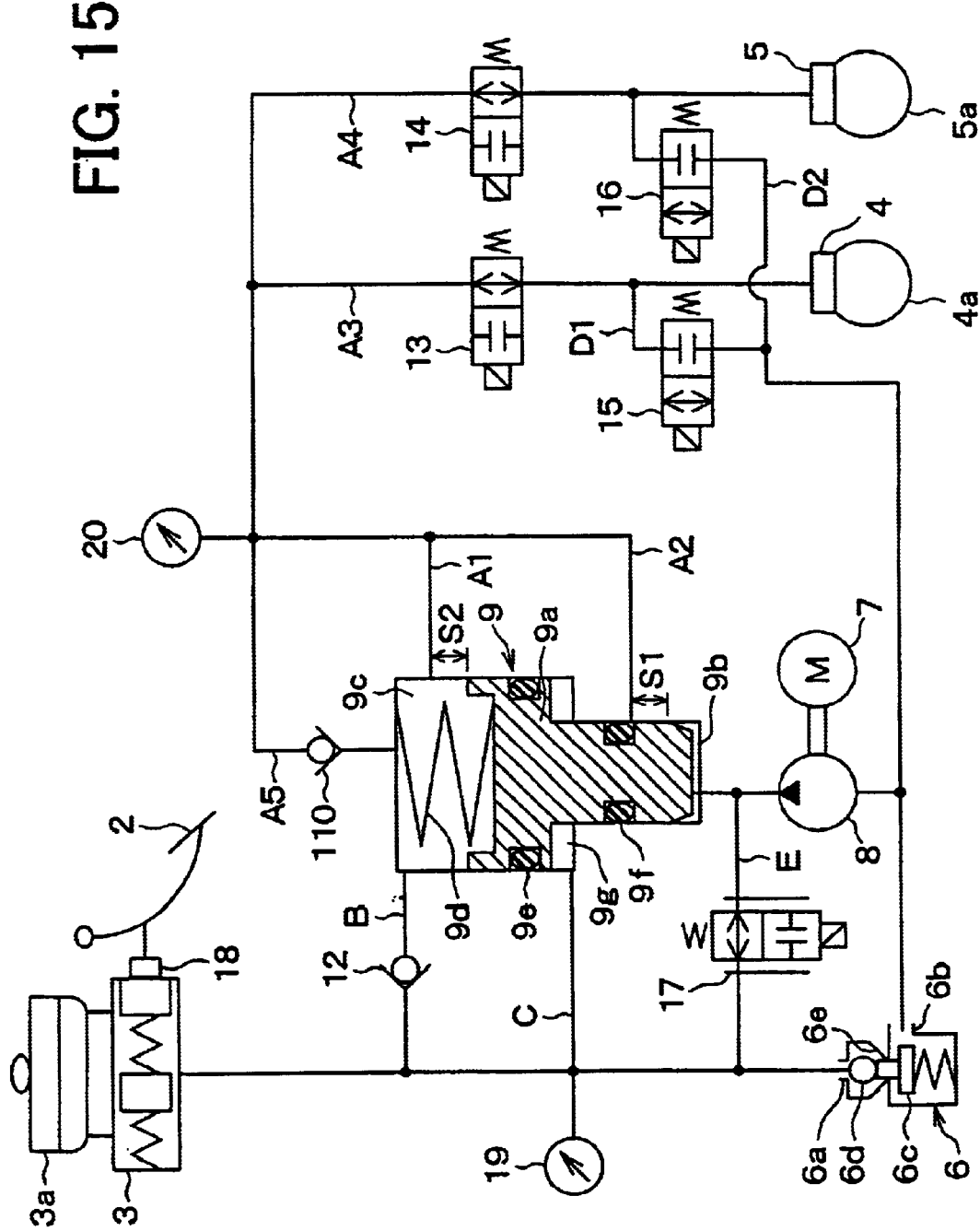
FIG. 15 is a schematic view of a brake system according to a sixth embodiment of the present invention.

FIG. 15 shows a brake system of sixth embodiment. In this embodiment, the amplifying piston 9 also plays a role of the first and second control valves 10, 11 shown in FIG. 1.

Specifically, the pipeline A1 is formed from the guide wall that accommodates the large diameter portion of the step piston 9a to the W/C 4, 5 side. The pipeline A2 is formed from the guide wall that accommodates the small diameter portion of the step piston 9a to the W/C 4, 5 side. The first and second control valves 10, 11, which are shown in FIG. 1, are not provided to the brake system in this embodiment. The second chamber 9c communicates with the W/C 4, 5 side at the low W/C pressure timing, and the first chamber 9b communicates with the W/C 4, 5 side at the high W/C pressure timing. That is, when the step piston 9a does not slide (before the discharge pressure of the pump 8 is not applied), a distance S1 is equal to or slightly longer than a distance S2. Where S1 is a distance from the most first chamber 9b side end of the facing region between the small diameter portion and the guide wall to the pipeline A2, and S2 is a distance from the most second chamber 9c side end of the facing region between the large diameter portion and the guide wall to the pipeline A1.

In this construction, the selection between the pipelines A1, A2 can be performed mechanically according to a sliding stroke of the amplifying piston 9, thereby obtaining the same advantages as the first embodiment.

The second chamber 9c is connected to the W/C 4, 5 via pipeline A5 provided in the brake system aside from the pipeline A2. A check valve 110 is employed in the pipeline A5, thereby allowing the brake fluid to flow only from the second chamber 9c side to the W/C 4, 5 side. Accordingly, even if the pipeline A1 is closed before the pipeline A2 is opened due to by an error of manufacturing, the brake fluid in the second chamber 9c can be escaped to the W/C 4, 5 side via a check valve 110.

Seventh Embodiment

Figure 16:
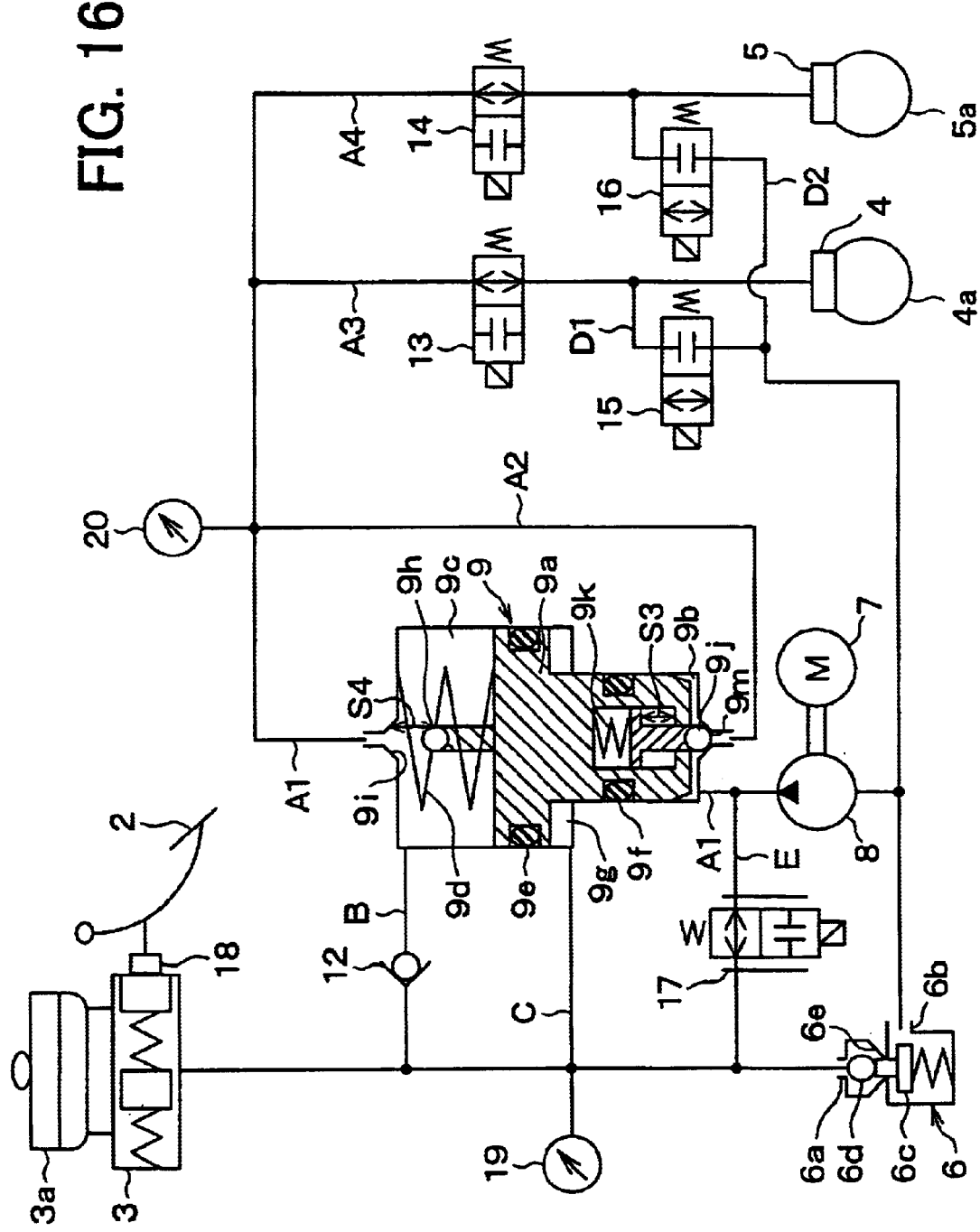
FIG. 16 is a schematic view of a brake system according to a seventh embodiment of the present invention.

FIG. 16 shows brake system of seventh embodiment. In this embodiment, the amplifying piston 9 also plays a role of the first and second control valves 10, 11 shown in FIG. 1 similarly to sixth embodiment.

Specifically, the pipeline A2 is formed to connect the first chamber 9b to the W/C 4, 5. The amplifying piston 9 has a valve element (a second valve element) 9h, a valve seat (a second valve seat) 9i, a valve element (a first valve element) 9j, a spring 9k, and a valve seat (a second valve seat) 9m. The valve element 9h is arranged at the large diameter portion. It moves in conjunction with the step piston 9a and rests on the valve seat 9i. The valve element 9j is arranged in the small diameter portion and is pushed toward the valve seat 9m by a force of a spring 9k. A lift amount S3 of the valve element 9j is equal to or slightly longer than a lift amount S4 of the valve element 9h.

In this construction, at the low W/C pressure timing, the second chamber 9c can communicate with the W/C 4, 5 side via the pipeline A1. Then, if the pump 8 discharges the brake fluid, the step piston 9a slides upward in FIG. 16. However, the valve element 9j is pushed in an opposite direction to the movement of the step piston 9a and rests on the valve seat 9m. Thus, the pipeline A2 maintains to be closed. Next, at the high W/C pressure timing, the valve element 9j leaves from the valve seat 9i and the valve element 9h rests on the valve seat 9i. Therefore, the pipeline A1 is controlled to a close condition, and the pipeline A2 is controlled to an open condition.

In this embodiment, the selection between the pipelines A1, A2 can be performed mechanically according to the sliding movement of the amplifying piston 9, thereby obtaining the same advantages as the sixth embodiment.

Eighth Embodiment

Figure 17:
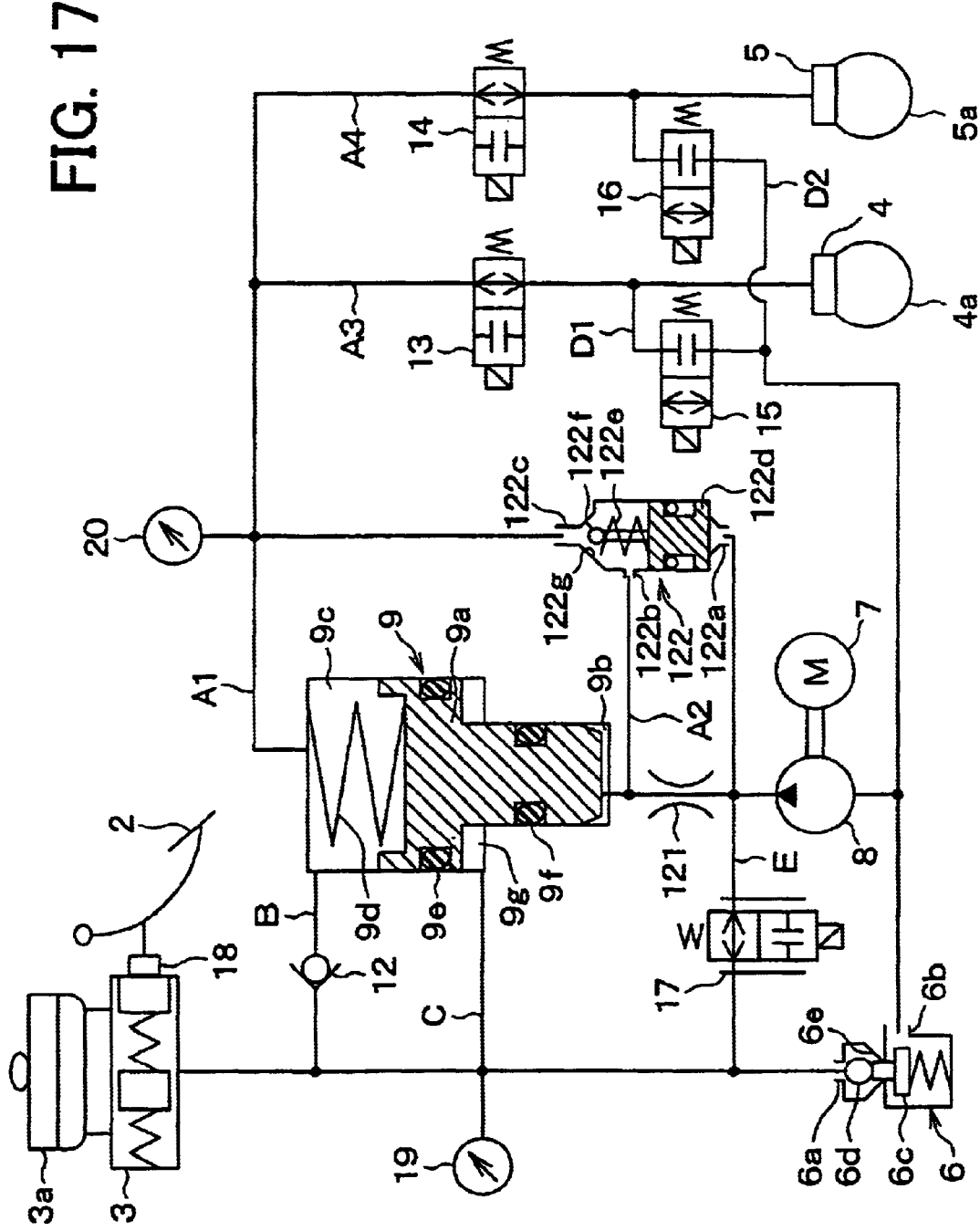
FIG. 17 is a schematic view of a brake system according to an eighth embodiment of the present invention.

FIG. 17 shows a brake system of eighth embodiment. In this embodiment, the different construction from the sixth or the seventh embodiment plays a role of the first and second control valves 10, 11 shown in FIG. 1.

Specifically, a restriction orifice 121 is provided between the discharge port side of the pump 8 and the first chamber 9b. Further, a bypass valve 122, which is driven based on the differential pressure between both sides of the restriction orifice 121, is employed in the pipeline A2. The bypass valve 122 has a first port 122a, a second port 122b, a third port 122c, a piston 122d, a spring 122e, a valve element 122f, and a valve seat 122g. The valve element 122f moves in conjunction with the piston 122d and rests on the valve seat 122g. The first port 122a is connected to the pipeline A1 between the restriction orifice 121 and the pump 8, the second port 122b is connected to the pipeline A1 between the restriction orifice 121 and the amplifying piston 9, and the third port 122c is connected to the W/C 4, 5. In this construction, if the discharge amount from the pump 8 is large and the differential pressure is generated between both sides of the restriction orifice 121, the piston 122d slides downstream (on the W/C 4, 5 side). Accordingly, the seat valve 122f rests on the valve seat 122g, thereby closing the pipeline A2.

In this embodiment, the selection between the pipelines A1, A2 can be performed mechanically depend on the pressure difference generated by the restriction orifice 121, thereby obtaining the same advantages as the sixth or the seventh embodiment.

In this construction, if the discharge amount from the pump 8 is not large, the pipeline A2 is opened. In this case, the discharge pressure by the pump 8 directly pressurizes the W/C 4, 5. However, it is not problem because the high pressurize response is not required under this condition.

Ninth Embodiment

Figure 18:
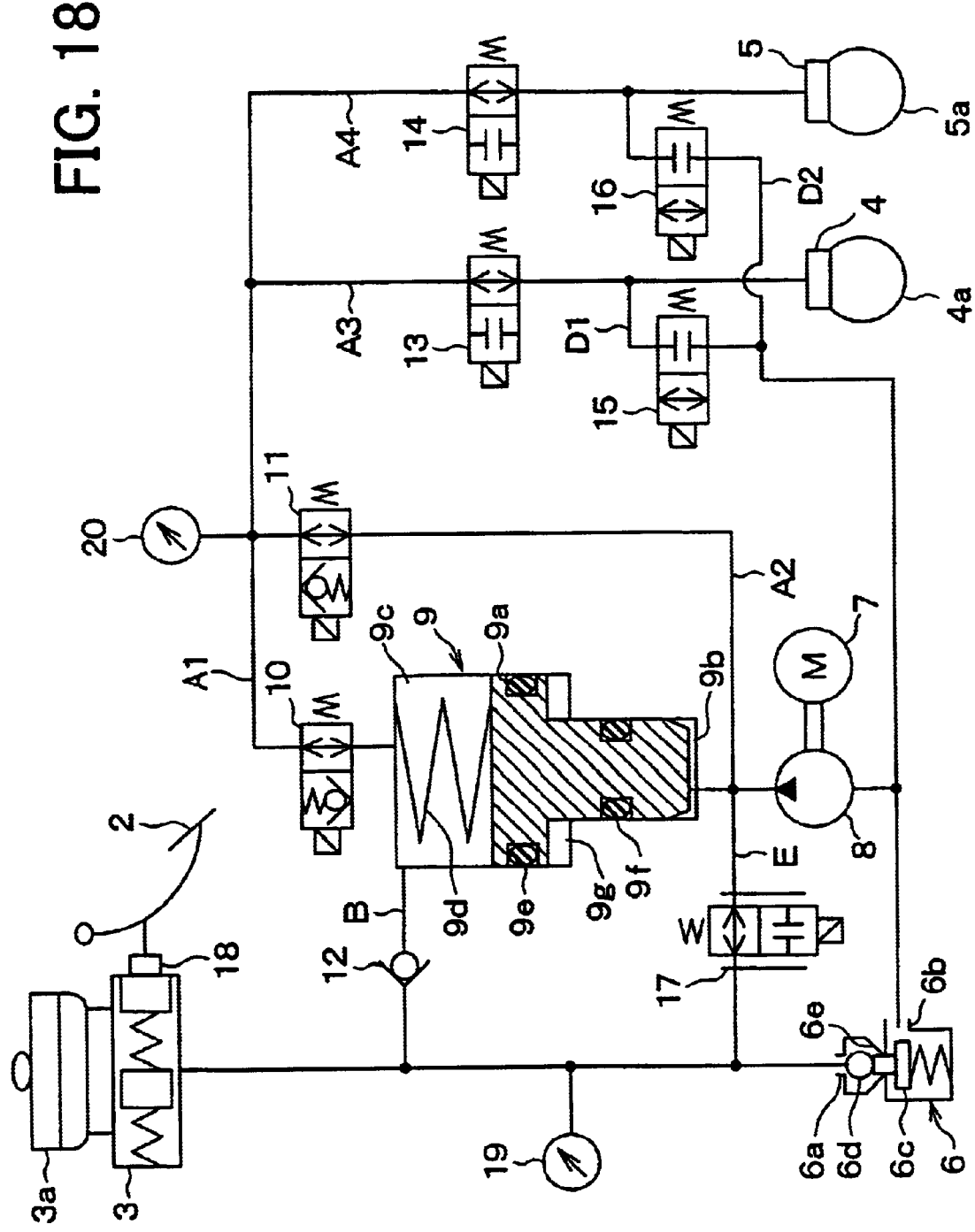
FIG. 18 is a schematic view of a brake system according to a ninth embodiment of the present invention.

FIG. 18 shows a brake system of ninth embodiment. In this embodiment, the connection position with the third chamber 9g is modified from that of the first embodiment. Specifically, the third chamber 9g is provided with an atmosphere pressure or is connected with master reservoir 3a under the atmosphere pressure.

This construction forbids the brake fluid to flow from the M/C 3 side to the third chamber 9g. As a result, the brake fluid amount flowing from the M/C 3 is limited, and therefore a small capacity M/C can be employed as the M/C 3. Further, a body of the M/C 3 can be miniaturized. Accordingly, the stroke amount of the brake pedal 2 can be shorten, and reactive force of the brake pedal 2 can be reduced. Therefore, required pressure for operating the pedal by a driver during a malfunction of an electrical system or pressure source can be reduced. Moreover, the second control valve 11 and the linear valve 17 are of normally open type. Accordingly, the pressurizing amount of the W/C pressure can be enlarged in response to the pedal pressure to the brake pedal 2 due to a small size of the diameter of the M/C 3.

Tenth Embodiment

Figure 19:
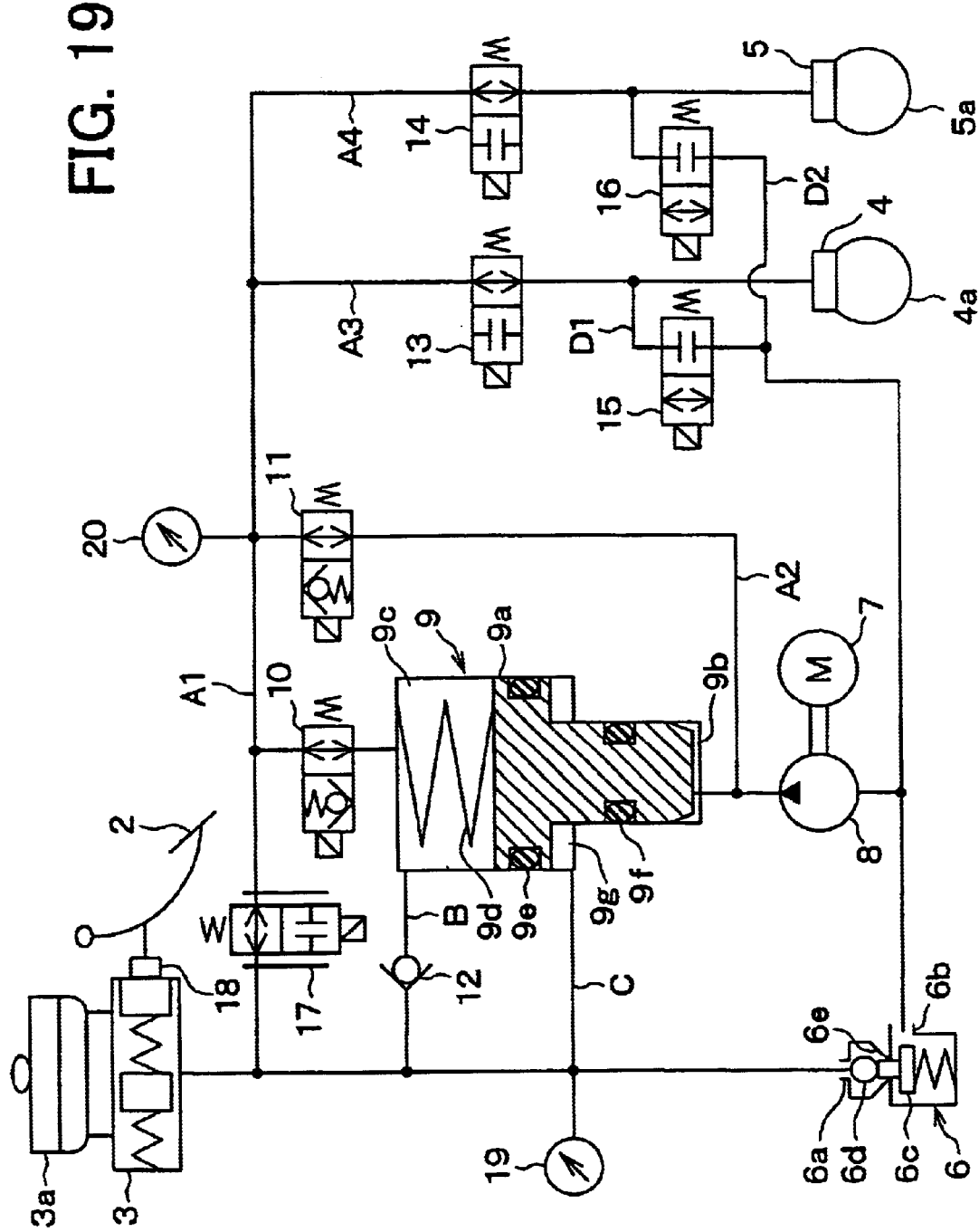
FIG. 19 is a schematic view of a brake system according to a tenth embodiment of the present invention.

FIG. 19 shows a brake system of tenth embodiment. In this embodiment, the position of the linear valve 17 is modified from the first embodiment. Specifically, the linear valve 17 is positioned in a pipeline between the M/C 3 and the pressurization control valves 13, 14.

In this construction, the differential pressure between the W/C pressure and the M/C pressure is controlled by adjusting the duty ratio of the current to the linear valve 17, thereby controlling the W/C pressure more directly.

Eleventh Embodiment

Figure 20:
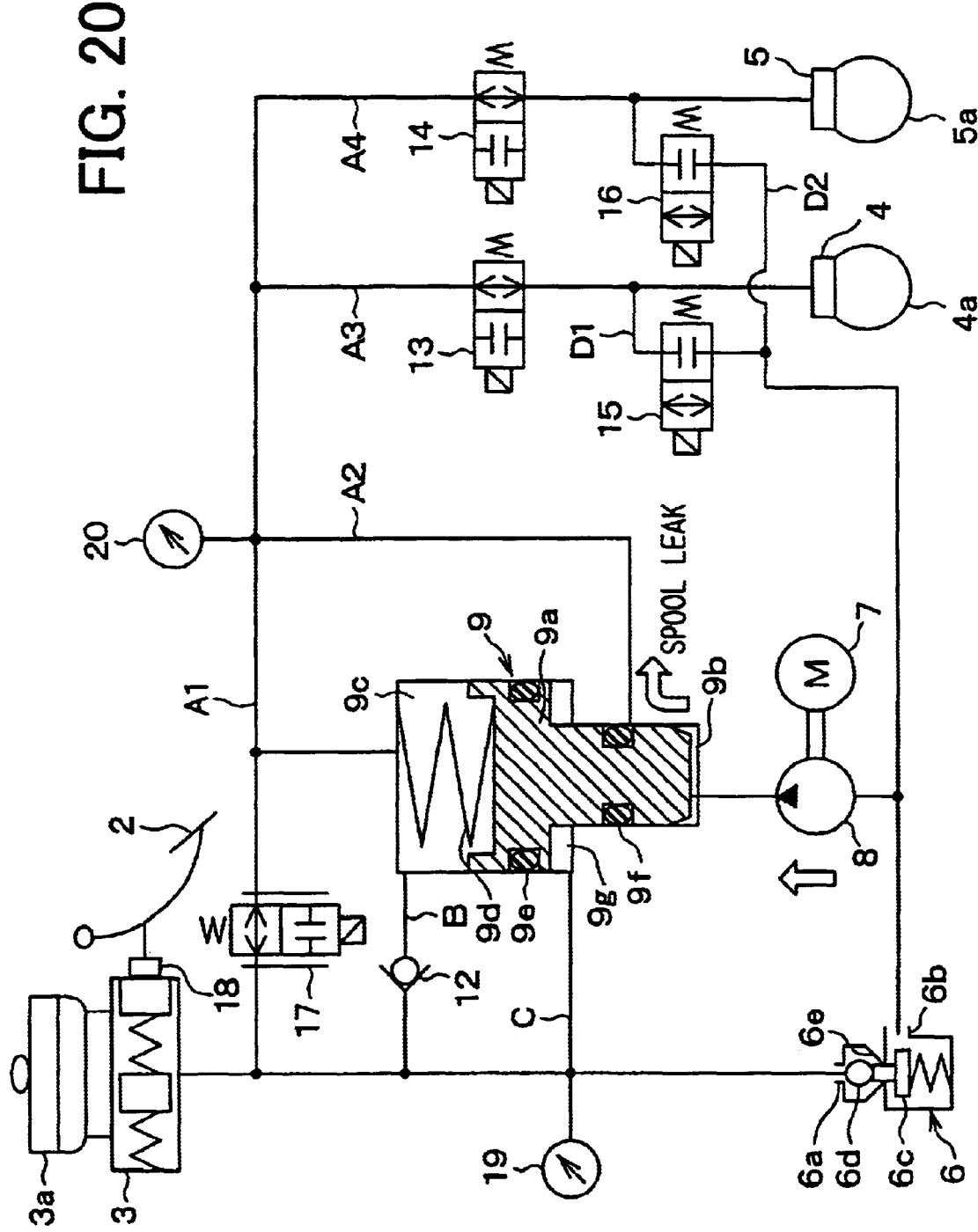
FIG. 20 is a schematic view of a brake system according to an eleventh embodiment of the present invention.

FIG. 20 shows a brake system of eleventh embodiment. In this embodiment, the position of the linear valve 17 is modified from the sixth embodiment. Specifically, the linear valve 17 is positioned in a pipeline between the M/C 3 and the pressurization control valves 13, 14.

Further, a spool leak occurs from the first chamber 9b to the pipeline A2 through a clearance between the small diameter portion of the step piston 9a and the guide wall or the like. If the linear valve is positioned between the discharge port side of the pump 8 and the M/C 3 as in the first embodiment, a relief leak occurs through the liner valve and the pressure regulating reservoir 6 or the like. Therefore, the step piston 9a never reach the limit (i.e., upper wall). However, if the linear valve 17 is positioned at the above-mentioned position, the step piston 9a sometimes reaches the limit since there is no relief leak. Accordingly, the spool leak is formed in this embodiment.

In this embodiment, the selection between the pipelines A1, A2 can be performed mechanically by the amplifying piston 9, and, further, the W/C pressure may be pressurized more directly as in the tenth embodiment. Moreover, since the spool leak decrease the discharge amount from the pump 8, the W/C pressure may be pressurized via the pipeline A2 at the normal braking timing in which high pressurization is not required at no urgent control timing. In this case, the stroke of the amplifying piston 9 is suppressed.

Twelfth Embodiment

Figure 21:
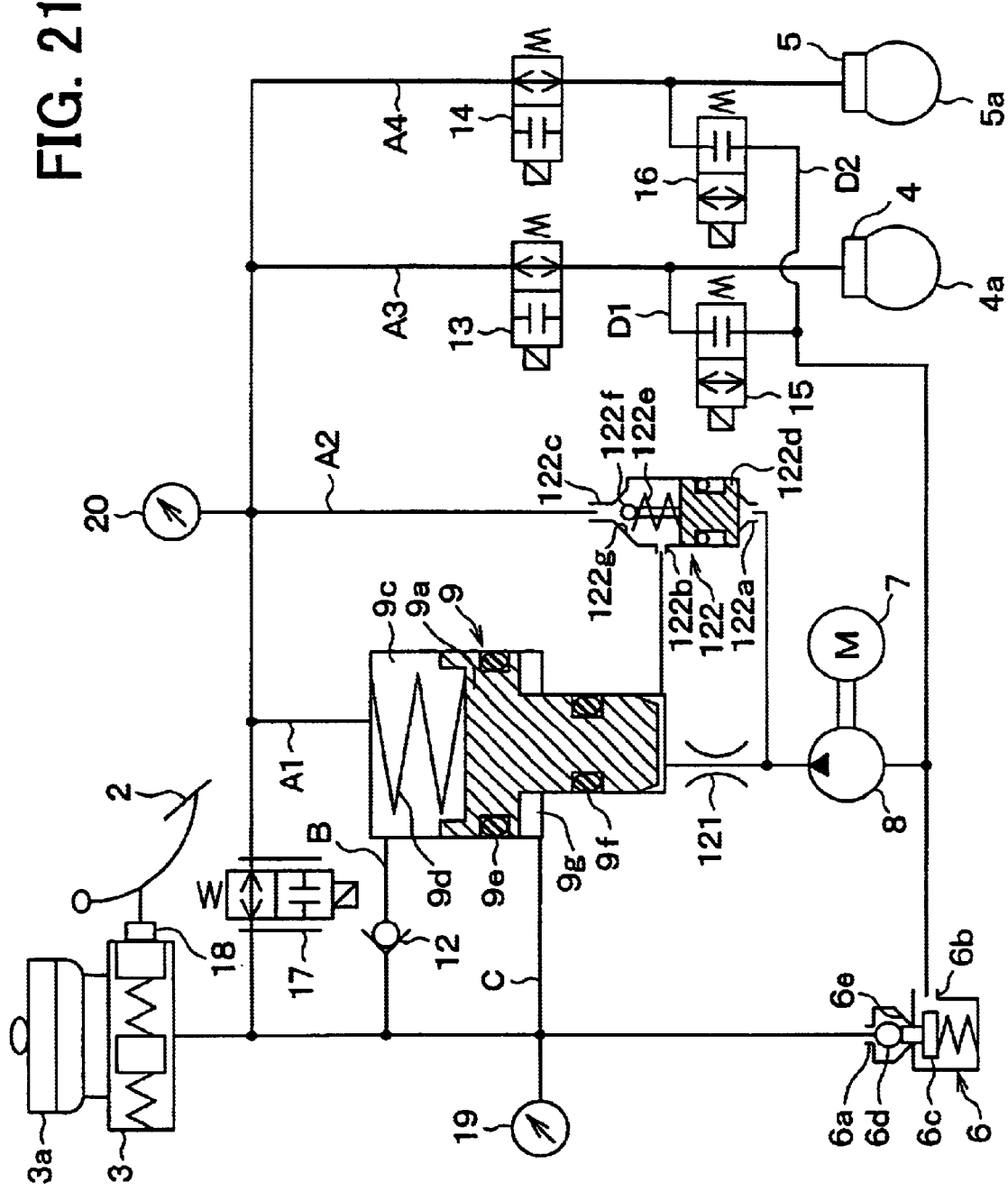
FIG. 21 is a schematic view of a brake system according to a twelfth embodiment of the present invention.

FIG. 21 shows a brake system of twelfth embodiment. This embodiment is a modification of the eleventh embodiment and the selection between the first and second pipelines A1, A2 is performed by the restriction orifice 121 and the bypass valve 122 as in the eighth embodiment. The restriction orifice 121 and the bypass valve 122 operate as the eighth embodiment. This structure can obtain the same advantages as the eleventh embodiment.

Thirteenth Embodiment

Figure 22:
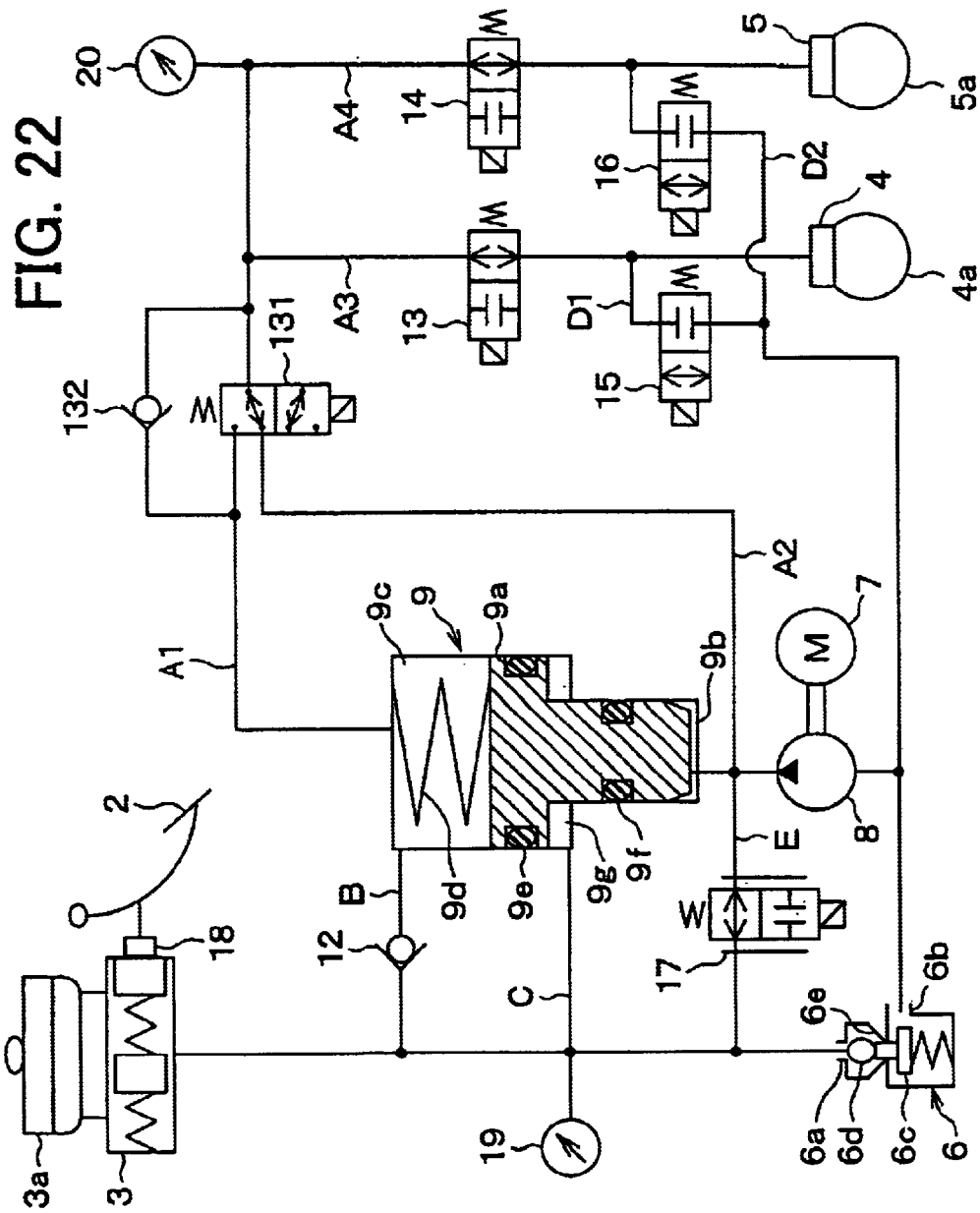
FIG. 22 is a schematic view of a brake system according to a thirteenth embodiment of the present invention.

FIG. 22 shows a brake system of thirteenth embodiment. In this embodiment, a three ports-two position valve 131 is employed instead of the first and second control valves 10, 11 shown in FIG. 1. In the valve 131, when one position is selected, the pipeline A1 is opened and the pipeline A2 is closed. To the contrary, when the other position is selected, the pipeline A1 is closed and the pipeline A2 is opened. A check valve 132 is employed between the second chamber 9c and the W/C 4, 5 to permit the brake fluid to flow only from the second chamber 9c to the W/C 4, 5 side.

In this construction, the three ports two position valve 131 is driven and controlled by the brake control ECU 1 as shown in the first embodiment. Further, it is easier to bleed air from the brake piping in this embodiment.

Fourteenth Embodiment

Figure 23:
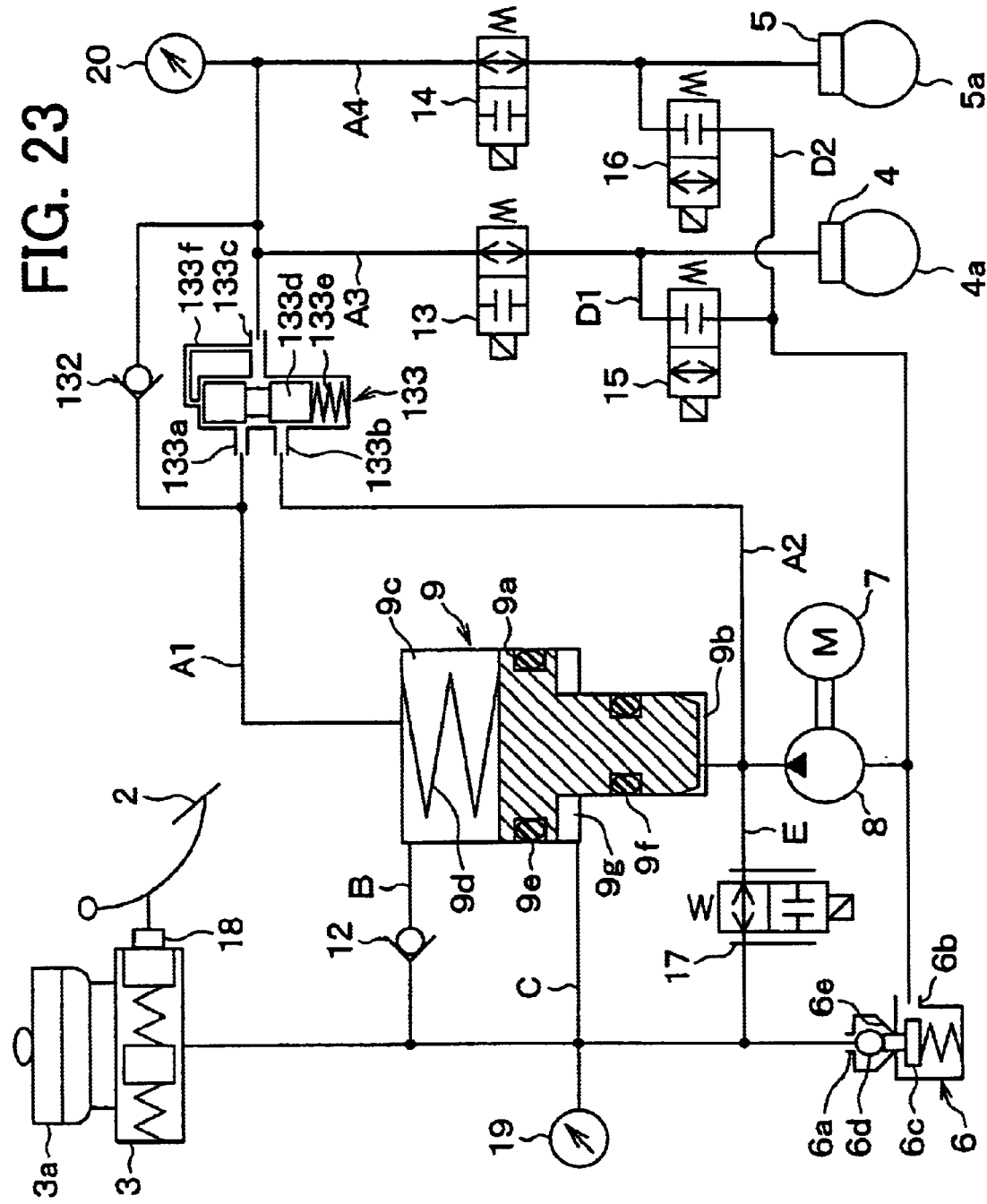
FIG. 23 is a schematic view of a brake system according to a fourteenth embodiment of the present invention.

FIG. 23 shows a brake system of fourteenth embodiment. In this embodiment, a three port two position mechanical valve 133 is employed instead of the first and second control valves 10, 11 shown in FIG. 1.

The valve 133 has a first port 133a, a second port 133b, a third port 133c, a piston 133d, a spring 133e, and pipeline 133f. The first port 133a is connected to the second chamber 9c, the second port 133b is connected to the discharge port side of the pump 8, and the third port 133c is connected to the W/C 4, 5 side. The piston 133d slides against a force of the spring 133e by the W/C pressure applied thereto through the pipeline 133f.

In this construction, at the low W/C pressure timing, the pipeline A1 is opened and the pipeline A2 is closed. To the contrary, at the high W/C pressure timing, the pipeline A1 is closed and the pipeline A2 is opened. Therefore, the brake system obtains the same advantages as the first embodiment.

Fifteenth Embodiment

Figure 24:
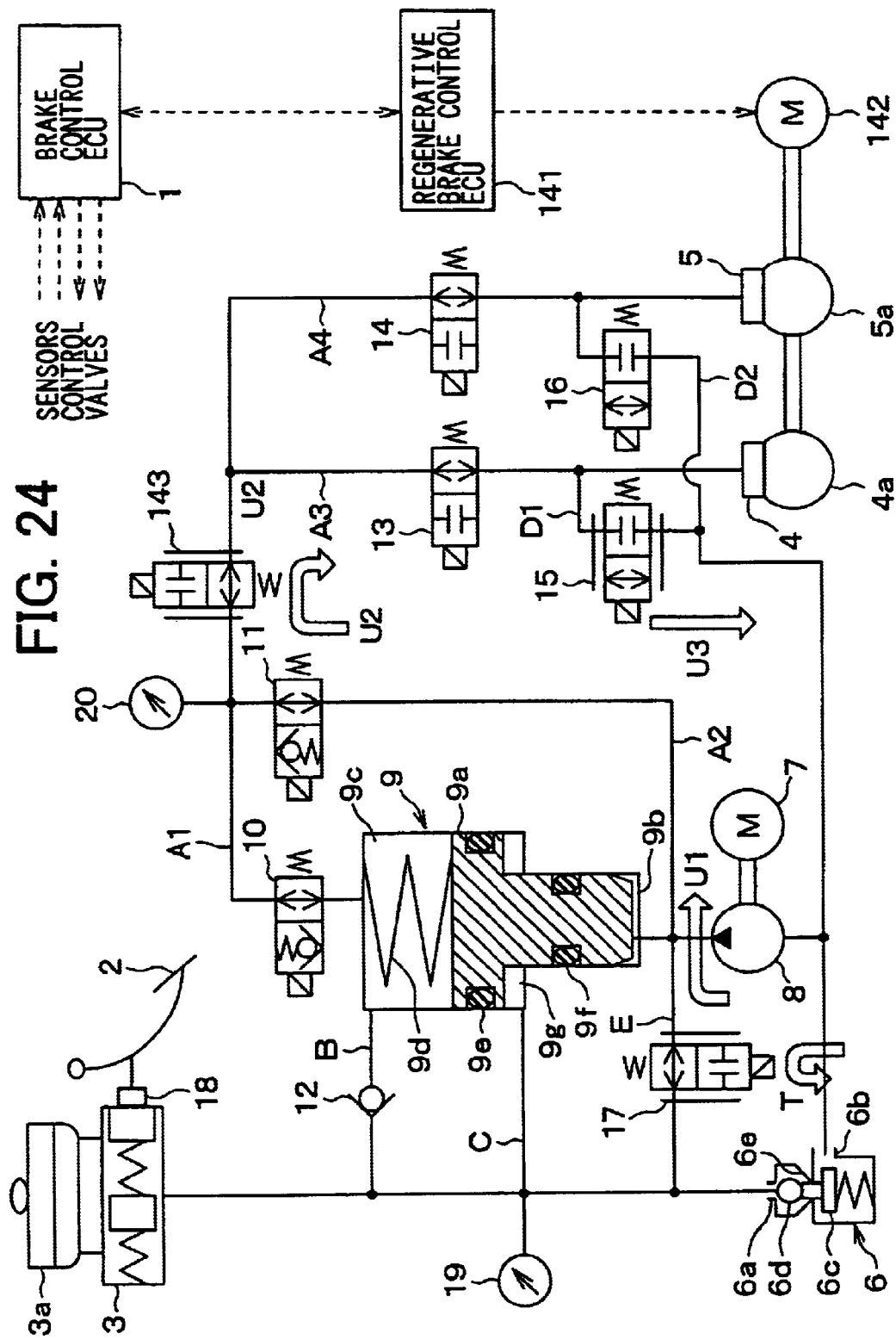
FIG. 24 is a schematic view of a brake system according to a fifteenth embodiment of the present invention.

FIG. 24 shows a brake system of fifteenth embodiment. This brake system is mounted on the vehicle, such as an electric vehicle, having regenerative brake equipment. The basic constitution of the brake system including the brake piping and sensors is basically the same as the first embodiment.

As shown in FIG. 24, the pressure increase to respective W/C 4, 5 may be controlled by the regenerative motor 142, which is driven by the regenerative control ECU 141. The regenerative control ECU 141 exchanges information with the brake control ECU 1. The W/C pressure can be regulated by duty controlling the depressurization control valve 15 that is a linear valve. The differential pressure between the brake pressure at a position of the W/C pressure sensor 20 and real W/C pressure is regulated by duty controlling the pressurization linear valve 143.

The brake system with the regenerative brake equipment has the same advantages as the first embodiment. In the brake system of this embodiment, the discharge pressure of the pump 8 is regulated in use of a brake flow path passing through the linear valve 17 and the pressure regulating reservoir 6, when a cooperative control with the regenerative braking is not executed (See an arrow T shown in FIG. 24). On the other hand, the depressurization control valve 15 is controlled by duty control, when a cooperative control with the regenerative braking is executed so that the discharge pressure of the pump 8 is regulated in use of a brake flow path passing through the second control valve 11, the pressurization linear valve 143, the pressurization control valve 13 and the depressurization control valve 15 (See arrows U1–U3 shown in FIG. 24).

Sixteenth Embodiment

Figure 25:
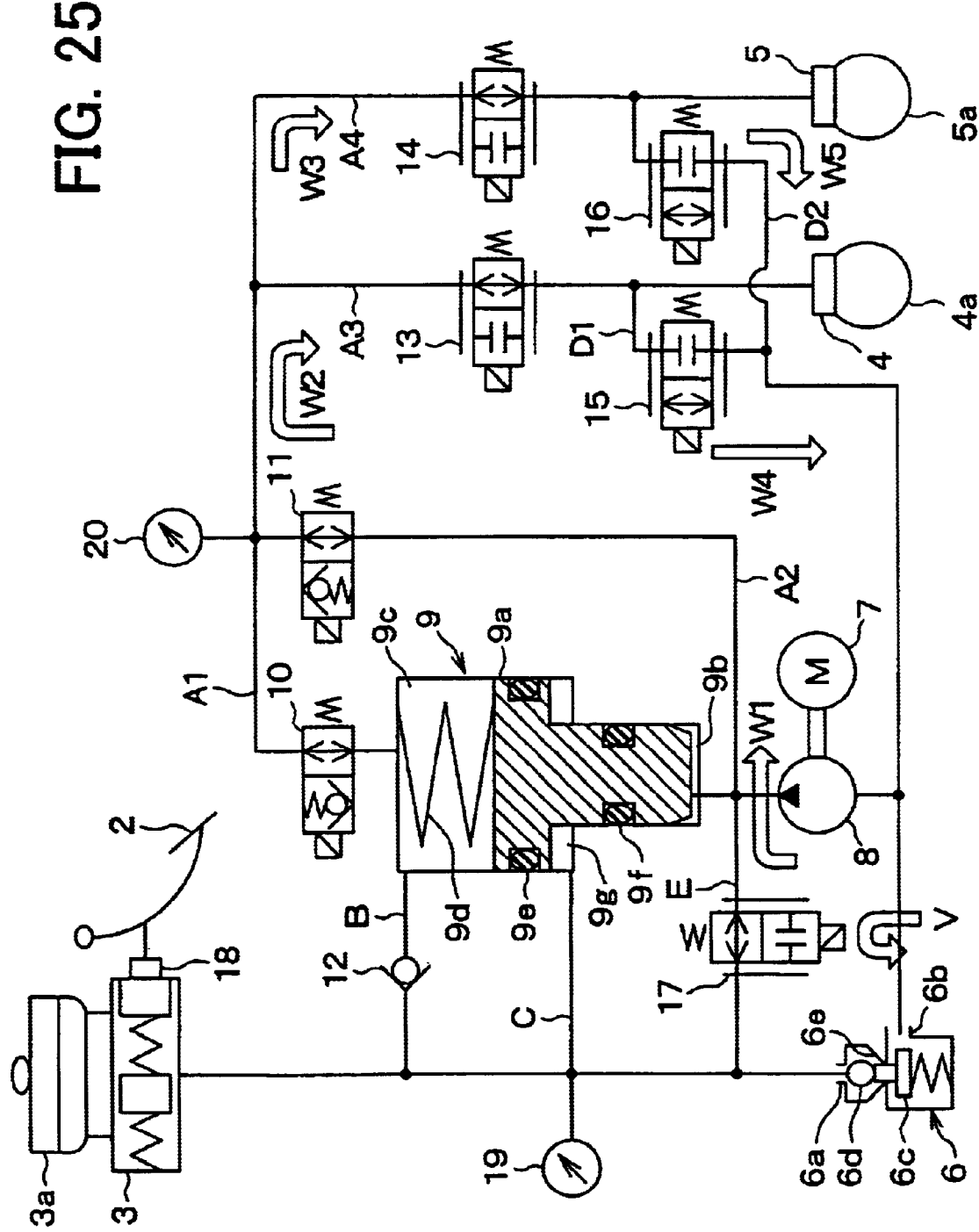
FIG. 25 is a schematic view of a brake system according to a sixteenth embodiment of the present invention.

FIG. 25 shows a brake system of sixteenth embodiment. This brake system is mounted on the vehicle whose respective wheels have liner control units. The basic constitution of this brake system is basically the same as the first embodiment.

As shown in FIG. 25, respective control valves 13–16, which are linear valves, are controlled by duty control. As a result, the W/C pressure is regulated with respect to the individual wheel (individual wheel brake pressure control).

This brake system, which is controlled by the respective wheel brake pressure control, has the same advantages as the first embodiment. In the brake system of this embodiment, the discharge pressure of the pump 8 is regulated in use of a brake flow path passing through the linear valve 17 and the pressure regulating reservoir 6, when the individual wheel brake pressure control is not executed (See an arrow V shown in FIG. 25). On the other hand, each of the control valves 13–16 is controlled by duty control, when the individual wheel brake pressure control is executed. Therefore, the discharging pressure by the pump 8 is regulated in use of a brake flow path passing through the second control valve 11 and the respective control valves 13–16 (See arrows W1–W5 shown in FIG. 25).

Seventeenth Embodiment

Figure 26:
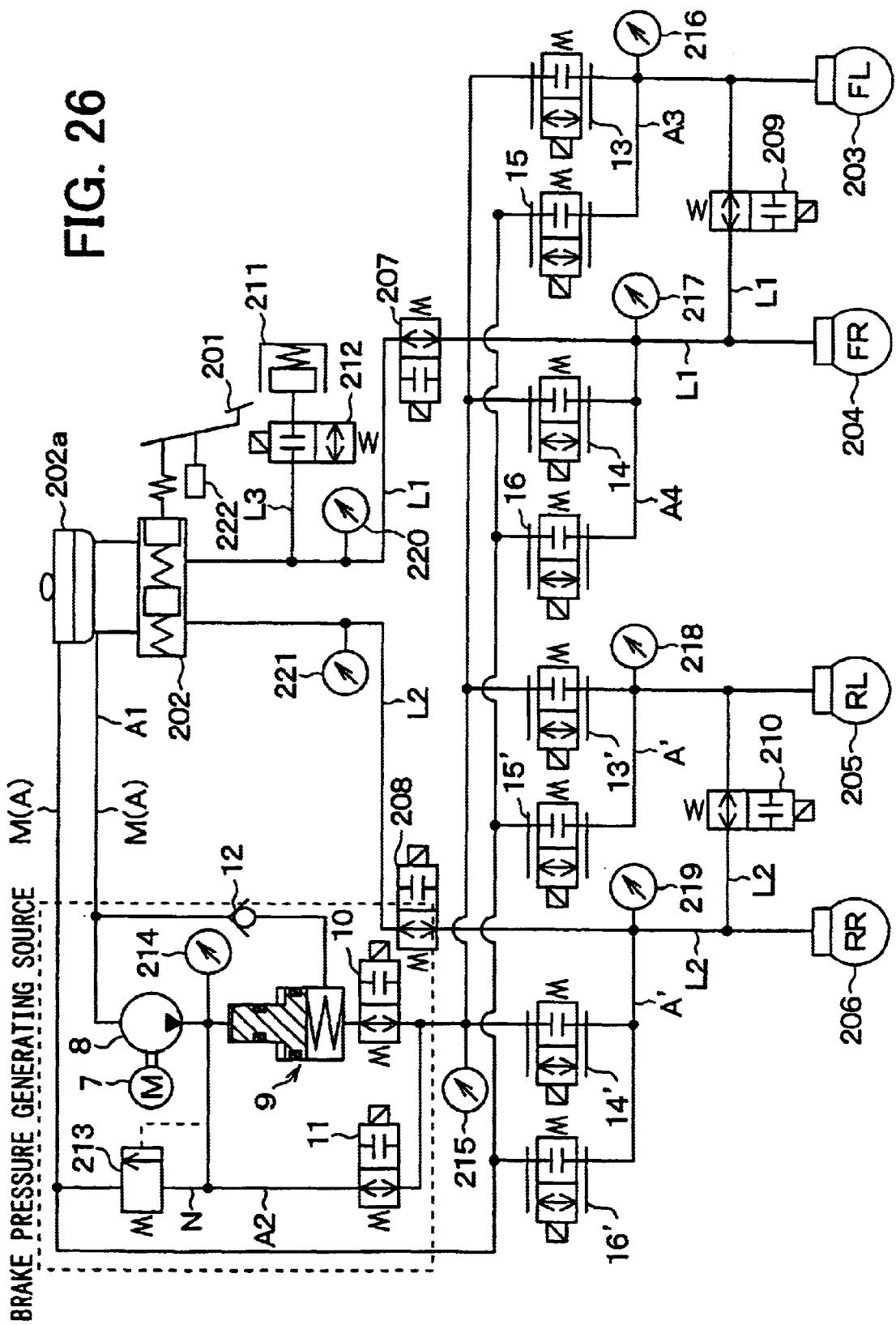
FIG. 26 is a schematic view of a brake system according to a seventeenth embodiment of the present invention.

FIG. 26 shows a brake system of seventeenth embodiment. In this embodiment, a brake piping similar to the first embodiment is employed as a brake pressure generating source of a brake system having EHB or active hydro booster or the like.

As shown in FIG. 26, the brake system of this embodiment has a brake pedal 201, a M/C 202, master reservoir 202a, and W/C 203–206 that are provided for respective wheels. These elements have the same construction as the first embodiment.

The M/C 202 is connected to front side W/C 203, 204 via a pipeline L1. The M/C 202 is connected rear side W/C 205, 206 via a pipeline L2. The pipelines L1, L2 are provided with two position valves 207, 208 that control open or close condition between the M/C 202, the W/C 203–206, two position valve 209 that controls the open or close condition between both of the front side W/C 203, 204, and two position valve 210 that controls the open or close condition between both of the rear side W/C 205, 206.

A pipeline L3 is connected to the pipeline L1 between the M/C 202 and the two position valve 207. In this pipeline L3, a stroke simulator 211 and a two position valve 212 are provided. The two position valve 212 controls the brake fluid flow to the stroke simulator 211.

Further, the master reservoir 202a is connected to respective W/C 203–206 via a pipeline M. This pipeline M plays a role of the pipeline A of the first embodiment. The same construction as the first brake piping of the first embodiment is provided in this pipeline. Namely, the motor 7, the pump 8, the amplifying piston 9, the first and second control valves 10, 11, the pressurization control valves 13, 14, and the depressurization control valves 15, 16 are provided. However, the pressurization control valves 13', 14', and the depressurization control valves 15', 16' are provided downstream from the first and second control valves 10, 11 via a pipeline A' so that the W/C 205, 206 of the second brake piping can be controlled based on the discharge pressure of the pump 8. The control valves 13'–16' play roles of the control valves 13–16. Linear valves are employed as the control valves 13–16, 13'–16' in this embodiment.

Moreover, the master reservoir 202a is connected to the discharge port side of the pump 8 via a pipeline N. A relief valve 213 is provided in the pipeline N, thereby controlling the open or close condition of the pipeline N based on the differential pressure between the discharge pressure of the pump 8 and the brake fluid pressure of the master reservoir 202a (i.e., atmosphere pressure).

Respective brake pressure of the pipelines can be detected by respective sensors 214–221. Specifically, the discharge pressure of the pump 8 is detected by a pressure sensor 214. The brake pressure between the first or second control valves 10, 11 and each of the pressurization control valves 13, 14, 13', 14' is detected by a pressure sensor 215. Respective W/C pressures are detected respective pressure sensors 216–219. The pedal pressure (pedal condition) of the brake pedal 201 is detected by a pedal pressure sensor 222.

In this brake system, when the brake pedal 201 is depressed, the brake fluid in the master reservoir 202a is provided to the W/C 203–206 by the pump 8. Therefore, the W/C pressure corresponding to the pedal pressure is generated. That is, the W/C pressure is not pressure depending on the M/C pressure.

Specifically, when the brake pedal 201 is depressed, the two position valves 207, 208 are closed so as not to transmit the M/C pressure to the W/C 203–206. Moreover, the two position valve 212 is opened so that the stroke simulator 211 can reserve the brake fluid from M/C 202. Further, the pump 8 sucks the brake fluid based on the pedal pressure of the brake pedal 201 from the master reservoir 202a, and discharges it to the W/C 203–206 sides. Then, the duty ratio of the current to each of the linear valves 13–16, 13'–16' is adjusted. Therefore, desired W/C pressure is generated at each W/C 203–206.

In this construction, the selection between the pipelines A1, A2 can be performed by the first and second control valves 10, 11, thereby obtaining the same advantages as the first embodiment.

The present brake system may employ not only the brake piping of the first embodiment but also the brake piping of any of the second to sixteenth embodiments.

Eighteenth Embodiment

Figure 27:
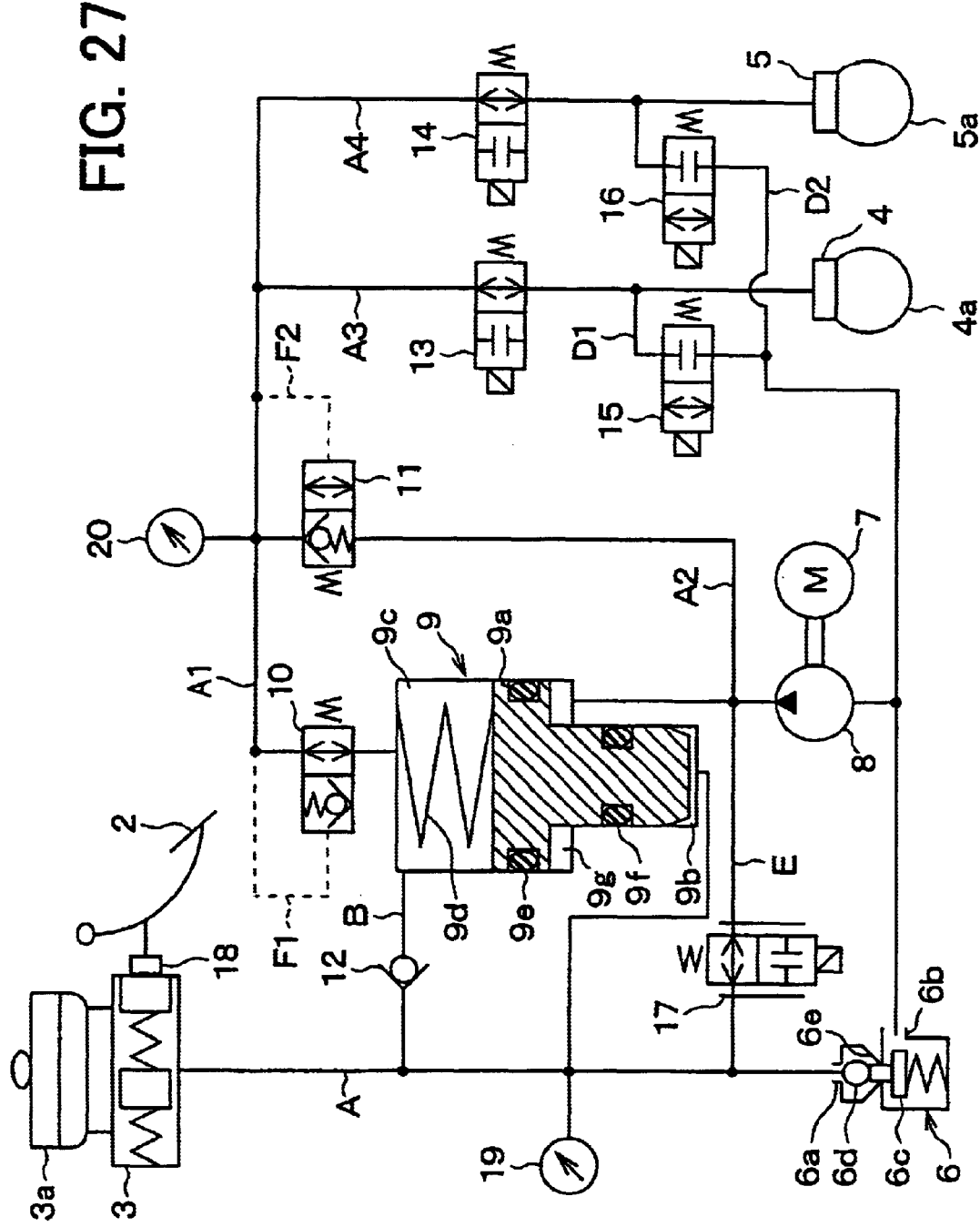
FIG. 27 is a schematic view of a brake system according to an eighteenth embodiment of the present invention.

FIG. 27 shows a brake system of eighteenth embodiment. In this embodiment, port connecting positions of the amplifying piston 9 is modified from the second embodiment. Specifically, the first chamber 9*b* is connected to the M/C 3 side, and the third chamber 9*g* is connected to the discharge port side of the pump 8. Namely, these connecting positions are opposite to those of the second embodiment, thereby obtaining the same advantages as the second embodiment. Further, this construction serves to easily set a larger amplification ratio of the amplifying piston 9.

Nineteenth Embodiment

Figure 28:
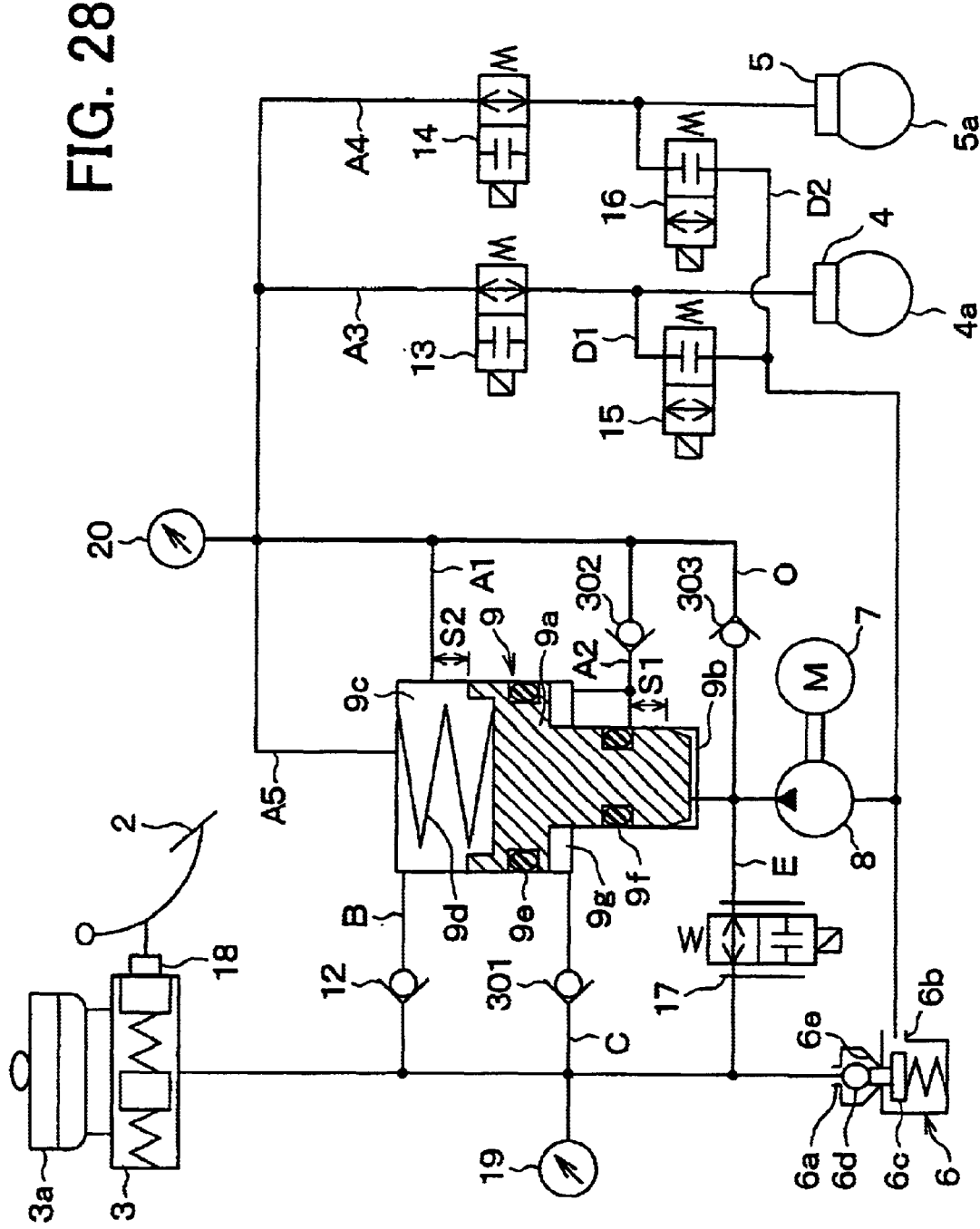
FIG. 28 is a schematic view of a brake system according to a nineteenth embodiment of the present invention.

FIG. 28 shows a brake system of nineteenth embodiment. In this embodiment, the communication condition of the third chamber of the amplifying piston 9 in the first brake piping or the like is modified from the sixth embodiment. Specifically, a check valve 301 that allows the brake fluid to flow only from the M/C 3 side to the third chamber 9*g* side is provided in the pipeline C. The check valve 302 that allows the brake fluid to flow only from the amplifying piston 9 side to the W/C 4, 5 side is provided in the pipeline A2. Further, a pipeline O that connects the discharge port side of the pump 8 to the W/C 4, 5 is provided, and a check valve 303 that allows the brake fluid to flow only from the W/C 4, 5 side to the discharge port side of the pump 8 instead of the check valve 100 shown in FIG. 15.

In this case, when the pipeline A2 is opened according to the slide of the amplifying piston 9, the pressure in the third chamber 9*g* is changed from the M/C pressure to the discharge pressure of the pump 8. The force for pushing the amplifying piston 9 toward the W/C 4, 5 side increases. As a result, a distance between the opening of the pipeline A2 and the end of the amplifying piston is secured to a desired level. Accordingly, the brake fluid discharged from the pump 8 flows into the W/C 4, 5 with less flow resistance. The other operations are the same as the sixth embodiment.

This structure obtains the same advantages as the sixth embodiment.

Twentieth Embodiment

Figure 29:
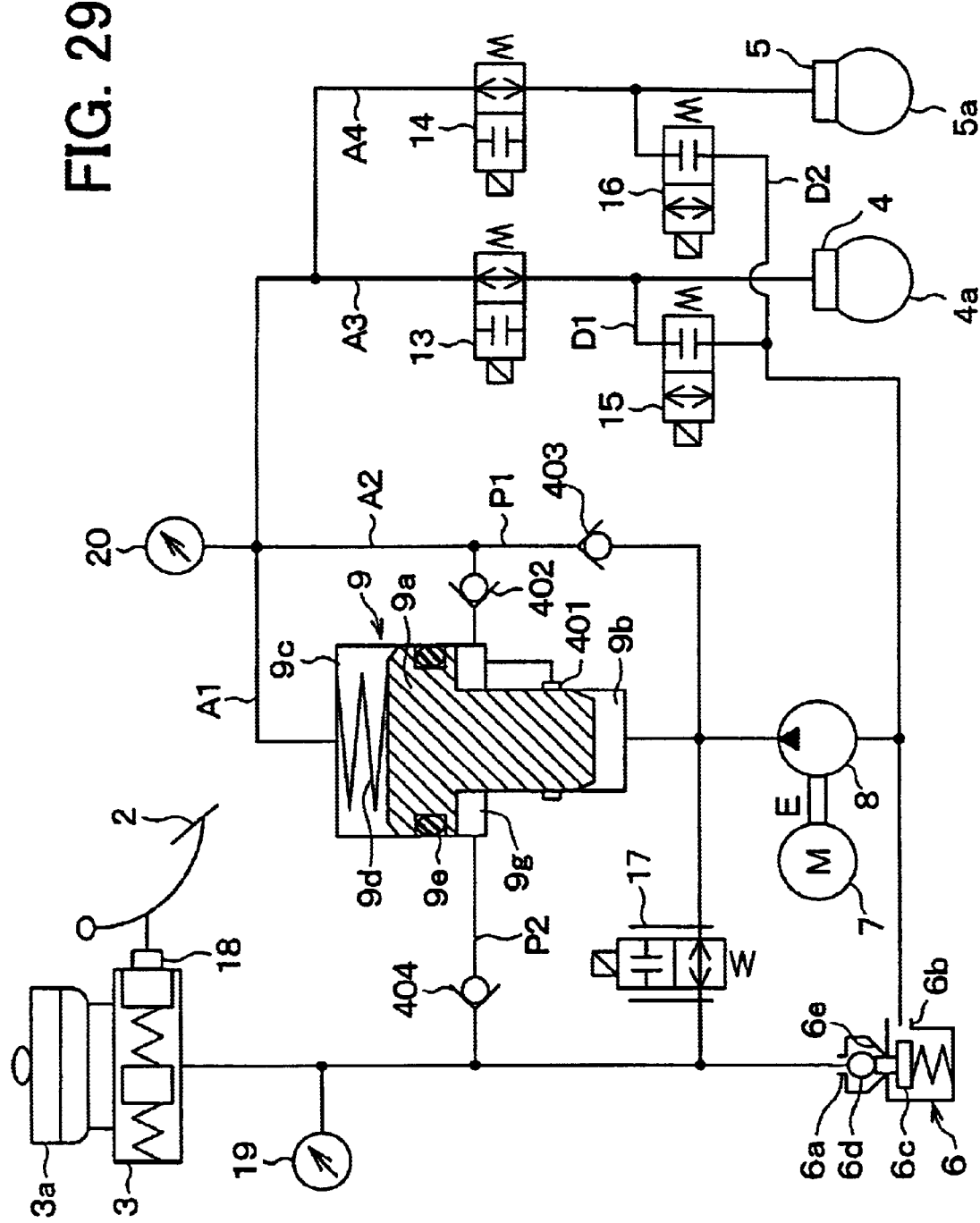
FIG. 29 is a schematic view of a brake system according to a twentieth embodiment of the present invention.

FIG. 29 shows a brake system of twentieth embodiment. In this embodiment, similarly to the sixth embodiment, the amplifying piston 9 plays a role of the first and second control valves 10, 11 shown in FIG. 1.

Specifically, a spool valve unit 401 is provided in the guide wall that accommodates the small diameter portion of the step piston 9*a*. Moreover, the third chamber 9*g* is connected to the W/C 4, 5 side so that the pipeline A2 is formed by a path through the spool valve unit 401 and the third chamber 9*g*.

A check valve (a first check valve) 402 is provided in the pipeline A2 between the third chamber 9*g* and the W/C 4, 5 so as to permit the brake fluid to flow only from the third chamber 9*g* to the W/C 4, 5 side. The pipeline A2 downstream (on the W/C 4, 5 side) from the check valve 402 connected to the discharge port side of the pump 8 via a pipeline P1, which constitutes to a feedback path. A check valve (a second check valve) 403 is provided in the pipeline P1 to permit the brake fluid to flow only from the W/C 4, 5 side to the discharge port side of the pump 8.

Moreover, the third chamber 9*g* is connected to the M/C 3 side via a pipeline P2. A check valve (a third check valve) 404 is provided in the pipeline P2 to permit the brake fluid to flow only from the M/C 3 side to the third chamber 9*g*.

With this constitution, the spool valve unit 401 is opened or closed according to the slide of the step piston 9*a*. That is, the spool valve unit 401 is opened when the end of the step piston 9*a* reaches a position of the spool valve unit 401. Then, the W/C 4, 5 is pressurized via the pipeline A2 through the spool valve unit 401 and the third chamber 9*g*. As the check valve 403 is provided in the pipeline P1, the discharge pressure of the pump 8 does not transmit to the W/C 4, 5 through the pipeline P1.

When the pressurizing path is switched from the pipeline A2 to the pipeline A1 when the spool valve unit 401 is closed by the step piston 9*a*, the brake fluid that is provided to the W/C 4, 5 side via the pipeline A2 is returned via the pipeline P1. In this way, the selection between the pipelines A1, A2 can be performed mechanically based on the sliding movement of the amplifying piston 9. This embodiment obtains the same advantages as the first embodiment.

If the detecting result of the pedal pressure sensor 18 requires to promote a deceleration of the vehicle, the differential pressure between both sides of the linear valve 17 is regulated so that the discharge pressure of the pump 8 is a required W/C pressure multiplied by pressure-receiving surface ratio of the step piston 9*a*. On the other hand, the detecting result requires to maintain or reduce the deceleration, the differential pressure between both sides of the linear valve 17 is regulated so that the discharging pressure by the pump 8 is the same pressure as the required W/C pressure.

As mentioned above, the brake pressure in the third chamber 9*g* becomes to the discharge pressure of the pump 8, when the spool valve unit 401 communicates with the third chamber 9*g*, so that a differential pressure is generated between the third chamber 9*g* and the M/C 3 side. However, since the check valve 404 is provided in the pipeline P2 between the third chamber 9*g* and the M/C 3 side, the brake flow from the third chamber to the M/C 3 side is forbidden.

Moreover, preferably before the spool valve unit 401 becomes open, the high brake pressure generated in the second chamber 9*c* should not be applied to the third chamber 9*g*, since the step piston 9*a* should be operated only by the differential pressure between the first chamber 9*b* and the second chamber 9*c*. Therefore, the check valve 402 is provided in the pipeline A2 between the third chamber 9*g* and the W/C 4, 5 so that the high brake pressure generated in the second chamber 9*c* cannot be supplied to the third chamber 9*g*.

In this embodiment, the spool valve 401 is connected to the third chamber 9*g*. However, this is constitution is not essential, and the spool valve unit 401 may be connected to the W/C 4, 5 side in such a manner that the pipeline A2 does not pass through the third chamber 9*g*. However, the twentieth embodiment has the following advantages.

The W/C 4, 5 are pressurized directly by the discharge pressure of the pump 8 via the pipeline A2 when the spool valve unit 401 is opened and the pipeline A2 is selected as the pressurizing path. However, according to am experimental test result, if the pipeline A does not pass through the third chamber 9*g*, there likely occurs that the spool valve unit 401 repeats open and close operation continuously so that the brake pressure in the first chamber 9b is higher than that of the second chamber 9c, if this effect occurs the selection between the pipelines A1, A2 is not stable. In order to avoid this unstable condition, the spool valve unit 401 is connected to the W/C 4, 5 side through the third chamber 9g in this embodiment.

Twenty-First Embodiment

Figure 30:
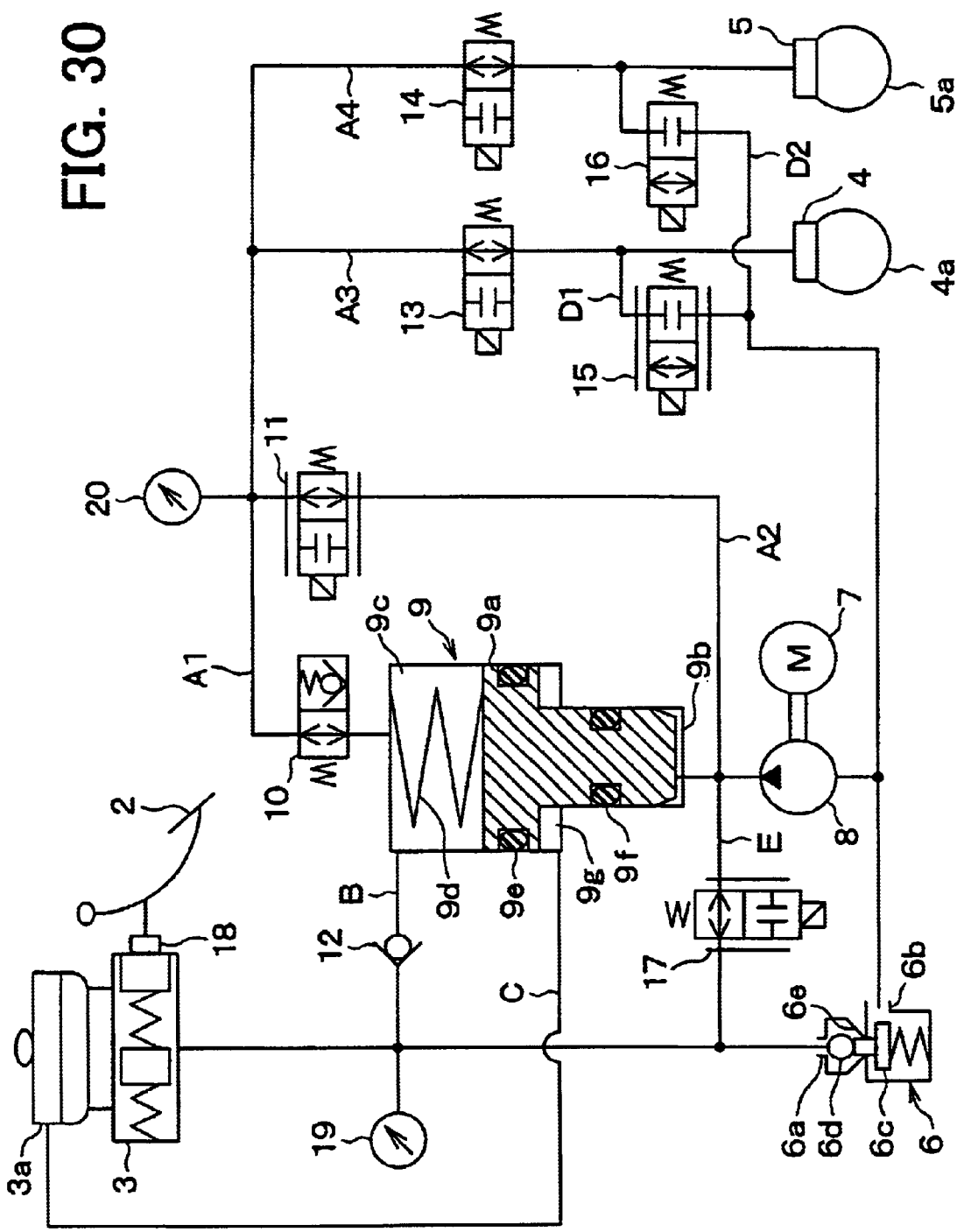
FIG. 30 is a schematic view of a brake system according to a twenty-first embodiment of the present invention.

FIG. 30 shows a brake system of twenty-first embodiment. This brake system is modified from the first embodiment so as to cooperate with the regenerative braking. Specifically, the second control valve (a first liner control valve) 11 and the depressurization control valve (a second linear valve) 15 are linear valves and the third chamber 9g is connected to the master reservoir 3a under to the atmosphere pressure.

When the cooperation control with the regenerative braking is executed, the pressure to be compensated by the regenerative braking is reduced from the W/C pressure to be estimated based on the pedal pressure of the brake pedal 2. Accordingly, in this embodiment, the linear valve 15 serves to decrease the W/C pressure appropriately. An instruction signal for generating the differential pressure by the second control valve 11 is synchronized with the control signal for driving the linear valve 17 so as not to shift the differential pressure between the first chamber 9b and the second chamber 9c. Therefore, the valve open and close operation of the second control valve 11 control to return the brake fluid to be compensated by the regenerative braking to the second chamber 9c.

Accordingly, the capacity change of the W/C 4, 5 during the cooperation control with the regenerative braking is absorbed by adjusting the difference of capacity change between the first chamber 9b and the second chamber 9c so that the shift of brake pedal 2 may be limited.

On the other hand, when the regenerative braking is stopped, the W/C pressure has to increase by the pressure due to the regenerative braking. Accordingly, the linear valve 17 serves to increase the W/C pressure appropriately. In this case, an instruction signal for generating the differential pressure by the second control valve 11 is synchronized with the control signal for driving the linear valve 17.

In this way, when the pressure change due to the regenerative braking is reduced from the W/C pressure, the step piston 9a is controlled so as to return toward its initial position than the case when the regenerative braking is not executed. To the contrary, when the pressure change due to the regenerative braking is increased from the W/C pressure, the step piston 9a is controlled so as to push toward its advanced position than the case when the regenerative braking is executed. Therefore, the cooperation control with the regenerative braking can be executed appropriately. Moreover, a driver does not have uncomfortable feeling based on the shift of the brake pedal 2 because the capacity change of the W/C 4, 5 is absorbed by the amplifying piston 9.

Twenty-Second Embodiment

Figure 31:
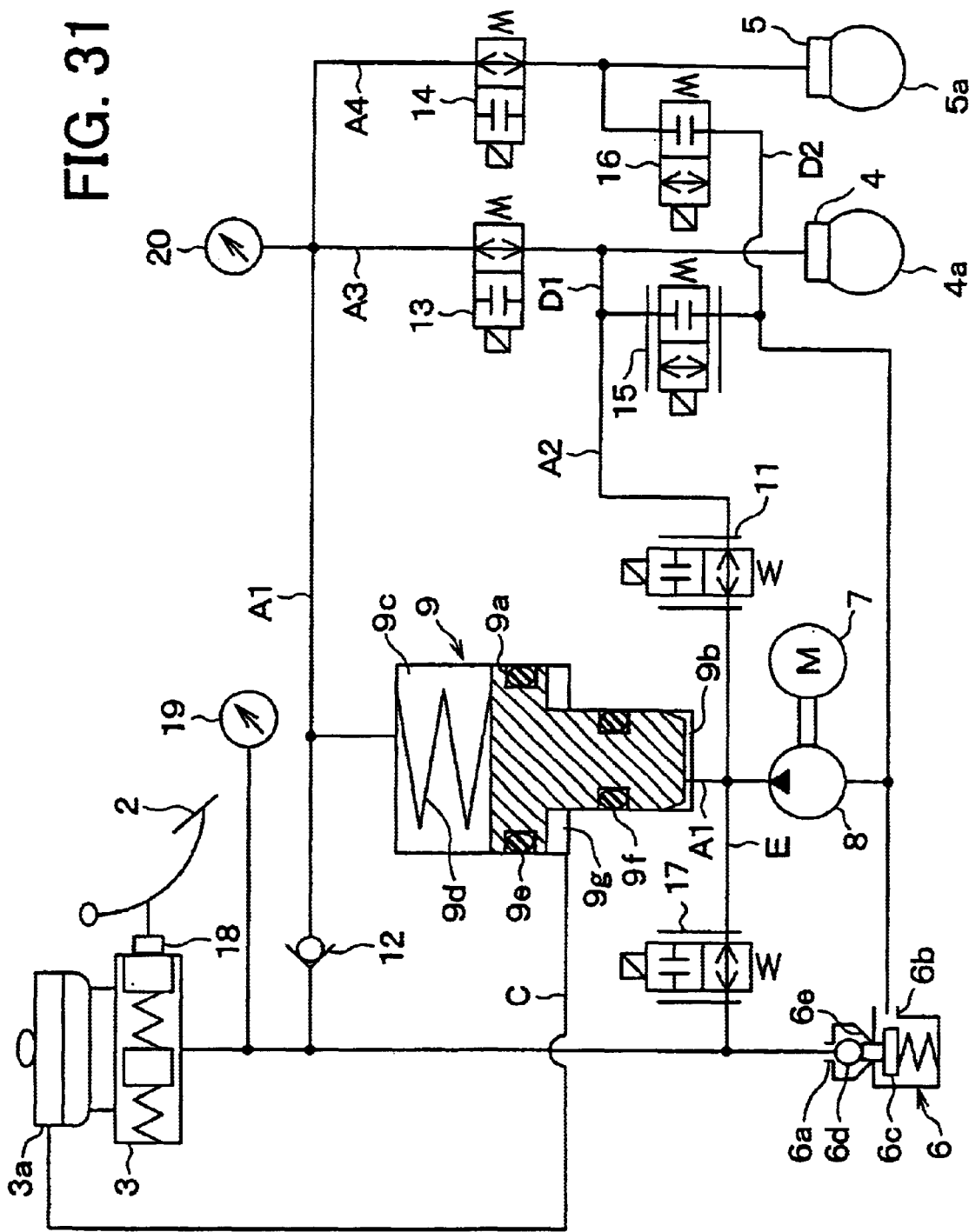
FIG. 31 is a schematic view of a brake system according to a twenty-second embodiment of the present invention.

FIG. 31 showing a brake system of twenty-second embodiment. The brake system in this embodiment executes a cooperation control with the regenerative braking with a construction different from the twenty-first embodiment.

Specifically, the brake system in this embodiment does not have the first control valve 10 shown in FIG. 30. The second chamber 9c is connected to the M/C 3 side via the check valve 12. The second pipeline A2 with the second control valve 11 is connected between the discharge port side of the pump 8 and a pipeline D1 between the depressurization control valve 15 and the W/C 4. Moreover, the third chamber 9g is connected to the master reservoir 3a.

This brake system is operated similarly to the twenty-first embodiment and the depressurization control valve 15 and the second control valve 11, which are the linear valves, are driven so that the cooperative control with the regenerative braking can be executed.

The brake fluid is applied to the third chamber 9g from the master reservoir 3a. Therefore, the brake fluid from the M/C 3 is supplied only to the first chamber 9b. Accordingly, the W/C 4, 5 can be pressurized by small amount of the brake fluid from the M/C 3, and a diameter of the M/C 3 can be miniaturized.

Moreover, if the respective control valves 11, 13–17 and the motor 7 do not work during a malfunction of an electrical system, the W/C 4 can be pressurized via a path through the M/C 3, the linear valve 17, the second control valve 11 and the W/C 4. The W/C 5 can be pressurized via a path through the M/C 3, the linear valve 17, the second control valve 11, the pressurization control valves 13, 14 and the W/C 5. In this case, even if the diameter of the M/C 3 is small, a pressurizing amount amplifying ratio to pedal pressure of the brake pedal 2 is large.

According to this embodiment, only the W/C 4 can be directly pressurized by the pump 8 or be depressurized through the second control valve 11 at the high pressure timing. Accordingly, the W/C 4 is preferably applied to the front wheels.

That is, the pipeline A2 is not connected to the W/C 5 side, but connected to the W/C 4 side. Therefore, the brake fluid is mainly provided to the W/C 4 side. Accordingly, in order to mainly supply the brake fluid to the front wheel side that requires more high pressure than the rear wheel side, it is preferable that the W/C 4 is applied to the front wheel. In this case, the W/C 5 that is applied to the rear wheel side cannot be pressurized after the pipeline A2 is selected as the pressurizing path, but it is not necessary to increase the brake pressure of the rear wheel already generated when the pipeline A1 is selected as the pressurizing path.

Further, the front wheel side is likely to make noises, and governs mainly the brake fluid pressure control. Accordingly, the noises can be reduced sufficiently and the brake pressure control can be executed smoothly by controlling the W/C 4 with the second control valve 11 and depressurization control valve 15.

Twenty-Third Embodiment

Figure 32:
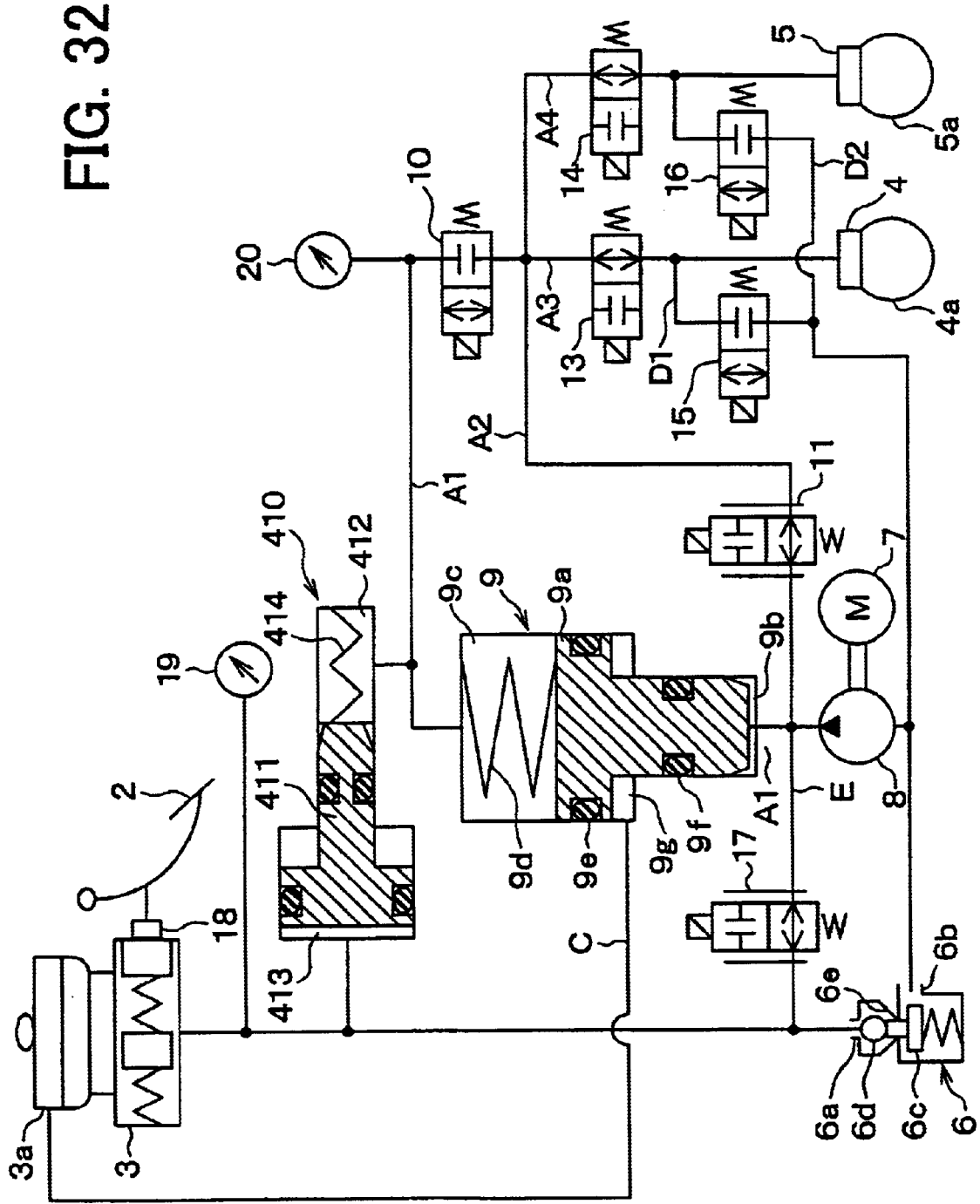
FIG. 32 is a schematic view of a brake system according to a twenty-third embodiment of the present invention.

FIG. 32 shows a brake system of twenty-third embodiment. This brake system is modified from the first embodiment so as to cooperate with the regenerative braking. Specifically, a stroke simulation piston (SS piston) 410 for absorbing the shift of the brake pedal 2 is provided to the brake piping. The third chamber 9g is connected to the master reservoir 3a and not connected to the M/C 3. As a result, the diameter of the M/C 3 is miniaturized similarly to the twenty-second embodiment. Further, the first control valve 10 is of a normally closed type. The pipeline B connecting between the second chamber 9c and the M/C 3 side, and the check valve 12 (See FIG. 1) in the first embodiment are not provided.

As shown in FIG. 32, SS piston 410 has a piston portion (the second step piston) 411, a first chamber 412, a second chamber 413 and a spring 414. The first and second chambers 412, 413 are formed by the piston portion 411 and its guide wall. In the SS piston 410, the first chamber 412 is connected to the pipeline A1 between the amplifying piston 9 and the first control valve 10, and the second chamber 413 is connected to the M/C 3 side. Accordingly, the SS piston 410 is operated based on the differential pressure between the W/C pressure and the M/C pressure.

A pressure-receiving surface of the piston portion 411, which is exposed to the M/C pressure, is larger than that exposed to the W/C pressure. The piston portion 411 is pushed toward the M/C 3 side by the spring 414. Therefore, the piston portion 411 is located at the most M/C 3 side when the M/C pressure is not generated. The biasing force of spring 414 is stronger than that of an usual simple return spring to an extent that while a given relationship between the brake pressure of the first chamber 412 and that of the second chamber 411 is maintained, the piston portion 411 can slide on the guide wall. A chamber formed by the stepped portion of the piston portion 411 and the guide wall is provided with an atmosphere pressure air or is connected to the master reservoir 3a under the atmosphere pressure.

In this construction, the pipeline A1 is selected as the pressurizing path at the W/C low pressure timing, and the W/C 4, 5 are pressurized by the amplifying piston 9. When the brake fluid due to the regenerative braking is escaped via the linear valve 17 by cooperation control with the regenerative braking, the differential pressure between the W/C pressure and the M/C pressure is decreased, and the escaped brake fluid is reserved in the second chamber 9c. Therefore, the shift of the brake pedal 2 can be absorbed since the second chamber 9c serves to prevent the brake fluid due to the regenerative braking from feedbacking to the M/C 3. Moreover, a pushing back of the brake pedal 2 due to the feedback of the brake fluid to the M/C 3 is suppressed.

The brake fluid to be escaped at the regenerative braking can be reserved in the second chamber 413 by adequately setting a pressure-receiving surface ratio of large diameter portion to the small diameter portion of the piston portion 411 and a spring constant of the spring 414.

On the other hand, the pipeline A2 is selected as the pressurizing path at the W/C high pressure timing, and the W/C 4, 5 are pressurized by the discharge pressure of the pump 8 directly. The amplifying piston 9 and the SS piston 410 do not work because the first control valve 10 is closed. In this case, the W/C 4, 5 are pressurized by the path through the M/C 3, the linear valve 17, the second control valve 11, the W/C 4, 5. As mentioned-above, even if the diameter of the M/C 3 is smaller, the ratio of pressurizing amount to pedal pressure of the brake pedal 2 is larger.

Twenty-Fourth Embodiment

Figure 33:
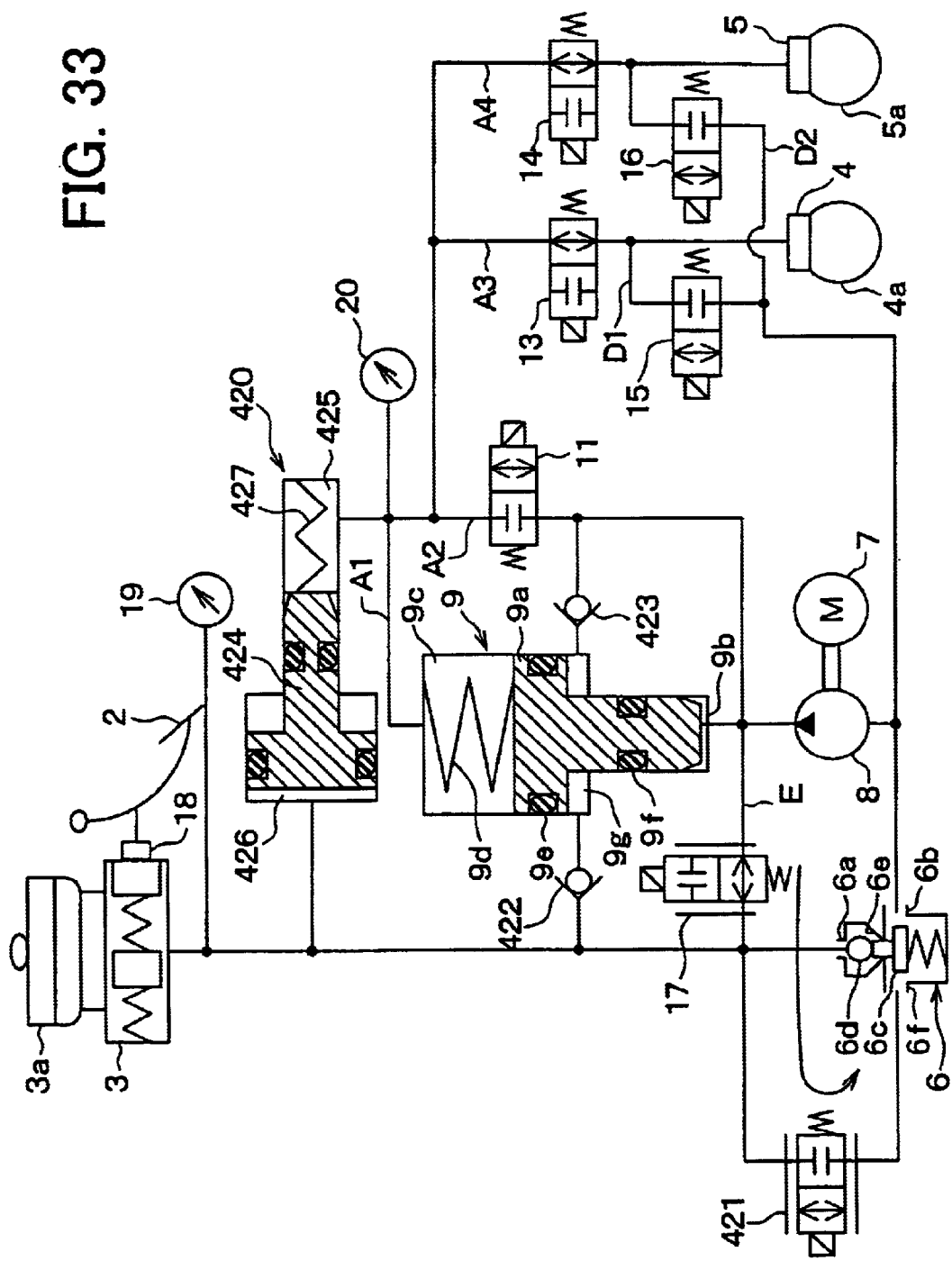
FIG. 33 is a schematic view of a brake system according to a twenty-fourth embodiment of the present invention.

FIG. 33 shows a brake system of twenty-fourth embodiment. This brake system is modified from the first embodiment so as to cooperate with the regenerative braking.

Specifically, an amplifying piston 420 is provided in the brake piping, and a third reservoir port 6f is formed at the pressure regulating reservoir 6. The third reservoir port 6f is connected to the first reservoir port 6a via a linear valve 421. A check valve 422 is employed between the third chamber 9g and the M/C 3 to permit the brake fluid to flow only from the M/C 3 side to the third chamber 9g. Moreover, the second control valve 11 is of normally closed valve. The third chamber 9g is connected to the pipeline A2 between the discharge port of the pump 8 and the second control valve 11 via the check valve 423. The check valve 423 allows the brake fluid to flow only from the third chamber 9g to the pipeline A2 side. The control valve 10, which is provided in the first embodiment, is not provided, and the second chamber 9c is not connected to the M/C 3.

As shown in FIG. 33, the amplifying piston 420 has a piston portion (a second step piston) 424, a first chamber 425, a second chamber 426 and a spring 427. The first and second chamber 425, 426 are formed by the piston portion 424 and its guide wall. In this amplifying piston 420, the first chamber 425 is connected to the pipeline A1 between the amplifying piston 9 and the pressurization control valves 13, 14, and the second chamber 426 is connected to the M/C 3 side. This amplifying piston 420 is operative based on a difference between the W/C pressure and the M/C pressure.

The piston portion 424 has a small diameter portion that is pushed by the W/C pressure and a large diameter portion that is pushed by the M/C pressure. The piston portion 424 is biased toward the M/C 3 side by the spring 427. Therefore, the piston portion 424 is located at the most M/C 3 side when the M/C pressure is not generated. The biasing force of spring 414 is as large as a simple return spring. A chamber formed by the stepped portion of the piston portion 424 and the guide wall is provided with an atmosphere pressure air or is connected to the master reservoir 3a under to the atmosphere pressure.

In this construction, the pipeline A1 is selected as the pressurizing path at the W/C low pressure timing and at the urgency braking, so that the second control valve 11 is closed. On the other hand, the second control valve 11 is opened at the W/C high pressure timing, so that the W/C 4, 5 are pressurized by the discharge pressure of the pump 8. Therefore, both the discharge pressure of the pump 8 and the pedal pressure of the brake pedal 2 are used effectively for pressurizing the W/C 4, 5.

Further, when the cooperation control with the regenerative braking is executed, the amplifying piston 9 is not used. In this case, while the second control valve 11 is opened, the W/C pressure is rated by driving the linear valve 17. The linear valve 421 is driven appropriately, the reduced brake fluid due to the regenerative braking can be escaped to the pressure regulating reservoir 6 via an arrow path shown in FIG. 33. Therefore, the shift of the brake pedal 2 is suppressed.

Twenty-Fifth Embodiment

Figure 34:
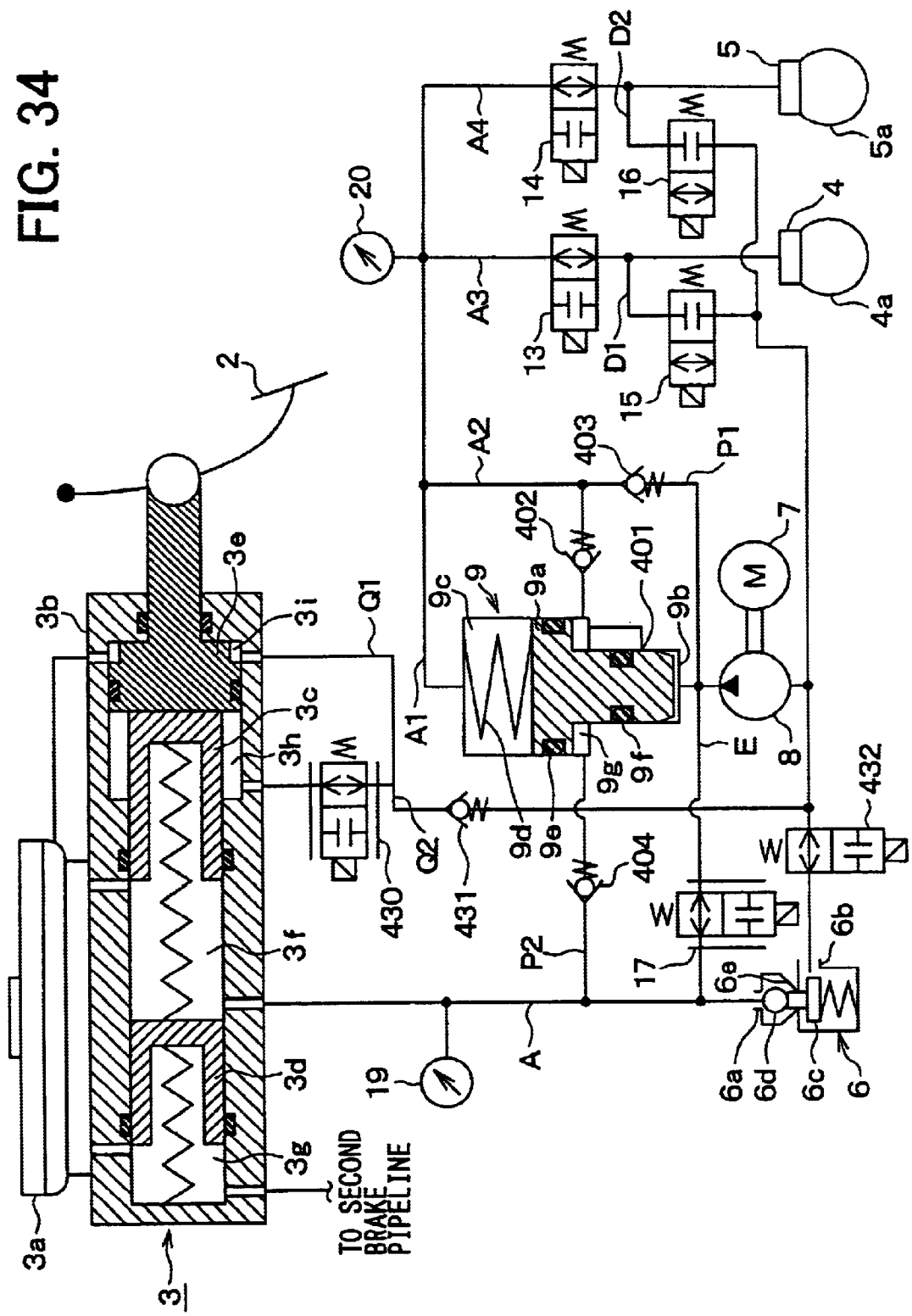
FIG. 34 is a schematic view of a brake system according to a twenty-fifth embodiment of the present invention.

FIG. 34 shows a brake system of twenty-fifth embodiment. This brake system is modified from the twentieth embodiment, so that an effective diameter of the M/C 3 is variable to improve the brake efficiency at the malfunction of an electrical system.

As shown in FIG. 34, the M/C 3 has a cylindrical housing 3b, small diameter pistons 3c, 3d and a large diameter piston 3e. The small diameter pistons 3c, 3d are accommodated in the housing 3b and slides on the guide wall constituting the inner wall of the housing. They are linked with each other. The large diameter piston 3e, whose diameter is larger than that of the small diameter pistons 3c, 3d, acts as an input piston.

The small diameter pistons 3c, 3d are a primary piston and a secondary piston respectively. A primary chamber 3f is formed between both of the small diameter pistons 3c, 3d, and a secondary chamber 3g is formed between the small diameter piston 3c and the end wall of the housing 3b. The primary chamber 3f is connected to the first brake piping, and the secondary chamber 3g is connected to the second brake piping. Moreover, both of the primary and secondary chambers 3f, 3g communicate with the master reservoir 3a before the small diameter pistons 3c, 3d are operated, and do not communicate with the master reservoir 3a after the small diameter pistons 3c, 3d are operated.

Further, there are two chambers 3h, 3i on opposite sides of the large diameter piston 3e. One of the chambers is a ratio change chamber 3h that is located on a side of the small diameter pistons 3c, 3d side so as to surround a circumference of the small diameter piston 3c. The other chamber 3i is located on a side of the brake pedal 2 and is connected to the master reservoir 3a. The ratio change chamber 3h and the chamber 3i are connected to each other via a pipeline Q1. A switching valve 430 is employed in the pipeline Q1. The pipeline Q1 is opened or closed by the switching valve 430. The switching valve 430 is of a normally open valve and is set to the position shown in FIG. 34 when its solenoid is not energized.

The chamber 3i is connected to the intake port side of the pump 8 via a pipeline Q2. The pipeline Q2 is connected to the pipeline Q1 between the switching valve 430 and the chamber 31. A check valve 431 is employed in the pipeline Q2 and allows the brake fluid to flow only from the ratio change chamber 3h and the chamber 3i to the discharge port side of the pump 8.

Further, a control valve 432 is employed in the pipeline A. The control valve 432 is located between the intake port of the pump 8 and the second reservoir port 6b of the pressure regulating reservoir 6, and is located on a side of the regulating reservoir 6 with respect to the connecting position between the pipeline A and the pipeline Q2.

The control valve 432 controls open and close conditions of the pipeline A. With this construction, either a path or the pressure regulating reservoir 6 side or a path on the master reservoir 3a side through the chamber 3i is selected for sucking the brake fluid to the pump 8.

When the cooperation control with the regenerative braking is not executed, the switching valve 430 is closed and the control valve 432 is opened. Then, if the driver pushes the brake pedal 2, the large diameter piston 3e is pushed so as to generate the brake pressure in the ratio change chamber 3h according to the pedal pressure of the brake pedal 2. Moreover, the small diameter piston 3c is moved by this brake pressure. The small diameter piston 3c move so as to be separated little by little from the large diameter piston 3e because the diameter of the small diameter piston 3c is smaller than that of the large diameter piston 3e. Accordingly, the brake fluid pressures of the primary and the secondary chambers 3f, 3g are pressurized by the small diameter pistons 3c, 3d, so that the W/C 4, 5 is pressurized, even if a diameter of the M/C 3 is small. The selection of the pressurizing path in this case is same as the twentieth embodiment.

Further, when the cooperation control with the regenerative braking is executed, the switching valve 430 and the control valve 432 are opened or closed selectively. Then, if the driver pushes the brake pedal 2, the large diameter piston 3e is pushed based on the pedal pressure of the brake pedal 2. However, while the switching valve 430, as a linear valve, controls the differential pressure between both sides thereof, the brake fluid in the ratio change chamber 3h is escaped through the pipeline Q1, the chamber 3i, and the master reservoir 3a so that the brake fluid pressure in the ratio change chamber 3h is regulated. Accordingly, the small diameter piston 3c moves toward the large diameter piston 3e side, and the M/C pressure is lowered, compared to the case that the cooperation control with the regenerative braking is not executed.

When the regenerative braking is stopped, the W/C pressure is increased again. Then, if the control valve 432 are opened or closed from time to time, the brake fluid may be supplied from the master reservoir 3a side to the W/C 4, 5 side via the chamber 3i and the pipelines Q1, Q2. Therefore, the W/C pressure is increased to the same pressure as when the cooperation control with the regenerative braking is not executed. The brake fluid reserved in the pressure regulating reservoir 6 is preferentially sucked by the pump 8. Accordingly, an excessive brake fluid is not sucked from the master reservoir 3a.

Moreover, the switching valve 430 is opened at a malfunction of an electrical system, and, therefore, the brake fluid in the ratio change chamber 3h is escaped according to the operation of the large diameter piston 3e. Accordingly, the reactive force of the brake pedal 2 is not generated by the brake fluid pressure in the ratio change chamber 3h. It follows that the large diameter piston 3e directly pushes the small diameter piston 3c, thereby generating the M/C pressure. As a result, W/C 4, 5 can be pressurized by the small diameter M/C 3, thereby obtaining the same advantages as the twenty-third embodiment.

Twenty-Sixth Embodiment

Figure 35:
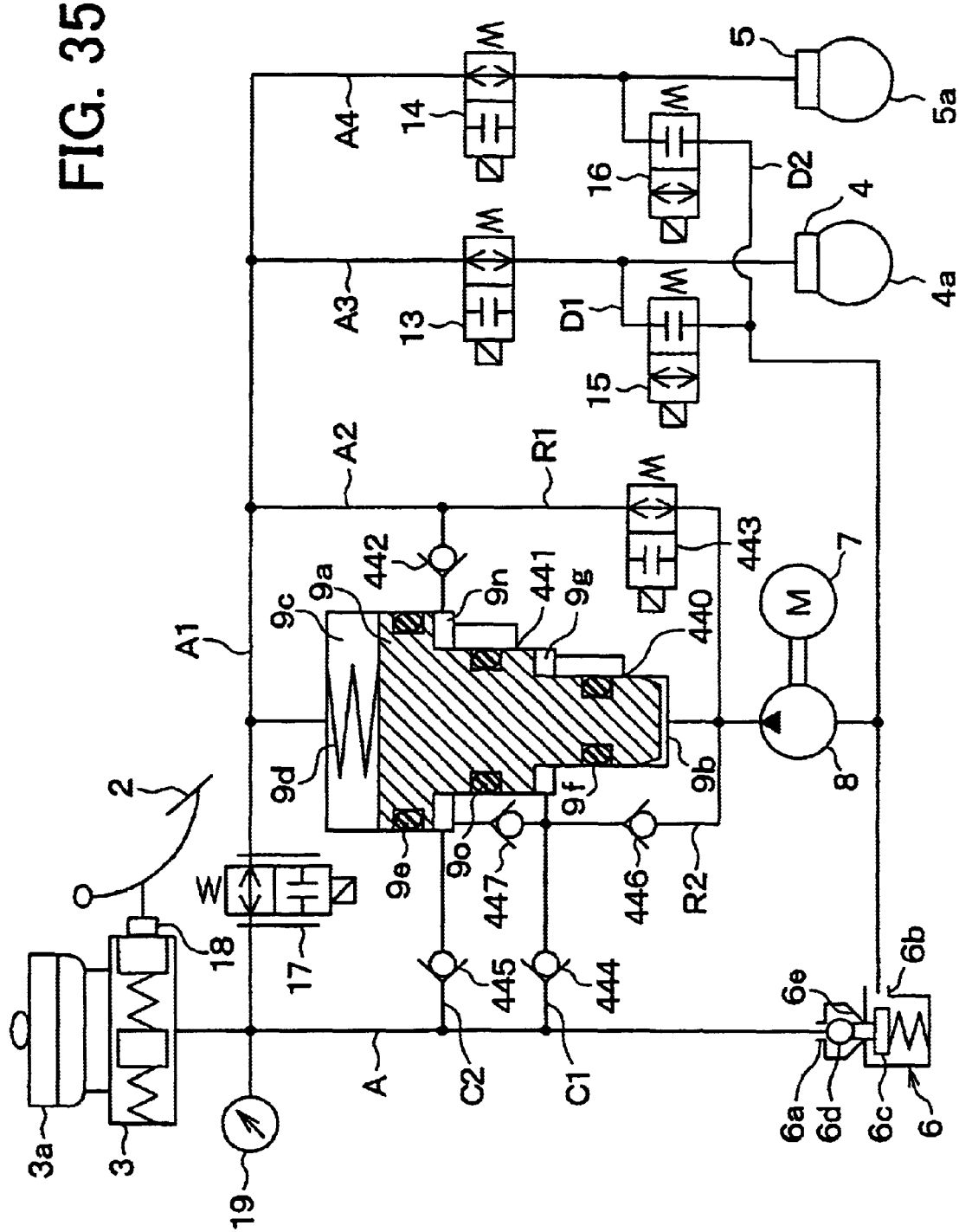
FIG. 35 is a schematic view of a brake system according to a twenty-sixth embodiment of the present invention.

In each of the above embodiments, a step number of the amplifying piston 9 is one. However, the step number thereof may be plural. FIG. 35 shows one example that the step number of the amplifying piston 9 is two.

As shown in FIG. 35, the amplifying piston 9 has a middle diameter portion that is formed between the small and the large diameter portion. Accordingly, a fourth chamber 9n is formed by the middle diameter portion and the guide wall. A seal member 9o are provided around a middle diameter portion of the step piston 9a to forbid the brake fluid leak. Spool valve unit 440, 441 are provided in the guide walls that accommodate the small or the middle diameter portion of the step piston 9a. The spool valve unit 440 is connected to the third chamber 9g, and the spool valve unit 441 is connected to the fourth chamber 9n. Further, the fourth chamber 9n is connected to the W/C 4, 5 side, and, therefore, the pipeline A2 is formed by a path through the spool valve unit 440, the third chamber 9g, the spool valve unit 441 and the fourth chamber 9n.

In the pipeline A2, a check valve 442 is provided between the fourth chamber 9n and the W/C 4, 5 to allow the brake fluid to flow only from the fourth chamber 9n to the W/C 4, 5 side. The pipeline A2 downstream from the check valve 442 is connected to the discharge port of the pump 8 via a pipeline R1, which constitutes a second feedback path. A switching valve 443 is provided in the pipeline R1. The pipeline R1 is opened as necessary to play a role of the pipeline A2 so that the W/ C4, 5 is directly pressurized by the discharging pressure by the pump 8 via the pipeline R1.

Moreover, the third and the fourth chamber 9g, 9n are connected to the M/C 3 side via the pipelines C1, C2. Each of check valves 444, 445 is provided in each of the pipelines C1, C2 to allow the brake fluid to flow only from the M/C 3 side to each of the third and the fourth chambers 9g, 9nsides. A pipeline R2, which constitutes a second feedback path, is provided to connect the third and the fourth chambers 9g, 9n to the discharge port side of the pump 8. The pipeline R2 is connected between the pipeline C1 between the check valve 444 and the third chamber 9g and the discharge port of the pump 8, a check valve 446 is provided between its connected point and, a check valve 447 is provided between its connected point and the fourth chamber 9n. The check valves 446, 447 allow the brake fluid to flow only from the third or the fourth chamber 9g, 9n side to the discharge port side of the pump 8.

Moreover, in this embodiment, the linear valve 17 is arranged between the pipeline A1 and the M/C 3. Accordingly, the brake pressure is regulated based on the differential pressure between the M/C pressure and the W/C pressure.

With this construction, the control valve 443 is closed at the W/C low pressure timing. Therefore, the brake fluid is supplied to the first chamber 9b based on the discharge pressure by the pump 8, thereby driving the step piston 9a. Then, if the step piston 9a moves by a predetermined distance, the spool valve unit 440 is opened and the brake fluid is provided to the third chamber 9g. As a result, the step piston 9a is moved based on the differential pressure between the first and third chamber 9b, 9g and the second chamber 9c.

Further, if the step piston 9a further moves by a predetermined distance, the spool valve unit 441 is opened, and the brake fluid is also provided to the fourth chamber 9n.

When the A2 is selected as the pressurizing path, the control valve 443 is opened. Therefore, the pipeline R1 plays a role of pressurizing path in place of the pipeline A2. The discharge pressure of the pump 8 is supplied to the W/C 4, 5 via the pipeline R1, and not via the pipeline A2. Accordingly, the brake fluid reserved in the third and fourth chamber 9g, 9n is returned to the discharge port side of the pump 8 via the pipeline R2 through the check valves 446, 447.

As a result, the step piston is returned to the initial position and will move speedy if the amplifying function is demanded later.

Twenty-Seventh Embodiment

An urgency control such as ABS control can be executed by each brake system shown in each of the above embodiments. For example, ABS control is executed as follows.

Figure 36:
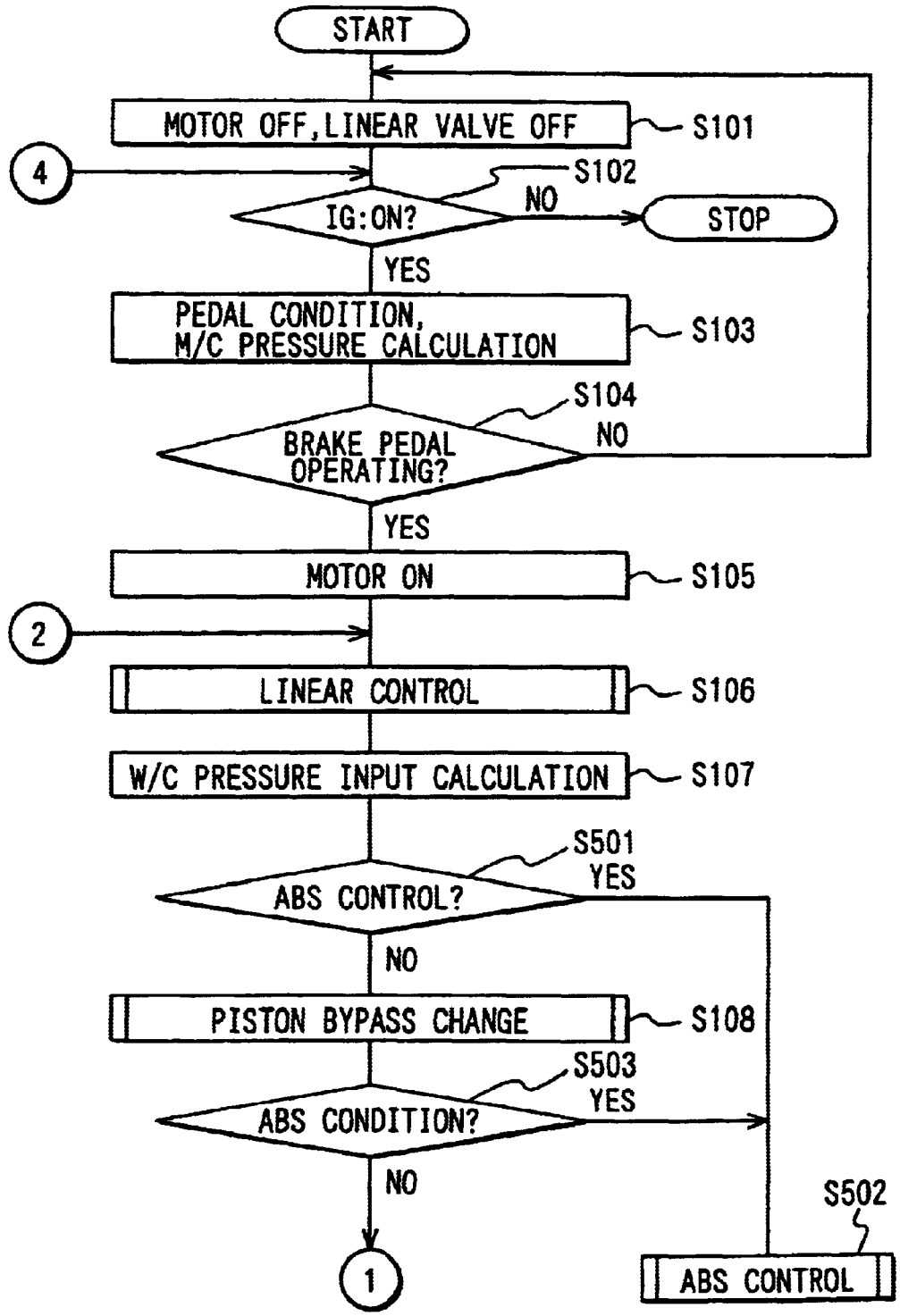
FIG. 36 is a flowchart showing a process executed by the brake control ECU when the brake control ECU executes ABS control.
Figure 37:
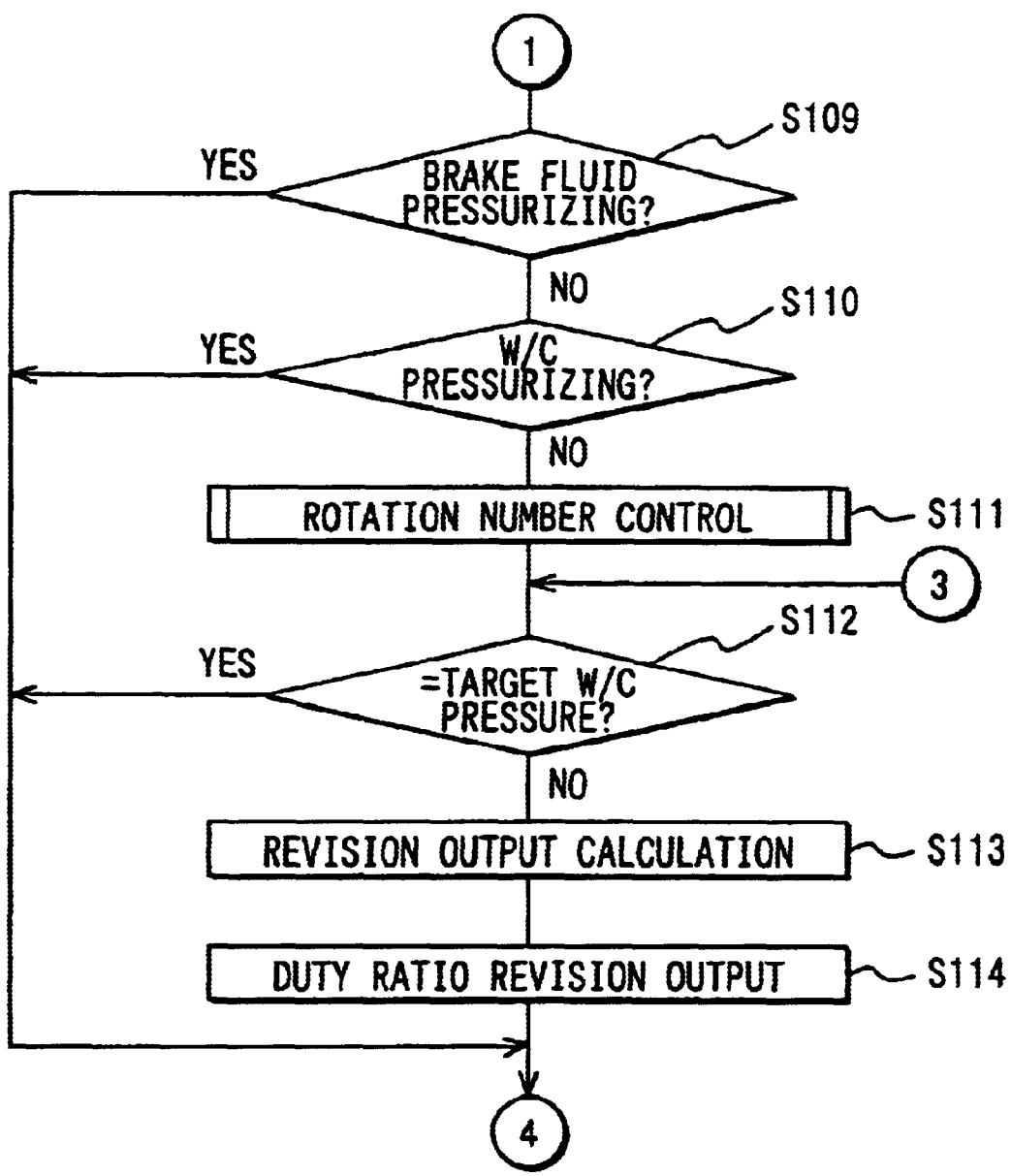
FIG. 37 is another flowchart continuing from that of FIG. 36.
Figure 38:
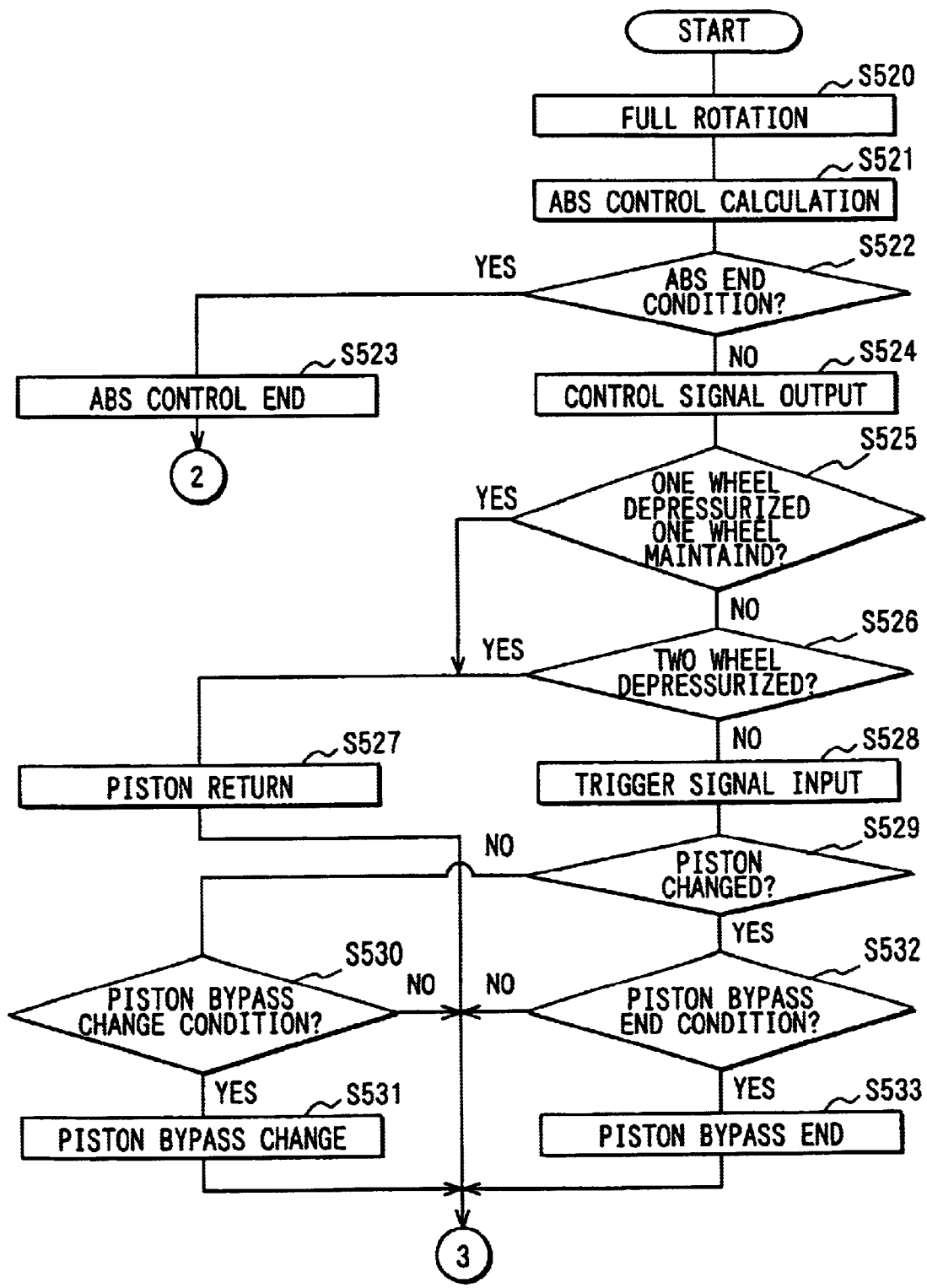
FIG. 38 is a flowchart showing ABS control processing.

FIG. 36–38 show flow diagrams to be executed by the brake system. The brake system in the first embodiment is used as one example of this embodiment. This processing is basically the same processing as the FIG. 2–5, and therefore only different point is described.

First, at steps 101–107, each processing as in the FIG. 2 is executed step by step. Then, at step 501, whether the ABS control is executed or not is determined. This is determined by a flag or the like that is set when the ABS control starting condition is satisfied. The processing advances to step 502 in response to an affirmative determination (Yes), and the ABS control is executed. The detail of the ABS control is described later.

On the other hand, the processing advances to step 108 in response to a negative determination (No), and the amplifying piston bypass change processing is executed. This processing is the same as shown in FIG. 3 in the first embodiment. Then, the processing advances to the step 503 to determine whether or not the ABS control starting condition is satisfied. The ABS control starting condition is the same as the well known conditions, i.e., when the slip ratio calculated based on the sensing signals from the wheel speed sensors 22, 23 exceeds a predetermined threshold level.

The flag indicative of a state under the ABS control is set in response to an affirmative determination (Yes), and then the ABS control processing is executed at step 502. To the contrary, the brake control ECU 1 executes the processing after step 109, which is shown in FIG. 37, in response to a negative determination (No). Moreover, if the flag is still setting, the brake control ECU 1 make the flag reset. Those processing after step 109 are similar to the processing shown in FIG. 2 in the first embodiment.

FIG. 38 shows the ABS control processing at step 502.

First, when the ABS control processing starts, motor full rotation is executed at step 530. Then, the motor 7 is rotated so that the brake fluid to be depressurized at the ABS depressurization timing can be sucked by the pump 8 to depressurize the W/C pressure. The processing advances to the step 521, and a calculation for the ABS control is executed. This calculation is executed at an usual ABS control timing, i.e., the wheel speed, an estimate vehicle speed, the slip efficiency and the like are calculated.

The processing advances to step 522 to determine whether the ABS control end condition is satisfied or not. For example, the ABS control end condition is "when the vehicle is stopped". The processing advances to the step 523 in response to an affirmative determination (Yes). The ABS control end processing, for example, each solenoid of the control valve is turned off. Then the processing returns to step 106. To the contrary, the processing advances to the step 524 in response to a negative determination (No), and the control signal is output to each wheel. That is, a preferable control way (pressurizing, maintaining or depressurizing) to be executed is determined. Then, a signal for executing the determined control is output. As a result, each of the control valves is controlled according to the determined control.

Next, the processing advances to steps 525, 526 to determine whether the amplifying piston 9 should be used or not. Specifically, the step 525 determines whether or not the signal outputted at step 524 is a signal that controls one wheel whose W/C pressure is depressurized and the other wheel whose W/C pressure is maintained in each brake piping. Moreover, the step 526 determines whether or not the signal outputted at step 524 is a signal that controls both wheels whose W/C pressures are depressurized in each brake piping. Namely, when the pressurization of the W/C pressure is required, the amplifying piston 9 should be used, and therefore the brake control ECU 1 selects which case is applicable. For example, these control signals mean the output signal for controlling at least one of the wheel whose W/C pressure is pressurized, or the output signal for controlling both of the wheels whose W/C pressures are maintained with a possibility of changing later into an output signal for pressurizing both of the wheels.

The processing advances to step 527 in response to an affirmative determination at step 525 or 526 to execute the amplifying piston return processing. For example, the first control valve 10 is set to the open position, and the second control valve 11 is set to closed position so that the amplifying piston 9 is returned. After this processing, the processing advances to step 112. Then the processing as shown in FIG. 2 in the first embodiment is executed.

On the other hand, the processing advances to the step 528 in response to a negative determination at steps 525, 526 to execute a switching trigger sensor signal input calculation. And, then, the processing advances to step 529 to determine whether the amplifying piston 9 is switched or not. The processing advance to step 530 in response to a negative determination (No) to determine the piston bypass changing condition is satisfied or not. To the contrary, the processing advance to step 532 to determine the amplifying piston bypass changing end condition is satisfied or not.

Next, the processing advances to step 531 in response to an affirmative determination (Yes). Then, the amplifying piston bypass changing processing is executed, and the processing advances to step 112. The processing advances to step 533 in response to a negative determination (No) to execute the amplifying piston bypass end processing. Then, the processing advances to step 112. To the contrary, the processing advances to 112 in response to a negative determination (No) at step 530 or 532. Those processing after step 428 are similar to the processing at steps 301–304, 307 and 308 shown in FIG. 4 in the first embodiment.

The ABS control timing, the amplifying piston 9 is returned to the initial position side, according to the requirement of use of the amplifying piston 9. As a result, the amplifying piston 9 can move speedy if the amplifying function is demanded later. The brake system in which the pressurizing path is changed over can execute the ABS control in this manner.

Figure 39:
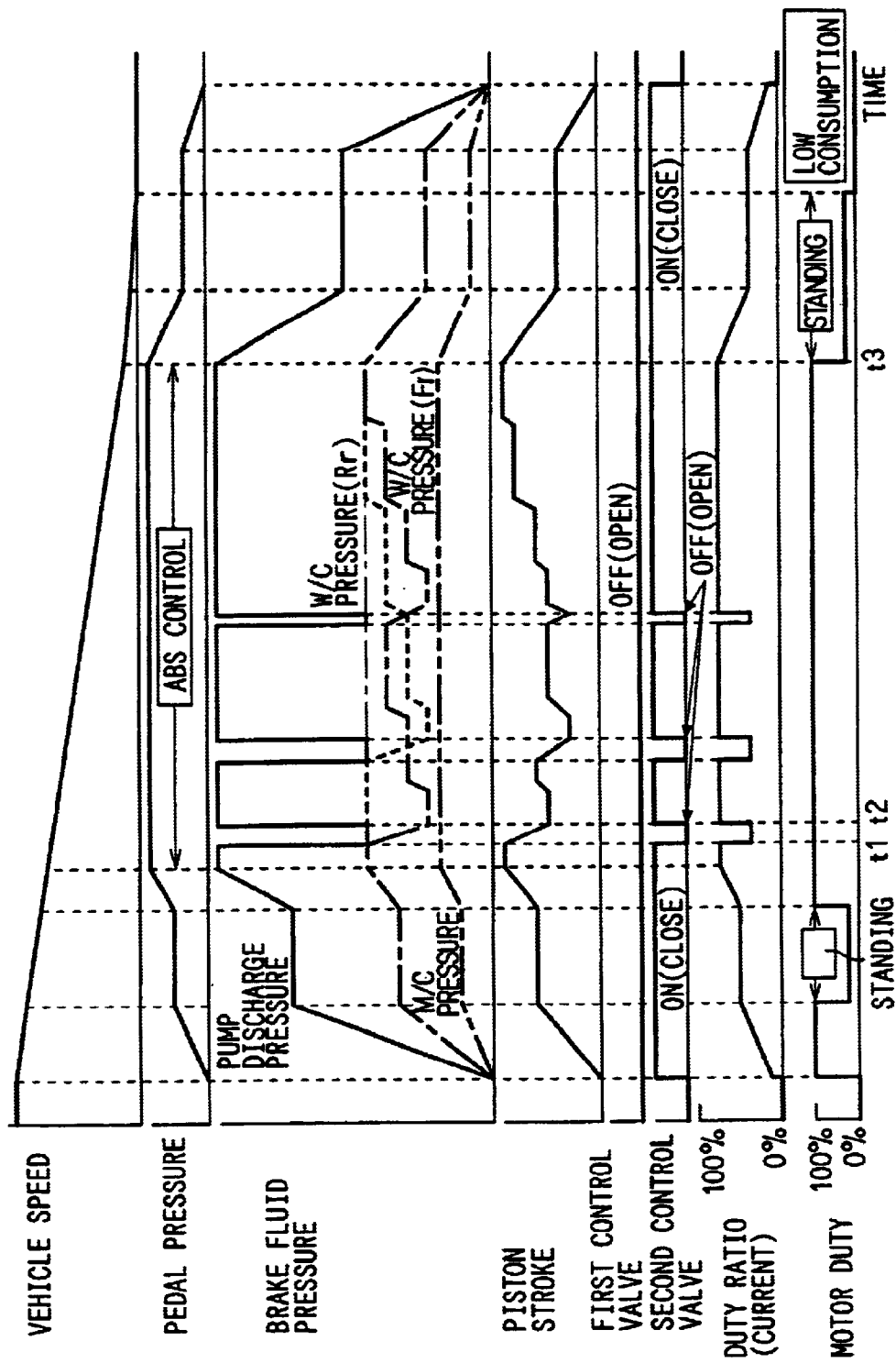
FIG. 39 is a timing diagram showing an operation of the brake system.

FIG. 39 is a referential time diagram when the processings shown in FIGS. 36–38 are executed. This shows the case that the ABS control is executed. The vehicle speed calculated based on the sensing signals from the wheel speed sensors 22, 23, the pedal pressure of the brake pedal 2, the brake fluid pressure (the discharge pressure of the pump 8, the M/C pressure, the W/C pressure), stroke amount of the amplifying piston 9, the ON/OFF condition of the first and second control valves 10, 11, the duty ratio of the current to the linear valve 17 and the duty ratio of the current to the motor 7 are shown in FIG. 39.

The changes of the elements shown in the time diagram are basically the same as in FIG. 6. However, the change at the ABS control during the period between t1 and t3 are different from those of FIG. 6.

First, the ABS control starts at term t1. Then, the condition of each wheel that should be controlled, i.e., pressurizing condition, maintaining condition or depressurizing condition, is determined based on the calculated result of the ABS control calculation. For example, the front right wheel Fr side is controlled as the depressurizing condition, and the rear right wheel Rr side is controlled as the maintaining condition as in the FIG. 39. At the same time, the second control valve 11 is opened, and, therefore, the first and second chambers 9b, 9c become the same pressure. As a result, the amplifying piston 9 is returned to the initial position side (See step 527).

Next, when the both of wheels are controlled as the maintaining condition at term t2, the amplifying piston 9 stops returning. Further, when one of wheels is controlled as the pressurizing condition (pulse pressurization), the W/C 4, 5 are pressurized again by using the amplifying piston 9. Then, such processing continues during the terms t1–t3.

As mentioned above, the W/C 4, 5 can be pressurized by using the amplifying piston 9 while the ABS control is executed. Therefore, each of the wheels can be pressurized with high response.

Modifications

In the above embodiments, the brake systems has the rotating pump or the like as the pump 8, but may have the other type of pump such as a piston pump.

In steps 303, 305, 306 of the first embodiment, the trigger conditions for changing pressurizing path from the pipeline A1 to the pipeline A2 are only examples. Accordingly, a part of these conditions or the other conditions may be employed.

In steps 305, 306 of the first embodiment, the pipeline A2 is selected as the normal braking that does not require high pressurization, or not at the urgency braking. However, the selection of the pipeline A2 is not essential.

In the first embodiment or the like, the pipeline A2 is connected between the discharge port side of the pump 8 and the first chamber 9b. However, the pipeline A2 may be connected to any position where fluid pressure is the same as the first chamber 9b. That is, the pipeline A2 has only to be connected to the first chamber 9b.

In the twenty-seventh embodiment, the pipeline A1 is selected to use the amplifying piston 9 at the urgency control time. However, there is a possibility that the urgency control needs longer time. Therefore, in order to pressurize the W/C 4, directly, the pipeline A2 may be selected always when the urgency control is required.

What is claimed is:

1. A brake fluid pressure control device for a vehicle comprising:
    a master cylinder for generating a first brake fluid pressure according to an operating condition of a brake pedal;
    a wheel cylinder to which a second brake fluid pressure is applied for brake control;
    a hydraulic booster for producing the second brake fluid pressure that is higher than the first brake fluid pressure;
    a main pipeline connecting the master cylinder to the wheel cylinder via the hydraulic booster; and
    a fluid pressure regulating unit whose one end is connected to the hydraulic booster and whose other end is connected to the main pipeline between the master cylinder and the hydraulic booster, the fluid pressure regulating unit holding a pressure difference between the first and second brake fluid pressure to a rated value, the rated value variable according to the operating condition of the brake pedal;
    wherein the hydraulic booster has a pump unit having intake and discharge ports, a flow amount amplifying unit, first and second pipelines through which the flow amount amplifying unit and the pump unit are able to communicate with the main pipeline on a side of the wheel cylinder, respectively, and a flow amount amplification changing unit,
    the pump unit is operative, always when the brake pedal is engaged, and during normal braking, to draw, via the intake port, brake fluid from the main pipeline between the master cylinder and the fluid pressure regulating unit and to compress and discharge via the discharge port the brake fluid to the second pipeline,
    the flow amount amplifying unit to which the brake fluid discharged from the pump unit is supplied from the second pipeline and from which the brake fluid whose amount is larger than that supplied thereto is discharged to the first pipeline,
    and the flow amount amplification changing unit operative to select one of the first and second pipelines as a pressurizing path through which the brake fluid from the hydraulic booster is discharged to the main pipeline on a side of the wheel cylinder for producing the second brake fluid pressure and to always selected first pipeline for a given period immediately after the brake pedal is engaged.

2. A brake fluid pressure control device as in claim 1, wherein the flow amount amplification changing unit selects the first pipeline as the pressurizing path when a load of the pump unit is less than a predetermined value, and selects the second pipeline as the pressurizing path when the load of the pump unit is more than the predetermined value.

3. A brake fluid pressure control device as in claim 1, wherein the flow amount amplification changing amplifying unit selects the one of the first and second pipelines as the pressurizing path based on a value of the second brake fluid pressure.

4. A brake fluid pressure control device as in claim 1, wherein the flow amount amplification changing unit selects the one of the first and second pipelines as the pressurizing path based on a pressure value of the brake fluid discharged from the pump unit.

5. A brake fluid pressure control device as in claim 1, wherein the flow amount amplification changing unit selects the one of the first and second pipelines as the pressurizing path based on an amount of the brake fluid discharged from the pump unit.

6. A brake fluid pressure control device as in claim 5, wherein the flow amount amplification changing unit has an orifice provided in the second pipeline between the discharge port of the pump unit and a branch point from which the brake fluid discharged from the pump unit is supplied to the flow amount amplifying unit; and a bypass valve provided in the second pipeline between the branch point and the main pipeline on a side of the wherein cylinder, the bypass valve operative to be closed when a difference between pressure of the brake fluid discharged from the pump unit and pressure of the brake fluid discharged from the flow amount amplifying unit is below a predetermined value.

7. A brake fluid pressure control device as in claim 1, wherein the flow amount amplification changing unit selects the one of the first and second pipelines as the pressurizing path based on a difference between the first and second brake fluid pressures.

8. A brake fluid pressure control device as in claim 1, wherein the flow amount amplification changing unit selects the one of the first and second pipelines as the pressurizing path based on a difference between a pressure of the brake fluid discharged from the pump unit and pressure of the brake fluid discharged from the flow amount amplifying unit.

9. A brake fluid pressure control device as in claim 1, wherein the pump unit has a pump and a motor for driving the pump, and the flow amount amplification changing unit selects the one of the first and second pipelines as the pressurizing path based a rotation number of the motor.

10. A brake fluid pressure control device as in claim 1, wherein the pump unit has a pump and a motor for driving the pump, and the flow amount amplification changing unit selects the one of the first and second pipelines as the pressurizing path based on a current amount applied to the motor.

11. A brake fluid pressure control device as in claim 1, wherein the fluid pressure regulating unit holds the pressure difference to the rated value defined by a current amount applied thereto, and the flow amount amplification changing amplifying unit selects the one of the first and second pipelines as the pressurizing path based on the current amount applied to the fluid press regulating unit.

12. A brake fluid pressure control device as in claim 1, wherein the fluid pressure regulating unit holds the pressure difference to the rated value defined by a duty ratio of current applied thereto, wherein the flow amount amplification changing unit selects the one of the first and second pipelines as the pressurizing path based on the duty ratio of current applied to the fluid pressure regulating unit.

13. A brake fluid pressure control device as in claim 1, wherein a demand difference between an urgency brake control and a normal brake control is determined according to vehicle conditions, and the flow amount amplification changing unit selects the one of the first and second pipelines as the pressurizing path based on the demand difference.

14. A brake fluid pressure control device as in claim 1, wherein the flow amount amplifying unit comprises a first step piston whose one end on a brake fluid supply side is provided with a small pressure-receiving surface and whose another end on a brake fluid discharge side is provided with a large pressure-receiving surface so that the amount of the brake fluid to be discharged is amplified by an area ratio of the large pressure-receiving surface to the small pressure-receiving surface, compared to that to be supplied.

15. A brake fluid pressure control device as in claim 1, wherein the flow amount amplifying unit comprises a first step piston whose one end is provided with a small diameter portion and whose another end is provided with a large diameter portion, a first guide wall on which the small diameter portion slides a first chamber surrounded by the first guide wall and a back surface of the small diameter portion, a second guide wall on which the large diameter portion slides, and a second chamber surrounded by the second guide wall and a front surface of the large diameter portion, wherein the brake fluid discharged from the pump unit is supplied to the first chamber, and the brake fluid amplified according to a stroke movement of the first step piston is discharged from the second chamber to the first pipeline.

16. A brake fluid pressure control device as in claim 15, wherein the flow amount amplification changing unit includes a structure wherein the sound pipeline penetrates the first guide wall so that the flow amount amplification changing unit selects the second pipeline as the pressurizing path when the first step piston finishes a given amount of the stroke movement.

17. A brake fluid pressure control device as in claim 15, wherein the flow amount amplification changing unit comprises a first control valve, provided in the first pipeline, for controlling the brake fluid flow of the first pipeline, and a second control valve, provided in the second pipeline, for controlling the brake fluid flow of the second pipeline.

18. A brake fluid pressure control device as in claim 17, wherein the flow amount amplifying unit has a third chamber surrounded by a back surface of the large diameter portion and the second guide wall, and the third chamber is provided with one of atmospheric pressure air and atmospheric pressure brake fluid, and, further, wherein the first and second control valves are normally open valves that open the first and second pipelines, respectively, when not energized, and close the first and second pipelines, respectively, when energized.

19. A brake fluid pressure control device as in claim 16, wherein a circumferential surface of the small diameter portion is provided with a seal member for sealing between the first and second chambers, and wherein the second pipeline communicates with the first chamber through a clearance between the small diameter portion and the first guide wall on a side of the first chamber with respect to the seal member.

20. A brake fluid pressure control device as in claim 19, wherein the first pipeline connected to the second guide wall on which the large diameter portion slides, and a distance S1 between the back surface of the small diameter portion and a position of the first guide wall where the first pipeline is connected is substantially equal to or larger than a distance S2 between the back surface of the small diameter portion and a position of the guide wall where the first pipeline is connected, in a state that the pump unit does not discharge the brake fluid.

21. A brake fluid pressure control device as in claim 15, wherein the flow amount amplification changing unit comprises a first valve element formed at the small diameter portion on a side of the first chamber, a biasing member for urging the first valve element in an opposite direction in which the first step piston moves when the brake fluid is discharged from the pump unit, and a first valve seat formed in the first chamber at a position to which the second pipeline connected so that the biasing member urges the first valve element so as to seat on the first valve seat to close the second pipeline until the first step piston moves by a predetermined distance, and the first valve element leaves the first valve seat to open the second pipeline when the first step piston further moves beyond the predetermined distance.

22. A brake fluid pressure control device as in claim 21, wherein the flow amount amplification changing unit has a second valve element that moves in conjunction with the first step piston, and a second valve seat formed in the second chamber at a position to which the first pipeline is connected so that the first pipeline is closed when the second valve element is seated on the second valve seat according to the movement of the first step piston, and, further, wherein a lift amount S3 of the first valve element is substantially equal to or longer than a lift amount S4 of the second valve element.

23. A brake fluid pressure control device as in claim 15, wherein the flow amount amplifying unit comprises a third chamber surrounded by a back surface of the large diameter portion and the second guide wall, and the third chamber is connected to the main pipeline between the fluid pressure regulating unit and the master cylinder.

24. A brake fluid pressure control device as in claim 23, wherein an effective diameter of the master cylinder is variable.

25. A brake fluid pressure control device as in claim 23, wherein the master cylinder comprises:

a large diameter input piston driven by the brake pedal, primary and secondary pistons, whose each diameter is smaller than that of the input piston, driven by the input piston, a reservoir that reserves brake fluid with atmospheric pressure, a middle chamber formed by the input piston and the primary piston, and a master cylinder pipeline connecting the middle chamber and the reservoir, and an electrical valve is provided in the master cylinder pipeline for controlling communication and interruption between the middle chamber and the reservoir.

26. A brake fluid pressure control device as in claim 25, wherein the electrical valve keeps the middle chamber at atmospheric pressure, when not energized.

27. A brake fluid pressure control device as in claim 15, wherein the flow amount amplifying unit has a third chamber surrounded by a back surface of the large diameter portion and the second guide wall, and the third chamber is provided with one of atmospheric pressure air and atmospheric pressure brake fluid.

28. A brake fluid pressure control device as in claim 15, wherein the flow amount amplifying unit is provided with a third pipeline connecting the second chamber to the main pipeline between the master cylinder and fluid pressure regulating unit; and a check valve provided in the third pipeline for allowing brake fluid to flow only from the main pipeline between the master cylinder and fluid pressure regulating unit to the second chamber.

29. A brake fluid pressure control device as in claim 14, wherein the fluid pressure regulating unit regulates the pressure difference so that the pressure of the brake fluid discharged from the pump unit amplified by the area ratio of the large pressure-receiving surface to the small receiving-surface corresponds to the second brake fluid pressure to be demanded.

30. A brake fluid pressure control device as in claim 14, wherein the flow amount amplifying unit comprises a first step piston whose one end is provided with small diameter portion and whose the other end is provided with a large diameter portion, a first guide wall on which the small diameter portion slides, a first chamber surrounded by the first guide wall and a back surface of the small diameter portion, a second guide wall on which the large diameter portion slides, and a second chamber surrounded by the second guide wall and a front surface of the large diameter portion, and, further, wherein, when an urgency brake control for increasing and decreasing the second brake fluid pressure is required during a time when the brake fluid is discharged to the first pipeline, the flow amount amplification changing unit selects the second pipeline as the pressurizing path so that the first chamber communicates with the second chamber so as to return the step piston to an original position.

31. A brake fluid pressure control device as in claim 17, wherein, when an urgency brake control for increasing and decreasing the second brake fluid pressure is required during a time when the brake fluid is discharged to the first pipeline, the first and second control valves are switched so that the second pipeline is selected as the pressurizing path.

32. A brake fluid pressure control unit as in claim 16, wherein the flow amount amplifying unit has a third chamber surrounded by a back surface of the large diameter portion and the second guide wall and the flow amount amplification changing unit has a spool valve unit formed at the first guide wall so that the second pipeline is routed along a path extending from the discharge port of the pump unit, via the first chamber to the spool valve unit and the third chamber to the main pipeline on a side of the wheel cylinder, and, further, wherein the hydraulic booster is provided with first check valve provided in the second pipeline for allowing brake fluid to flow only from the third chamber to the main pipeline on a side of the wheel cylinder, first feedback pipeline connecting the second pipeline between the first check valve and the main pipeline on a side of the wheel cylinder to the second pipeline between the first chamber and the discharge port of the pump unit;

second check valve provided in the first feedback pipeline for allowing brake fluid to flow only from the main pipeline on a side of the wheel cylinder to the discharge port of the pump unit;

second feedback pipeline for connecting the third chamber to the main pipeline between he master cylinder and the fluid pressure regulating unit; and third check valve provided in the second feedback pipeline for allowing brake fluid to flow only from the main pipeline between the master cylinder and the fluid pressure regulating unit to the third chamber.

33. A brake fluid pressure control device as in claim 14, further comprising: a pedal detecting unit for detecting the pedal depressing state of the brake pedal;
    wherein the fluid pressure regulating unit regulates the pressure difference so that the pressure of the brake fluid discharged from the pump unit amplified by the area ratio of the large pressure-receiving surface to the small receiving-surface corresponds to the second brake fluid pressure, when a detected result of the pedal condition detecting unit requires to promote a deceleration of the vehicle, and
    wherein the fluid pressure regulating unit regulates the pressure difference so that the pressure of the brake fluid discharged from the pump unit corresponds to the second brake fluid pressure, when the detected result of the pedal condition detecting unit requires to maintain or restrict the deceleration of the vehicle.

34. A brake fluid pressure control device as in claim 15, wherein the flow amount amplifying unit is provided with the first step piston having a middle diameter portion between the small and large diameter portion, a third guide wall on which the middle diameter portion slide a third chamber surrounded by the second guide wall and a back surface of the large diameter portion and a fourth chamber surrounded by the third guide wall and a back surface of the middle diameter portion.

35. A brake fluid pressure control device as in claim 34, wherein the flow amount amplifying unit has first and second spool valve units formed in the
    first and the third guide walls on which the small and middle diameter portions slide, and
    the first and second spool valve units communicate with the fourth and third chambers, respectively, and, further,
    wherein the second pipeline is routed along a path extending from the discharge port of the pump unit, via the first chamber, the first spool valve unit, the fourth chamber, the second spool valve unit, and the third chamber to the main pipeline on a side of the wheel cylinder.

36. A brake fluid pressure control device as in claim 35, wherein the hydraulic booster is provided with a first feedback pipeline connecting the respective third and fourth chambers to the second pipeline between the first chamber and the discharge port of the pump unit, and
    a one-way valve provided in the first feedback pipeline for allowing the brake fluid to flow only from the respective third and fourth chambers to the discharge port of the pump unit.

37. A brake fluid pressure control device as in claim 35, wherein the hydraulic booster is provided with
    a check valve provided in the second pipeline for allowing brake fluid to flow only from the third chamber to the main pipeline on a side of the wheel cylinder;
    a second feedback pipeline connecting the second pipeline between the check valve and the main pipeline on a side of the wheel cylinder to the second pipeline between the first chamber and the discharge port of the pump unit; and
    a control valve provided in the second feedback pipeline for controlling communication and interruption of the second feedback pipeline.

38. A brake fluid pressure control device as in claim 14, wherein the hydraulic booster is provided with a pressurization unit having a second step piston having small and large diameter portions, first and second guide walls on which the small and large diameter portions slide, a first chamber surrounded by the first guide wall and a front surface of the small diameter portion and a second chamber surrounded by the second guide wall and a back surface of the large diameter portion, and the first chamber communicates with the first pipeline, and the second chamber communicates with the main pipeline between the master cylinder and the fluid pressure regulating unit, so that brake fluid in the first chamber is pressurized by the first brake fluid pressure applied to the second chamber to increase the second brake fluid pressure.

39. A brake fluid pressure control device as in claim 38, wherein the pressurization unit increases the second brake fluid pressure based on an area ratio of a pressure-receiving surface of the large diameter portion to that of the small diameter portion.

40. A brake fluid pressure control device as in claim 38, wherein the hydraulic booster is provided with a normally closed electrical valve provided in the second pipeline as the flow amount amplification changing unit, and the pressurization unit is provided with a third chamber surrounded by a front surface of the large diameter portion and the second guide wall and the third diameter is provided with one of an atmospheric pressure air and an atmospheric pressure brake fluid.

41. A brake fluid pressure control device as in claim 15, wherein the flow amount amplifying unit has a third chamber surrounded a back surface of the larger diameter portion and the second guide wall, and the third chamber is provided with one of an atmospheric pressure and an atmospheric brake fluid, and further,
    wherein during a cooperative control with a regenerative braking, the first step piston is controlled to return toward an initial position by the fluid pressure regulation unit if it is required to reduce pressure corresponding to a regenerative braking from the second brake fluid pressure to be defined when the regenerative braking is not executed, while the first step piston is pushed stronger if it is required to increase pressure corresponding to a regenerative braking from the second brake fluid pressure to be defined when the regenerative braking is not executed.

42. A brake fluid pressure control device as in claim 41, wherein the hydraulic booster is provided with a first linear valve provided in the second pipeline as the flow amount amplification changing unit for controlling a pressure difference between the discharge port of the pump unit and the main pipeline on a side of the wheel cylinder;
    a third pipeline connecting the main pipeline on a side of the wheel cylinder to the intake port of the pump unit, and
    a second linear valve provided in the third pipeline for controlling a pressure difference between the main pipeline on a side of the wheel cylinder and the intake port of the pump.

43. A brake fluid pressure control device as in claim 42, wherein a the control for generating the pressure difference by the first linear valve is synchronized with the control for driving the fluid pressure regulating unit when the pressure corresponding to the regenerative braking is reduced from the second brake fluid pressure, while the control for generating the differential pressure by the second linear valve is synchronized with the control for driving the fluid pressure regulating unit when the pressure corresponding to the regenerative braking is increased to the second brake fluid pressure.

44. A brake fluid pressure control device as in claim 41, further comprising: a pedal shift absorbing unit provided between the main pipeline on a side of the master cylinder and the first pipeline;

wherein the pedal shift absorbing unit has a second step piston having small and large diameter portions, first and second guide walls on which the small and large diameter portions slide, a first chamber surrounded by the first guide wall and a front surface of the small diameter portion and a second chamber surrounded by the second guide wall and a back surface of the large diameter portion, and the first chamber communicates with the first pipeline, and the second chamber communicates with the main pipeline between the master cylinder and the fluid pressure regulating unit, so that a shift of the brake pedal depending on a pressure fluctuation of the second brake fluid pressure is absorbed by the first brake fluid pressure applied to the second chamber.

45. A brake fluid pressure control device as in claim 44, wherein the second chamber of the pedal shift absorbing unit absorbs the brake fluid to be returned to the main pipeline on a side of the master cylinder by the pressure fluctuation of the second brake fluid pressure, based on an area ratio of a pressure-receiving surface of the large diameter portion to that of the small diameter portion.

46. A brake fluid pressure control device as in claim 44 further comprising: a normally closed electrical valve disposed in the first pipeline for closing the first pipeline when not energized and opening the first pipeline when energized, wherein the second step piston is operated when the electrical valve is energized, while the second step piston is not operated when the electrical valve is not energized.

47. A brake fluid pressure control device as in claim 1, further comprising: a master cylinder pressure detecting unit; wherein the fluid pressure regulating unit regulates the pressure difference based on a detecting result of the master cylinder pressure detecting unit.

48. A brake fluid pressure control device as in claim 1, further comprising: a pedal condition detecting unit for detecting a pedal depressing state of the brake pedal; wherein the fluid pressure regulating unit regulates the pressure difference based on detecting result of the pedal condition detecting unit.

49. A brake fluid pressure control device as in claim 48, wherein an amount of the brake fluid discharged from the pump unit is controlled by a change ratio of the detected result of the pedal condition detecting unit.

50. A brake fluid pressure control device as in claim 48, wherein, when there is a requirement to promote a deceleration of the vehicle as the detected result of the pedal condition detecting unit, an amount of brake fluid discharged from the pump unit is controlled to a maximum value and then is controlled to a smaller value according to a degree of the requirement to promote the deceleration, and, further, wherein, when there is a requirement to maintain or decrease the deceleration as the detected result of the pedal detecting unit, the amount of the brake fluid discharged from the pump unit is controlled to a minimum value or zero.

51. A brake fluid pressure control device as in claim 1, wherein the one end of the fluid pressure regulating unit is connected to the second pipeline between the flow amount amplification changing unit and the discharge port of the pump unit

52. A brake fluid pressure control device as in claim 1, wherein the one end of the fluid pressure regulating unit is connected to a portion where the first pipeline and the second pipeline are joined with the main pipeline on a side of the wheel cylinder.

53. A brake fluid pressure control device as in claim 1, further comprising:

a pressure regulating reservoir provided in the main pipeline between the master cylinder and the intake port of the pump unit for restricting brake fluid pressure provided to the pump unit.

54. A brake fluid pressure control device as in claim 1, wherein the flow amount amplifying unit includes:

a first control valve, provided in the first pipeline, for controlling the brake fluid flow of the first pipeline, and a second control valve, provided in the second pipeline, for controlling the brake fluid flow of the second pipeline.

55. A brake fluid pressure control device as in claim 54, wherein the first and the second control valves are normally open valves for opening the first and the second pipelines respectively when not energized, and for closing the first and the second pipelines respectively when energized.

56. A brake fluid pressure control device as in claim 55, further comprising an ECU instructing the respective opening and closing of the first and the second control valves.

* * * * *